US012348712B2

(12) United States Patent
Bross et al.

(10) Patent No.: US 12,348,712 B2
(45) Date of Patent: Jul. 1, 2025

(54) EXTENDED REFERENCE INTRA-PICTURE PREDICTION

(71) Applicant: Fraunhofer-Gesellschaft zur Förderung der angewandten Forschung e.V., Munich (DE)

(72) Inventors: Benjamin Bross, Berlin (DE); Philipp Merkle, Berlin (DE); Simone Walter, Berlin (DE); Heiko Schwarz, Berlin (DE); Detlev Marpe, Berlin (DE); Thomas Wiegand, Berlin (DE); Paul Keydel, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 208 days.

(21) Appl. No.: 18/104,288

(22) Filed: Jan. 31, 2023

(65) Prior Publication Data
US 2023/0188715 A1 Jun. 15, 2023

Related U.S. Application Data

(63) Continuation of application No. 17/135,058, filed on Dec. 28, 2020, now Pat. No. 11,606,554, which is a
(Continued)

(30) Foreign Application Priority Data

Jun. 29, 2018 (EP) .................................... 18180960

(51) Int. Cl.
H04N 19/00 (2014.01)
H04N 19/105 (2014.01)
(Continued)

(52) U.S. Cl.
CPC ......... *H04N 19/117* (2014.11); *H04N 19/105* (2014.11); *H04N 19/132* (2014.11); *H04N 19/159* (2014.11); *H04N 19/176* (2014.11)

(58) Field of Classification Search
CPC ............... H04N 19/159; H04N 19/117; H04N 19/132; H04N 19/136; H04N 19/593; H04N 19/105; H04N 19/176; H04N 19/70
See application file for complete search history.

(56) References Cited

U.S. PATENT DOCUMENTS 9,319,715 B2  4/2016 Oh et al.
2013/0016773 A1* 1/2013 Oh .......................... H04N 19/18
375/240.03
(Continued)

FOREIGN PATENT DOCUMENTS

EP  2600614 A2  6/2013
EP  3499895 A1  6/2019
(Continued)

OTHER PUBLICATIONS

Series H: Audiovisual and Multimedia Systems / Infrastructure of Audiovisual Services—Coding of Moving Video, International Telecommunication Union ITU-T H.265, Apr. 2013.
(Continued)

*Primary Examiner* — Zhihan Zhou
(74) *Attorney, Agent, or Firm* — Andrew M. Metrailer; William H. Dietrich; Conley Rose, P.C.

(57) ABSTRACT

A video encoder is configured to encode, by block based predictive encoding, pictures of a video into coding data, wherein the block based predictive encoding includes an intra-picture prediction. The video encoder is configured to use, for the intra-picture prediction, for encoding a prediction block of a picture, a plurality of nearest reference samples of the picture directly neighboring the prediction block and a plurality of extended reference samples, each
(Continued)

extended reference sample of the plurality of extended reference samples separated from the prediction block at least by one nearest reference sample of the plurality of reference samples. The video encoder is further configured to sequentially determine an availability or unavailability of each of the plurality of nearest reference samples and to substitute a nearest reference sample being determined as unavailable by a substitution sample. The video encoder is configured to use the substitution sample for the intra-picture prediction.

33 Claims, 15 Drawing Sheets

Related U.S. Application Data continuation of application No. PCT/EP2019/067412, filed on Jun. 28, 2019.

(51) Int. Cl.
*H04N 19/117* (2014.01)
*H04N 19/132* (2014.01)
*H04N 19/159* (2014.01)
*H04N 19/176* (2014.01)

(56) References Cited

U.S. PATENT DOCUMENTS

| | | | | |
|---|---|---|---|---|
| 2013/0128964 | A1 | 5/2013 | Chien et al. | |
| 2018/0048909 | A1* | 2/2018 | Liu | H04N 19/105 |
| 2018/0091825 | A1* | 3/2018 | Zhao | H04N 19/117 |
| 2019/0200011 | A1* | 6/2019 | Yoo | H04N 19/176 |
| 2019/0306498 | A1* | 10/2019 | Zhao | H04N 19/136 |
| 2019/0387251 | A1* | 12/2019 | Lin | H04N 19/105 |
| 2020/0007870 | A1* | 1/2020 | Ramasubramonian | H04N 19/61 |
| 2020/0137401 | A1* | 4/2020 | Kim | H04N 19/619 |
| 2021/0266558 | A1* | 8/2021 | Racape | H04N 19/176 |

FOREIGN PATENT DOCUMENTS

| | | |
|---|---|---|
| JP | 2013535919 | 9/2014 |
| JP | 6101709 B2 | 3/2017 |
| KR | 20140057514 A | 5/2014 |

OTHER PUBLICATIONS

Chen, Jianle, "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting: Torino, Italy, Jul. 13-21, 2017.

Examination Report received in Indian Application No. 202027056800, dated Sep. 10, 2021.

International Preliminary Report on Patentability and Written Opinion received in Patent Cooperation Treaty Application No. PCT/EP2019/067412, dated Dec. 29, 2020.

International Search Report received in Patent Cooperation Treaty Application No. PCT/EP2019/067412, dated Dec. 12, 2019.

Notice of Reasons for Rejection received in Japanese Application No. 2020-573307, dated Mar. 31, 2022.

Notice of Reasons for Rejections received in Korean Application No. 10-2021-7003103, dated Jan. 13, 2022.

Van Der Auwera, Geert, et al., "Description of Core Experiment 3: Intra Prediction and Mode Coding", Joint Video Expert Team (JVET) of ITU-T SG 16 WP 3 and ISO/IEC JTC 1/SC 29/WG11, 10th Meeting, San Diego, CA, Apr. 10-20, 2018.

Albrecht, C. et al: "Description of SDR, HDR and 360 video coding technology proposal by Fraunhofer HHI", Joint Video Experts Team of ITU-T SG 16 WP 3 and ISO/IEC JTC 1/SC 29/WG 11, Apr. 10-20, 2018, San Diego, US.

Jiahao Li et al., "Multiple Line-base Intra Prediction for High Efficiency Video Coding", May 26, 2016, pp. 1-10.

ITU-T H.265, High Efficiency Video Coding; H265, ITU-T Standard H.265, Feb. 2018.

Shohei Matsuo et al: "Intra Prediction with Spatial Gradient and Multiple Reference Lines", NTT Cyber Space Laboratories, NTT Corporation, Kanagawa, Japan.

Jiahao Li et al., "Intra Prediction Using Multiple Reference Lines for Video Coding", 2017 Data Compression Conference, pp. 221-230, Beijing, China.

Van Der Auwera, G., et al., "Description of Core Experiment 3: Intra Prediction and Mode Coding", JVET Iof ITU-T SG 16 WP 3 and ISO/IEC JTC 1/SC 29/WG 11 10th Meeting: San Diego, USA, Apr. 10-20, 2018, pp. 1-49.

Zhao, et al., "Further investigations on multi-line intra prediction"—10th Meeting San Diego Apr. 10-20, 2018 JVET-J0065-v2.

\* cited by examiner diagonal bottom-left horizontal diagonal top-left vertical diagonal top-right

| block size | W × H | < 64 × 64 | ≥ 64 × 64 |
|---|---|---|---|
| intra-prediction mode | planar (0) | 5-tap | 7-tap |
| | DC (1) | off | off |
| | near horizontal (17-19) | off | off |
| | near vertical (49-51) | off | off |
| | other angles (2-16, 20-48, 52-66) | 5-tap | 7-tap |

Fig. 4g

| block size | W × H | < 64 × 64 | ≥ 64 × 64 |
|---|---|---|---|
| intra-prediction mode | planar (0) | 5-tap | 7-tap |
| | DC (1) | off | off |
| | near horizontal (17-19) ($\varepsilon_1$) | off | 3-tap |
| | near vertical (49-51) ($\varepsilon_2$) | off | 3-tap |
| | farer horizontal (11-16, 20-25) ($\varepsilon_3$) | 3-tap | 5-tap |
| | farer vertical (43-48, 52-57) ($\varepsilon_4$) | 3-tap | 5-tap |
| | other angles (2-16, 20-48, 52-66) | 5-tap | 7-tap |

Fig. 4h

| set index n | reference area index [n] | truncated unary codeword bins | |
|---|---|---|---|
| | | MaxNumRefAreaIdx | |
| | | 3 | 4 |
| 0 | 0 | 0 | 0 |
| 1 | 1 | 10 | 10 |
| 2 | 3 | 11 | 110 |
| 3 | 4 | | 111 |

Fig. 11

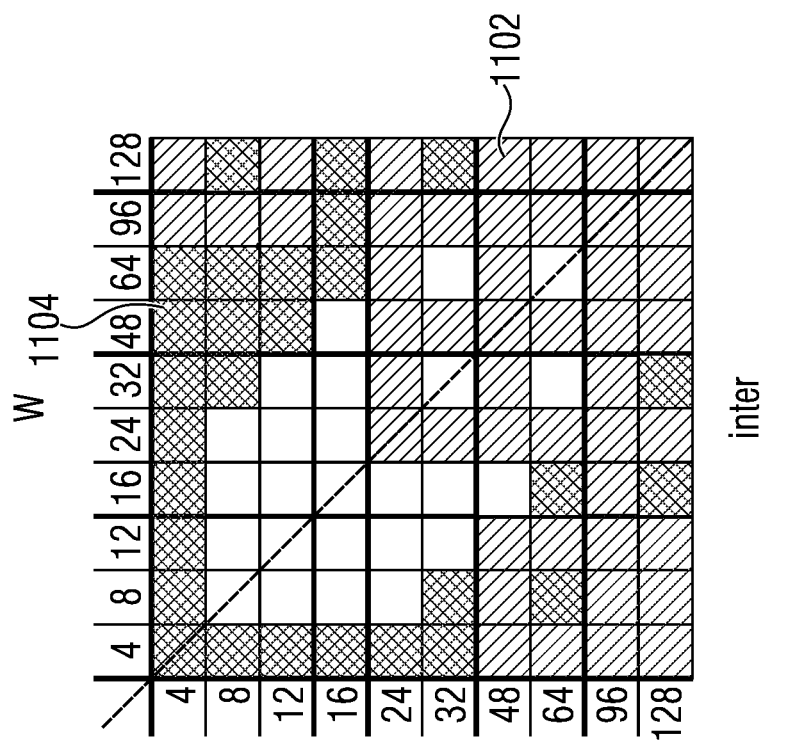
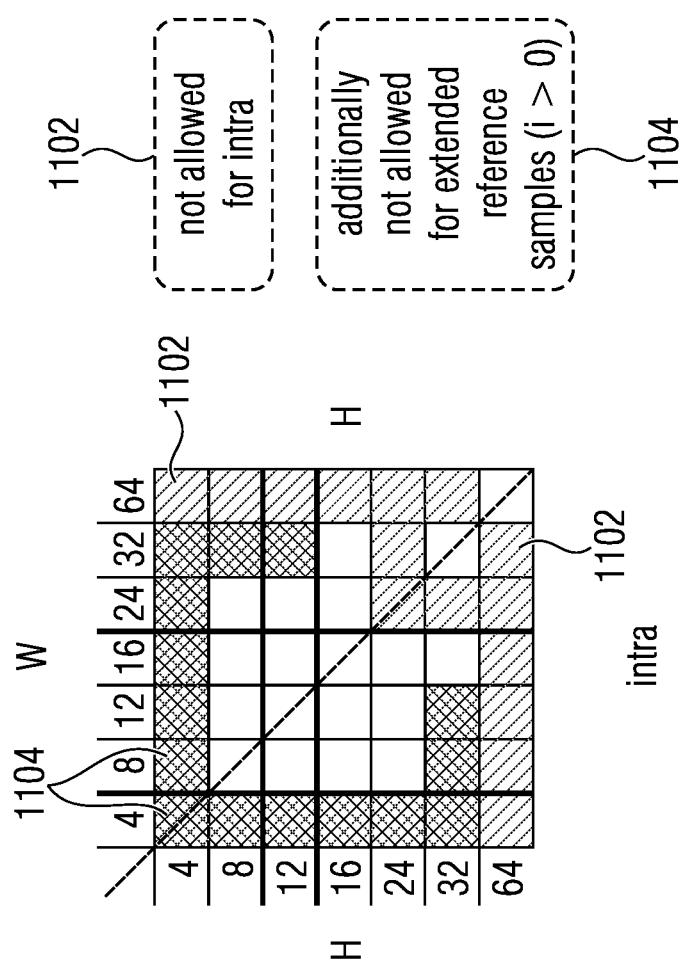
Fig. 12a
Fig. 12b

EXTENDED REFERENCE INTRA-PICTURE PREDICTION

CROSS-REFERENCE TO RELATED APPLICATIONS

This application is a continuation of U.S. application Ser. No. 17/135,058 filed Dec. 28, 2020, which is a continuation of Patent Cooperation Treaty Application No. PCT/EP2019/067412 filed Jun. 28, 2019, which is incorporated herein by reference in its entirety, and additionally claims priority from European Application No. EP 18180960.9 filed Jun. 29, 2018, which is also incorporated herein by reference in its entirety.

The present invention relates to video coding, in particular hybrid video coding comprising an intra-picture prediction. The present invention further relates to a video encoder, a video decoder and methods for video encoding, decoding, respectively.

BACKGROUND OF THE INVENTION

H.265/HEVC is video codec which already provides tools for elevating or even enabling parallel processing at encoder and/or decoder. For instance. HEVC supports a sub-division of pictures into an array of tiles which are encoded independently from each other. Another concept supported by HEVC pertains to WPP, according to which CTU rows or CTU-lines of the pictures may be processed in parallel from left to right, i.e. in stripes, provided that some minimum CTU offset is obeyed in the processing of consecutive CTU lines. It would be favorable, however, to have a video codec at hand which supports parallel processing capabilities of video encoders and/or video decoders even more efficiently.

SUMMARY

An embodiment may have a video decoder configured to decode, by block based predictive decoding, pictures coded in coding data into a video, wherein the block based predictive decoding comprises an intra-picture prediction; use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; sequentially determine an availability or unavailability of each of the plurality of extended reference samples; substitute an extended reference sample being determined as unavailable by a substitution sample; and use the substitution sample for the intra-picture prediction.

According to an embodiment, a video encoder is configured to encode, by block based predictive encoding, pictures of a video into coding data, wherein the block based predictive encoding comprises an intra-picture prediction. The video encoder is configured to use, for the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block. The video encoder is further configured to sequentially determine an availability or unavailability of each of the plurality of nearest reference samples and to substitute a nearest reference sample being determined as unavailable by a substitution sample. The video encoder is configured to use the substitution sample for the intra-picture prediction. This allows to use prediction concepts using nearest reference samples even if such samples are unavailable which may occur, for example, when having a line or row of samples in a buffer/memory whilst not actually having a column of samples in the memory being thus unavailable.

According to an embodiment a video encoder is configured to encode, by block based predictive encoding, pictures of a video into coding data, wherein the block based predictive encoding comprises an intra-picture prediction. The video encoder is configured to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block. The video encoder is further configured to filter at least a subset of the plurality of extended reference samples using a bilateral filter so as to obtain a plurality of filtered extended reference samples; and to use the plurality of filtered extended reference samples for the intra-picture prediction.

According to an embodiment, a video encoder is configured to encode, by block based predictive encoding, pictures of a video into coding data, wherein the block based predictive encoding comprises an intra-picture prediction. The video encoder is configured to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block; and to map at least a part of the nearest reference samples arranged along the second direction to extended reference samples being arranged along the first direction, such that the mapped reference samples exceed an extension of the prediction block along the first picture direction. The video encoder is configured to use the mapped extended reference samples for the prediction.

According to an embodiment, a video encoder is configured to encode, by block based predictive encoding, pictures of a video into coding data, wherein the block based predictive encoding comprises an intra-picture prediction. The video encoder is configured to use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples, wherein the video encoder is configured to boundary filtering in a mode where no extended samples are used; and not to use boundary filtering when extended samples are used; or wherein the video encoder is configured to boundary filtering at least a subset of the plurality of nearest reference samples and not using boundary filtering for the extended samples.

According to an embodiment, a video encoder is configured to encode, by block based predictive encoding, pictures of a video into coding data, wherein the block based predictive encoding comprises an intra-picture prediction.

The video encoder is configured to determine, in the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples. The video encoder is further configured to determine a prediction for the prediction block using the extended reference samples and to filter the extended reference samples so as to obtain a plurality of filtered extended reference samples; and to combine the prediction and the filtered extended reference samples so as to obtain a combined prediction for the prediction block.

According to an embodiment, a video encoder is configured to encode, by block based predictive encoding, pictures of a video into coding data, wherein the block based predictive encoding comprises an intra-picture prediction. The video encoder is configured to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set, the subset being associated with the plurality of extended reference samples. The video encoder is configured to weightedly ($w_0$; $w_i$) combine the first prediction ($p_0(x,y)$) and the second prediction ($p_i(x,y)$) so as to obtain a combined prediction ($p(x,y)$) as prediction for the prediction block in the coding data.

According to an embodiment, a video encoder is configured to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples, e.g., in absence of extended reference samples; or being one of a second set of prediction modes for predicting the prediction block using the extended reference samples; wherein the second set of prediction modes is a subset of the first set of prediction modes; to signal a mode information (m) indicating the prediction mode used for predicting the prediction block; and to afterwards signal a parameter information (i) indicating a subset of the extended reference samples used for the prediction mode if the prediction mode is contained in the second set of prediction modes; and to skip signaling the parameter information when the used prediction mode is not contained in the second set of prediction modes, thereby allowing a conclusion at the decoder that a specific value of the parameter is chosen or selected ort determined, the predefined nature allowing skipping of the signaling, i.e., the absence of the signal is given an informative meaning. For example, the absence may indicate that the nearest reference samples have to be used.

According to an embodiment, a video encoder is configured to encode, by block based predictive encoding, pictures of a video into coding data, wherein the block based predictive encoding comprises an intra-picture prediction; to use, for the intra-picture prediction, for encoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes. The video encoder may use available reference data so as to generate the first set and/or the second set and/or may determine the set using information derived from the pictures. The second set being a subset of the first set includes the case that both sets are equal. The video encoder is configured to signal a parameter information indicating a subset of the plurality of reference samples used for the prediction mode, the subset of the plurality of reference samples comprising nearest reference samples only or extended reference samples; and to afterwards signal a mode information (m) indicating the prediction mode used for predicting the prediction block, wherein the mode information indicates a prediction mode from a subset of modes, the subset being restricted to a set of allowed prediction modes according to the parameter information (i). Based on an association of the references samples used, i.e., nearest or extended, an identification of the restricted set is possible as only those prediction modes apply which are associated with the reference samples indicated.

According to an embodiment, a video encoder is configured to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set being associated with the plurality of extended reference samples. The video encoder is configured to combine the first prediction and the second prediction so as to obtain a combined prediction as prediction for the prediction block in the coding data.

According to an embodiment, a video encoder is configured to encode, by block based predictive encoding, pictures of a video into coding data, wherein the block based predictive encoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and to use the plurality of extended reference samples according to a predefined set of pluralities of extended reference samples. The pluralities of extended reference samples, may be included, for example, in a list of area indices being identified by an identifier.

According to an embodiment, a video encoder is configured to encode, by block based predictive encoding a plurality of prediction blocks, pictures of a video into coding data, wherein the block based predictive encoding comprises an intra-picture prediction; to use, for the intra-picture prediction, for encoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block. The video encoder is configured to determine the extended reference samples so as to be at least partially a part of an adjacent prediction block of the plurality of prediction blocks, and to determine that the adjacent prediction block has not yet been predicted; and to signal information indicating the extended prediction samples associated to the prediction block and arranged in the adjacent prediction block as unavailable samples.

According to an embodiment, a video decoder is configured to decode, by block based predictive decoding, pictures coded in coding data into a video, wherein the block based predictive decoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; to sequentially determine an availability or unavailability of each of the plurality of nearest reference samples; to substitute a nearest reference sample being determined as unavailable by a substitution sample; and to use the substitution sample for the intra-picture prediction.

According to an embodiment, a video decoder is configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; to filter at least a subset of the plurality of extended reference samples using a bilateral filter so as to obtain a plurality of filtered extended reference samples; and to use the plurality of filtered extended reference samples for the intra-picture prediction.

According to an embodiment, a video decoder is configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block; to map at least a part of the nearest reference samples arranged along the second direction to extended reference samples being arranged along the first direction, such that the mapped reference samples exceed an extension of the prediction block along the first picture direction; and to use the mapped extended reference samples for the prediction.

According to an embodiment, a video decoder is configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples. The video decoder is configured to boundary filtering in a mode where no extended samples are used; and not to use boundary filtering when extended samples are used; or to boundary filtering at least a subset of the plurality of nearest reference samples and not using boundary filtering for the extended samples.

According to an embodiment, a video decoder is configured to decode, by block based predictive decoding, pictures coded in coding data into a video, wherein the block based predictive decoding comprises an intra-picture prediction; to determine, in the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples; to determine a prediction for the prediction block using the extended reference samples; to filter the extended reference samples so as to obtain a plurality of filtered extended reference samples; and to combine the prediction and the filtered extended reference samples so as to obtain a combined prediction for the prediction block.

According to an embodiment, a video decoder is configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set, the subset being associated with the plurality of extended reference samples. The video decoder is configured to weightedly combine the first prediction and the second prediction so as to obtain a combined prediction as prediction for the prediction block in the coding data.

According to an embodiment, a video decoder is configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes; to receive a mode information (m) indicating the prediction mode used for predicting the prediction block; and to afterwards receive a parameter information (i) indicating a subset of the extended reference samples used for the prediction mode thereby indicating that the prediction mode is contained in the second set of prediction modes; and to determine that the used prediction mode is not contained in the second set of prediction modes when not receiving the parameter information and to determine a use of the nearest reference samples for the prediction.

According to an embodiment, a video decoder is configured to decode, by block based predictive decoding, pictures coded in coding data into a video, wherein the block based predictive decoding comprises an intra-picture prediction; to use, for the intra-picture prediction, for decoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes; to receive a parameter information (i) indicating a subset of the plurality of reference samples used for the prediction mode, the subset of the plurality of reference samples comprising nearest reference samples only or at least one extended reference sample; and to afterwards receive a mode information (m) indicating the prediction mode used for predicting the prediction block; wherein the mode information indicates a prediction mode from a subset of modes, the subset being restricted to a set of allowed prediction modes according to the parameter information (i).

According to an embodiment, a video decoder is configured to decode, by block based predictive decoding, pictures coded in coding data into a video, wherein the block based predictive decoding comprises an intra-picture prediction; use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set being associated with the plurality of extended reference samples. The video decoder is configured to combine the first prediction and the second prediction so as to obtain a combined prediction as prediction for the prediction block in the coding data.

According to an embodiment, a video decoder is configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and to use the plurality of extended reference samples according to a predefined set of pluralities of extended reference samples.

According to an embodiment, a video decoder is configured to decode, by block based predictive decoding, pictures coded in coding data into a video, wherein for each picture a plurality of prediction blocks is decoded, wherein the block based predictive decoding comprises an intra-picture prediction; and to use, for the intra-picture prediction, for decoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block. The video decoder is configured to determine the extended reference samples so as to be at least partially a part of an adjacent prediction block of the plurality of prediction blocks, and to determine that the adjacent prediction block has not yet been predicted; and to receive information indicating the extended prediction samples associated to the prediction block and arranged in the adjacent prediction block as unavailable samples.

Further embodiments relate to methods for encoding and decoding a video and to a computer program product.

With respect to the aforementioned embodiments of the present application, it is noted that same may be combined so that more than one of the aforementioned embodiments such as all embodiments are implemented in a video codec concurrently.

BRIEF DESCRIPTION OF THE DRAWINGS

Embodiments of the present invention will be detailed subsequently referring to the appended drawings, in which:

FIG. 4g-4h show tables for illustrating example dependencies of a number of taps used in filters, the number being dependent from a block size of the prediction block and from the prediction mode;

FIG. 11 shows an example truncated unary code for a specific set of reference areas according to an embodiment;

FIG. 12a-b show a schematic illustration of usable block sizes according to embodiments;

DETAILED DESCRIPTION OF THE INVENTION

Figure 1:
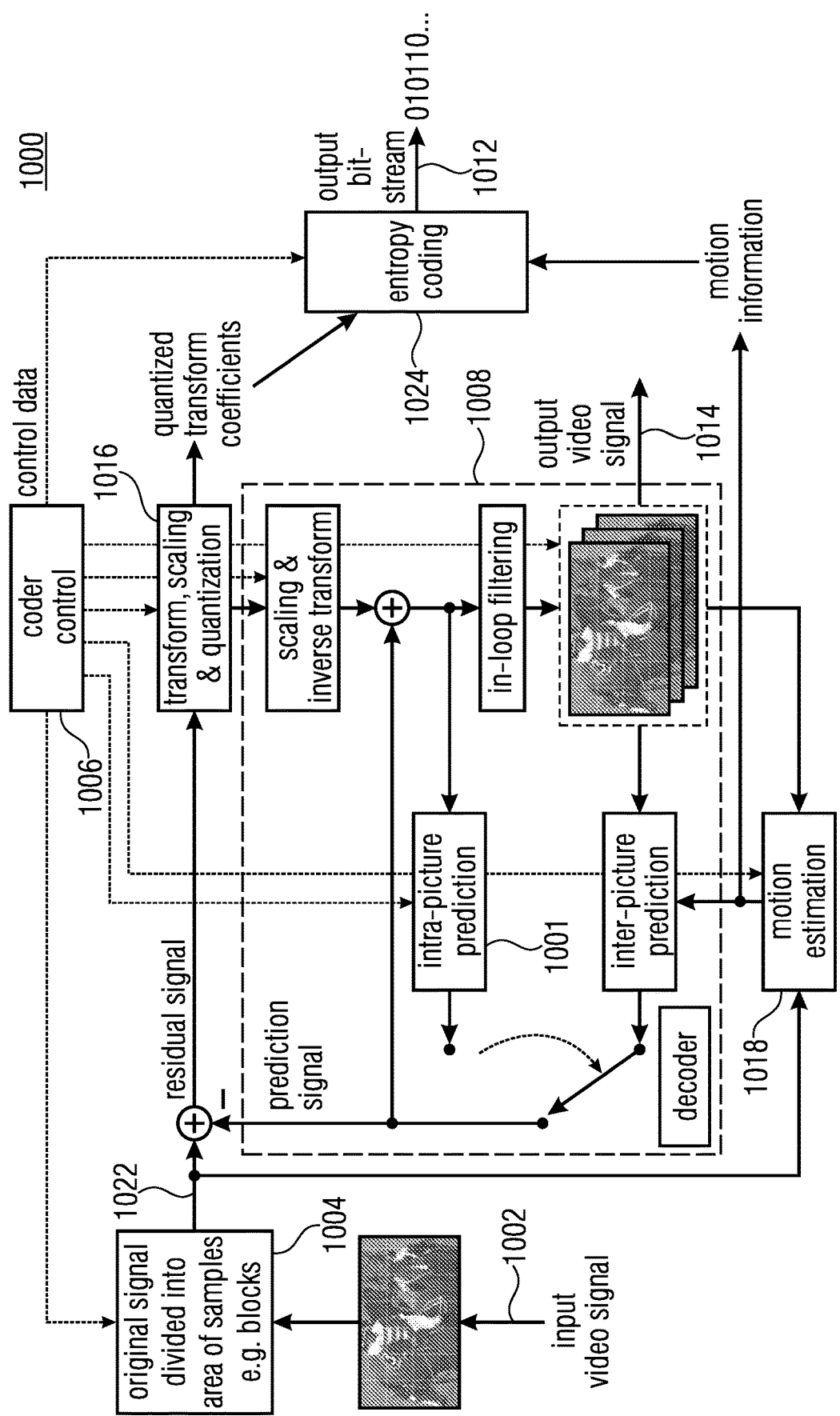
FIG. 1 shows a schematic block diagram of a video encoder according to an embodiment, comprising a decoder according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In hybrid video coding, intra-picture prediction is used to encode an area of picture samples by generating a prediction signal from available neighboring samples, i.e. the reference samples. The prediction signal is subtracted from the original signal to get the residual signal. This residual signal or prediction error is further transformed, scaled, quantized and entropy coded as illustrated in FIG. 1 showing a schematic block diagram of a video encoder 1000 according to an embodiment being, for example, a hybrid video encoder with an intra-picture prediction block 1001. The video encoder 1000 is configured to receive an input video signal 1002 comprising a plurality of pictures, a sequence of pictures forming a video. The video encoder 1000 comprises a block 1004 being configured to divide the signal 1002 into an area of samples, i.e., to form blocks from the input video signal 1002. A controller 1006 of the video encoder 1000 is configured to control the block 1004 and to control a decoder 1008 that may be a part of the encoder 1000. A decoder for receiving and decoding an output bitstream 1012 and a generated output video signal 1014, i.e., coding data, may be implemented accordingly. In particular, a transform, scaling and quantization block 1016 together with a block 1018 for motion estimation of the signal 1022 being the input video signal 1002 divided into blocks by the block 1004 may both provide information in terms of quantized transform coefficients and a motion information so as to enable entropy coding for the output bitstream 1012.

The quantized transformed coefficients are then scaled and inversed transformed to generate the reconstructed residual signal before potential in-loop filtering operations. This signal can be added to the prediction signal again to get the reconstruction that is also available at the decoder. The reconstructed signal can be used to predict succeeding samples in coding order within the same picture.

Figure 2:
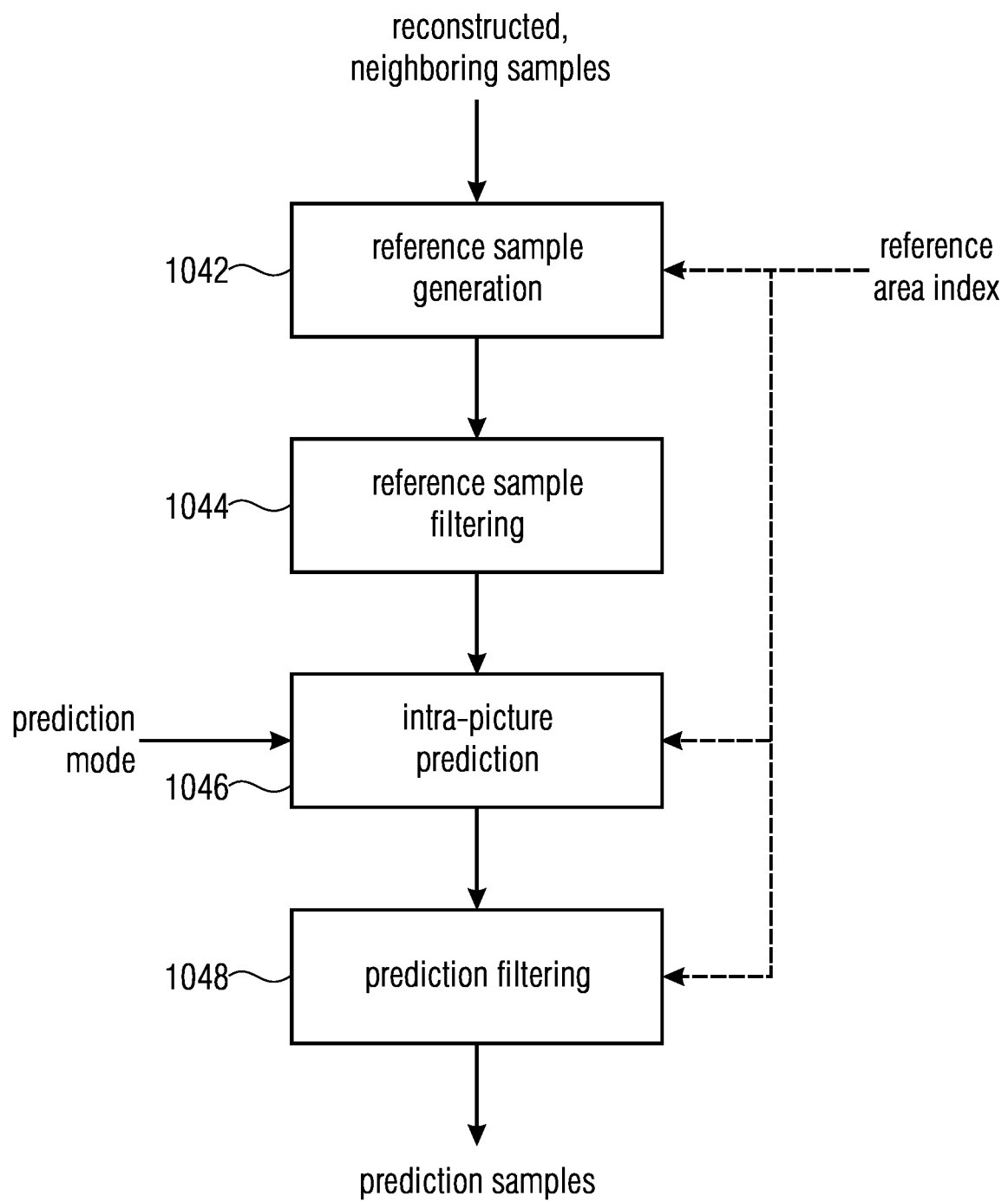
FIG. 2 shows a schematic flow chart of a method for encoding a video stream according to an embodiment.

The intra-picture prediction is further detailed in FIG. 2. First, the reference samples used for the prediction are generated in a block 1042 based on the reconstructed samples. This stage also includes substituting neighboring samples that are not available, e.g. at picture, slice or tile boundaries. Second, in a block 1044 the reference samples can be filtered to eliminate discontinuities in the reference signal. Third, in a block 1046 the prediction samples are calculated using the reference samples according to the intra prediction mode. The prediction mode describes how the prediction signal is generated from the reference samples, e.g. by averaging them in the DC mode or by copying them along one prediction angle in an angular prediction mode. The encoder has to decide which intra prediction mode to select and the selected intra prediction mode is signaled in the bitstream by entropy coding to the decoder. At the decoder side, the intra prediction mode is extracted from the bitstream by entropy decoding. Fourth and possibly last, in a block 1048 the prediction samples can be filtered as well to smoothen the signal. In other words, FIG. 2 shows a flowchart of an intra-picture prediction process or method.

In general, the correlation between samples in an image decreases with increasing distance. Hence directly neighboring samples are generally well suited as reference samples to predict an area of samples. However, there are cases where the directly neighboring reference samples represent an edge or an object in a uniform area (occlusion). In these cases, the correlation between the samples to predict (uniform or textured area) and the directly neighboring reference samples (edge) would be low. Extended reference intra-picture prediction solves this problem by incorporating more distant reference samples that are not directly neighboring. The concept of extending the nearest reference samples is known but several novel improvements for all parts of the intra-picture prediction process and signaling are defined in embodiments of the present invention and described in the following.

Extended reference intra-picture prediction allows to generate the prediction signal of a sample area using extended references samples. Extended reference samples are available reference samples that are not direct neighbors. In the following, improved reference sample generation, filtering, prediction and prediction filtering using extended reference samples according to embodiments are described in further detail. The special case of combining predictions using extended reference samples with prediction using directly neighboring samples or unfiltered reference samples is covered in afterwards. After that, various methods according to embodiments are described to improve prediction mode and extended reference area signaling for extended reference samples. Further, embodiment to facilitate parallel encoding with extended reference samples are described.

For reference sample generation, current video coding standards use directly neighboring samples to predict the current block. In literature, it was proposed to use multiple reference lines in addition to the nearest, directly neighboring samples. The additional reference lines to be used in intra-picture prediction are further referred to as extended reference samples in detailed in the following. After that, improved methods for substitution of non-available extended reference samples according to embodiments are described.

Figure 3:
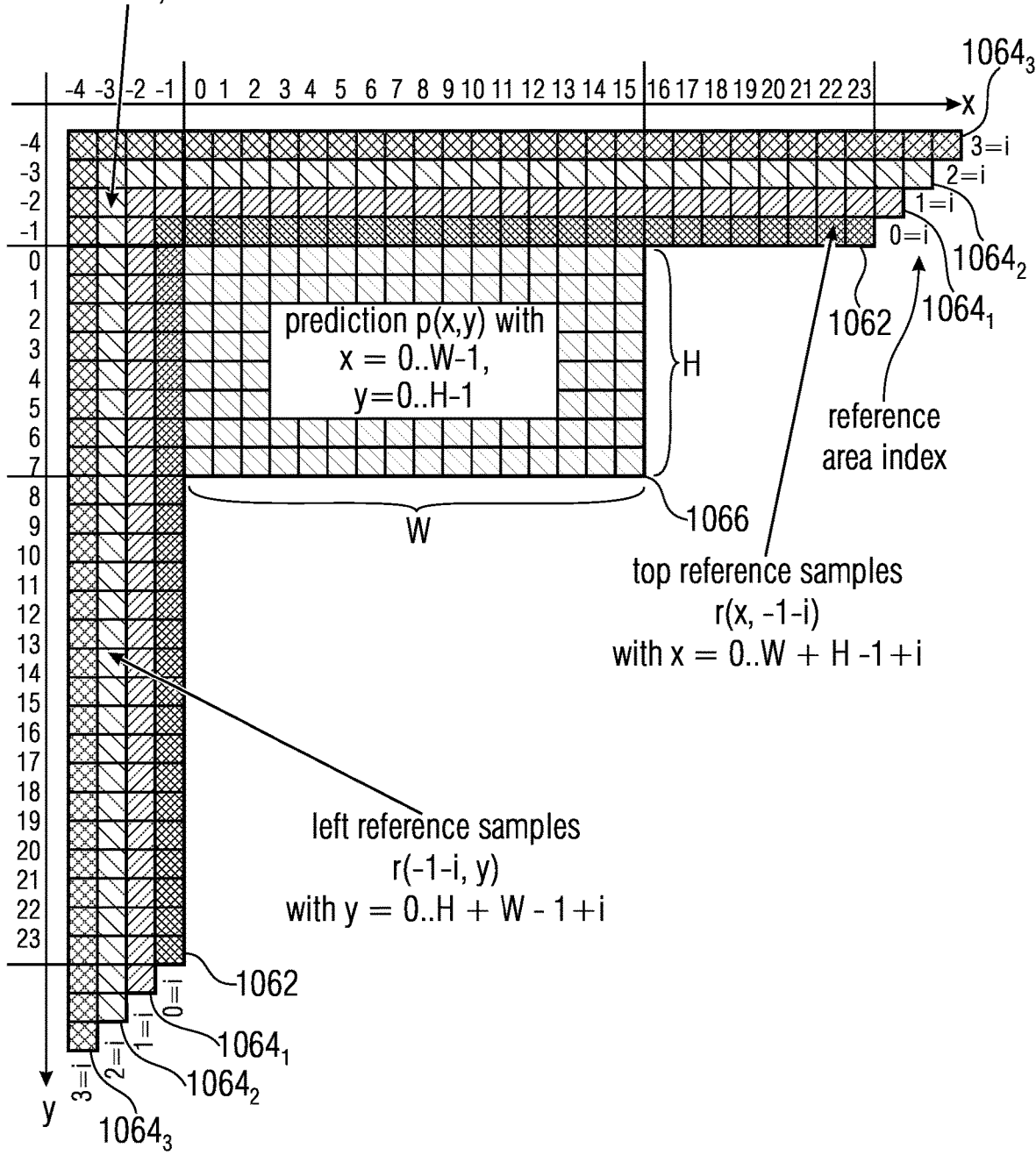
FIG. 3 shows an example of directly neighboring (nearest) reference samples and extended reference samples used in embodiments.

An example showing a nearest reference sample line and three extended reference sample lines of a 16×8 block to be predicted is illustrated in FIG. 3 showing an example of directly neighboring (nearest) reference samples 1062 and extended reference samples $1064_1$, $1064_2$ and $1064_3$.

The nearest reference samples 1062 and the extended reference samples $1064_1$, $1064_2$ and $1064_3$ are arranged adjacent to a prediction block 1066 to be predicted and being arranged along two directions of the picture, namely direction x and direction y being arranged perpendicular to direction x. Along the direction x, the prediction block comprises an extension W with samples ranging from 0 to W−1. Along the direction y, the prediction block comprises an extension H with samples ranging from 0 to H−1.

A reference area with index i may indicate a distance between the respective reference sample, i.e., the nearest reference sample having index i=0, i.e., being arranged directly adjacent, and extended reference samples being spaced from the prediction block 1066 at least by the nearest reference samples 1062. For example, the reference area index i may indicate an extension of a distance between the prediction block 1066 and the respective reference sample 1062 or 1064. By way of example, increasing parameter x along the direction x may be referred to as moving right and, on the contrary, reducing the x may be referred to as moving left.

Alternatively or in addition, reducing the index i along a negative direction y may be referred to as moving upwards or towards a top of the picture, wherein with an increase of parameter y, a movement downwards or towards a bottom of the picture may be indicated. Terms like top, bottom, left and right are used to simplify the understanding of the present invention. According to other embodiments, such terms may be changed, altered or substituted with any other directions without limiting the scope of the present embodiments. By way of example, reference samples 1062 and/or 1064 being arranged left from the prediction block, i.e., having x<0, may be referred to as left reference samples. Reference samples 1062 and/or 1064 being arranged so as to have y<0 may be referred to as top reference samples, assuming that an upper left edge of the prediction block 1066 has positions 0,0. Reference samples being identified as well as left reference samples and as top reference samples may be referred to as corner reference samples. Accordingly, reference samples exceeding the extension W along the x-direction may be referred to as right reference samples, wherein reference samples exceeding the extension H of the prediction block 1066 may be referred to as bottom reference samples.

Figure 4A:
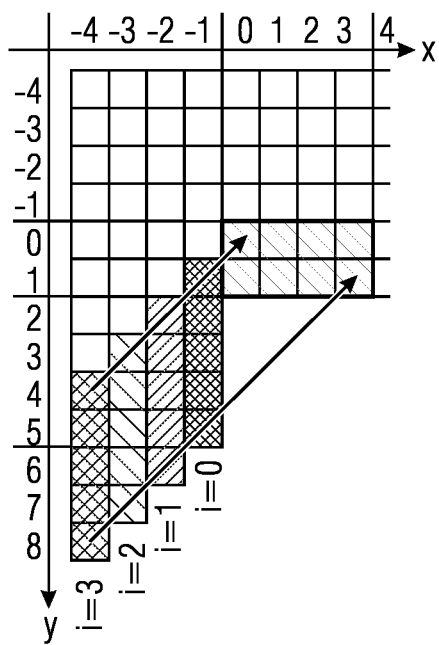
FIG. 4a-4e show examples of five angular intra-picture prediction angles for a 4×2 block of prediction samples according to embodiments.
Figure 4B:
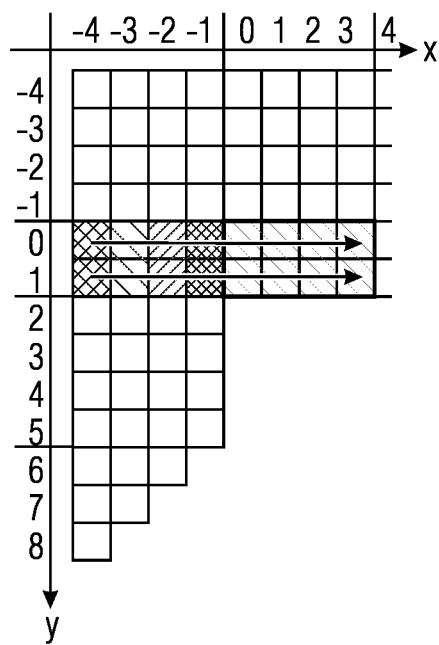
Figure 4C:
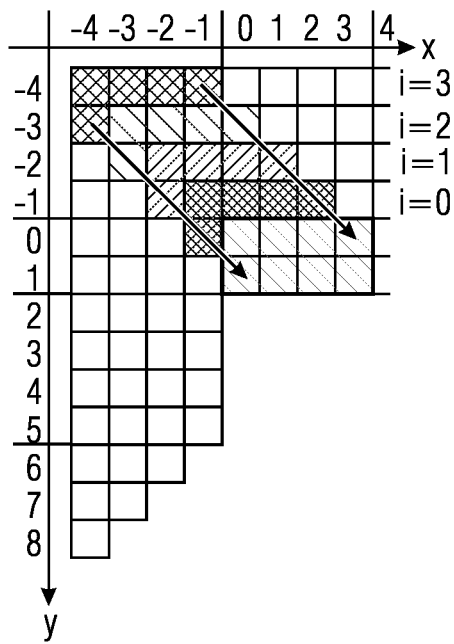
Figure 4D:
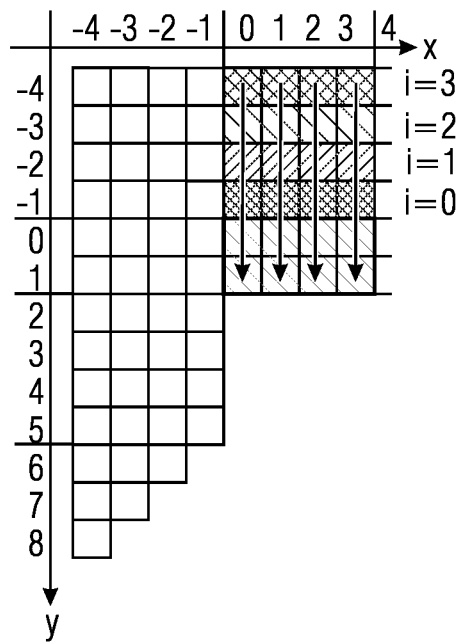
Figure 4E:
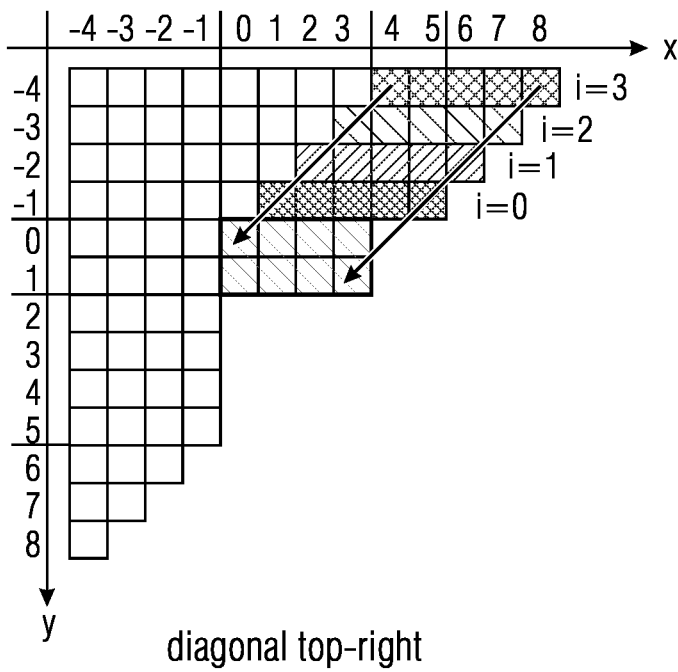

In order to indicate which reference samples to use for prediction, each line of reference samples is associated with a reference area index i. The nearest reference samples are given an index i=0, the next line of extended reference samples i=1 and so on. Using the notation from FIG. 3, the top reference samples can be described by r(x, −1−i) with x ranging from 0 to M and the left reference samples can be described by r(−1−i,y) with y ranging from 0 to N. The parameters M for the horizontal extend and N for the vertical extend of the reference samples depend on the intra-picture prediction. In case top-right diagonal prediction is used as maximum angle clockwise for example as described in connection with FIG. 4e, the top reference samples need to extent M=W+H−1+i samples in horizontal direction. In case bottom-left diagonal prediction is used as maximum angle counter clockwise for example as described in FIG. 4a, the left reference samples need to extent M=H+W−1+i samples in vertical direction. As in FIG. 3, W describes the width and H the height of the prediction block.

A video encoder according to an embodiment, such as video encoder 1000 may be configured to encode, by block based predictive encoding, pictures of a video into coding data, wherein the block based predictive encoding comprises an intra-picture prediction. The video encoder may use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block. The video encoder may sequentially determine an availability or unavailability of each of the plurality of nearest reference samples and may substitute a nearest reference sample being determined as unavailable by a substitution sample. The video encoder may use the substitution sample for the intra-picture prediction.

For determining the availability or unavailability, the video encoder may check the samples sequentially according to a sequence, determine the substitution sample as a copy a last extended reference sample being determined as available in the sequence; and/or determine the substitution sample as a copy a next extended reference sample being determined as available in the sequence.

The video encoder may further determine the availability or unavailability sequentially according to a sequence and determine the substitution sample based on a combination of an extended reference sample being determined as available and being arranged in the sequence prior to the reference sample being determined as unavailable and of an extended reference sample being determined as available and being arranged in the sequence after the reference sample being determined as unavailable.

Alternatively or in addition, the video encoder may be configured to use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples; and to determine an availability or unavailability of each of the plurality of extended reference samples. The video encoder may signal a use of the plurality of extended reference samples when a portion of available extended reference samples of the plurality of extended reference samples is larger than or equal a predetermined threshold; and skip signaling the use of the plurality of extended reference samples when the portion of available extended reference samples of the plurality of extended reference samples is below the predetermined threshold.

A respective decoder such as video decoder 1008 or a video decoder for generating a video stream again, may accordingly be configured to decode, by block based predictive decoding, pictures coded in coding data into a video, wherein the block based predictive decoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and to sequentially determine an availability or unavailability of each of the plurality of extended reference samples. The video decoder may substitute an extended reference sample being determined as unavailable by a substitution sample; and use the substitution sample for the intra-picture prediction.

The video decoder may further be configured to determine the availability or unavailability sequentially according to a sequence; determine the substitution sample as a copy a last extended reference sample being determined as available in the sequence; and/or determine the substitution sample as a copy a next extended reference sample being determined as available in the sequence.

Further, the video decoder may be configured to determine the availability or unavailability sequentially according to a sequence; and to determine the substitution sample based on a combination of an extended reference sample being determined as available and being arranged in the sequence prior to the reference sample being determined as unavailable and of an extended reference sample being determined as available and being arranged in the sequence after the reference sample being determined as unavailable.

The video decoder may alternatively or in addition be configured to use, for the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples; to determine an availability or unavailability of each of the plurality of extended reference samples; to signal receive information indicating a use of the plurality of extended reference samples when that a portion of available extended reference samples of the plurality of extended reference samples is larger than or equal a predetermined threshold and use of the plurality of extended reference samples; and to skip using the plurality of extended reference samples in absence of the information, i.e., when the portion of available extended reference samples of the plurality of extended reference samples is below the predetermined threshold.

When neighboring reference samples are not available, according to embodiments, an extended reference sample substitution may be performed. For example, the unavailable samples can be replaced by the closest neighboring sample that is available, a combination of the closest two or by a predetermined value in case there are no neighboring samples available, e.g. $2^{bitdepth-1}$. Reference samples are not available e.g. when they are located outside a picture, slice or tile boundary or when constrained intra prediction is used that disallows using samples from inter-picture predicted areas as reference for intra-picture prediction areas.

For example, if the current block to be predicted is located at the left picture boundary, the left and top-left corner reference samples are not available. In this case, the left and top-left corner reference samples are substituted by the first available top reference sample. When this first available top reference sample is the first one, i.e. r(0, −1−i), the substitution for nearest (i=0) and extended (i>0) reference samples can be formulated as follows:

$$r(-1-i,y)=r(0,--i) \text{ with } y=-1-i \ldots M$$

$$r(x,-1-i)=r(0,-1-i) \text{ with } y=-1-i \ldots M \text{ for } i>0$$

The parameter i may have any maximum value larger than 0 within the encode/decoder system, e.g., 1, 2, 3, 4 or more such as 5 or more or 10 or more.

When constrained intra prediction is used, it can happen that one or more neighboring blocks are not available because they are coded using inter-picture prediction. For example, the left H samples r(−1−i, y) with y=0 ... H−1 are inside an inter-picture predicted block and not available because constrained intra prediction is enabled.

In one embodiment, the availability checking process for each reference sample is done sequentially, e.g. from the bottom-left to the top-right reference samples or vice versa, the first sample that is not available along this direction is replaced by the last one that is available if there is one. If there is no sample available before, the unavailable samples are replaced by the next available sample. In the embodiment starting from bottom-right, the W bottom-right samples r(−1−i, y) with y=H ... W−1 are available. Consequently, the left samples are replaced by as follows:

$$r(-1-i,y)=r(-1-i,M) \text{ with } y=0 \ldots M-1$$

In another embodiment, unavailable reference samples between available reference samples could be generated by linearly interpolating between the two nearest samples, one from each side.

In case it is determined that most of the extended reference area samples are not available, the use of extended reference samples does not bring any benefit compared to using the nearest reference samples. Hence the signaling of the reference area index can be saved and its signaling can be restricted to blocks where at least half of the extended reference samples are available.

A video encoder according to an embodiment such as video encoder 1000 may be configured to encode, by block based predictive encoding, pictures of a video into coding data, wherein the block based predictive encoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; to filter at least a subset of the plurality of extended reference samples using a bilateral filter so as to obtain a plurality of filtered extended reference samples; and to use the plurality of filtered extended reference samples for the intra-picture prediction.

The video encoder according to this embodiment may be configured to combine the plurality of filtered extended reference samples with a plurality of unfiltered extended reference samples so as to obtain a plurality of combined reference values, wherein the video encoder is configured to use the plurality of combined reference values for the intra-picture prediction.

Alternatively or in addition, the video encoder may be configured to filter the plurality of extended reference samples using one of a 3-tap filter, a 5-tap filter and a 7-tap filter.

Figure 4F:
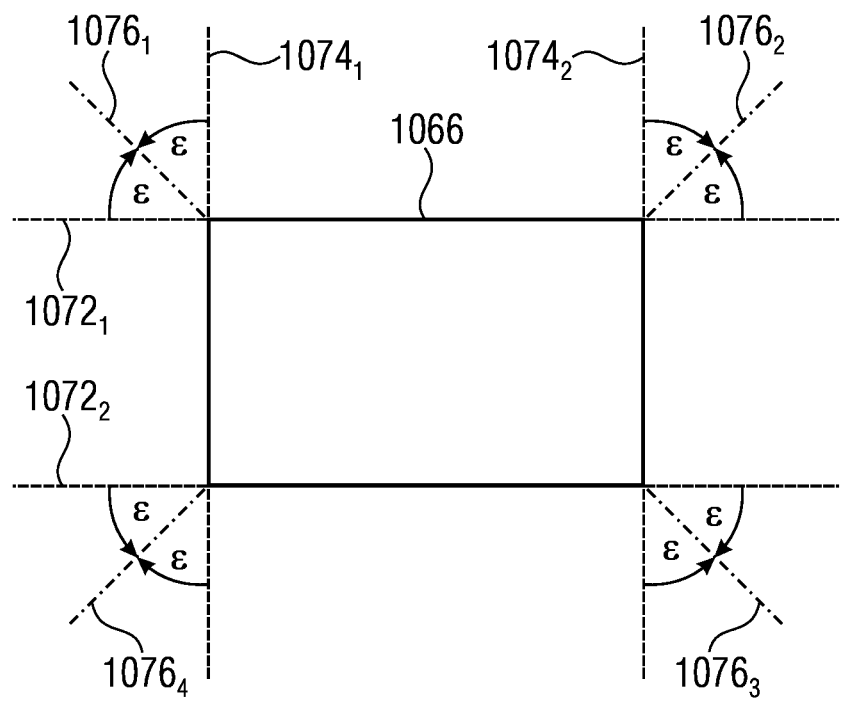
FIG. 4f shows a schematic diagram for illustrating an of a direction of an angular prediction used in embodiments.

The video encoder may further be configured to select predict the prediction block using an angular prediction mode; wherein the 3-tap filter, a 5-tap filter and a 7-tap filter are configured as bilateral filters, wherein the video encoder is configured to select to use one of the 3-tap filter, the 5-tap filter and the 7-tap filter based on an angle used for the angular prediction, the angle arranged between a horizontal or a vertical direction of the angular prediction mode; and/or wherein the video decoder is configured to select to use one of the 3-tap filter, the 5-tap filter and the 7-tap filter based on a block size of the prediction block. As shown in FIG. 4f, an angle F may describe an angle of a direction of an angular prediction used for predicting the prediction block 1066 with respect to horizontal borders 1072 and/or vertical borders 1074 of the prediction block 1066 and measured towards a diagonal 1076 between the horizontal and vertical direction, i.e., the angle of the angular prediction is at most 45°. With increasing angle F an increased number of taps may be used in the filter. Alternatively or in addition, a block size may define a basis or dependency for selecting the filter.

A corresponding video decoder may be configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; to filter at least a subset of the plurality of extended reference samples using a bilateral filter so as to obtain a plurality of filtered extended reference samples; and to use the plurality of filtered extended reference samples for the intra-picture prediction.

The video decoder may further be configured to combine the plurality of filtered extended reference samples with a plurality of unfiltered extended reference samples so as to obtain a plurality of combined reference values, wherein the video decoder is configured to use the plurality of combined reference values for the intra-picture prediction.

Alternatively or in addition, the video decoder of may be configured to filter the plurality of extended reference samples using one of a 3-tap filter, a 5-tap filter and a 7-tap filter. As described for the encoder, the 3-tap filter, a 5-tap filter and a 7-tap filter are configured as bilateral filters, wherein the video decoder is configured to predict the prediction block using an angular prediction mode, and to select to use one of the 3-tap filter, the 5-tap filter and the 7-tap filter based on an angle used for the angular prediction, the angle arranged between a horizontal or a vertical direction of the angular prediction mode; and/or wherein the video decoder is configured to select to use one of the 3-tap filter, the 5-tap filter and the 7-tap filter based on a block size of the prediction block.

For example, instead of a bilateral filter, 3-tap FIR filters may be used. This may allow to filter only the nearest reference samples (although not with bilateral filter) and to leave the extended reference samples unfiltered.

For larger sample areas, discontinuities in the reference samples can occur that distort the prediction. The state of the art solution to this is to apply linear smoothing filters to the reference samples. In case of discontinuities, which can be detected for example by comparing to a predetermined threshold, strong smoothing can be applied. This typically generates the reference samples by interpolating between corner reference samples.

However, linear smoothing filters can also remove edge structure that needs to be preserved. Applying bilateral filters to the extended references samples according to an embodiment for reference sample filtering can prevent undesired smoothing of sharp edges. Since bilateral filtering is more efficient for larger blocks and intra prediction angles that deviate from the exact horizontal and exact vertical directions, the decision of whether to apply the filter and the length of the filter can depend on the block size and/or the prediction mode. One example design can incorporate dependencies as shown in FIG. 4g showing a dependency for block sizes smaller than 64×64 and larger than or equal to 64×64 with respect to W×H and FIG. 4h showing a different dependency for block sizes smaller than 64×64 and larger than or equal to 64×64 with respect to W×H. In the embodiment of FIG. 4g the intra-prediction mode may, for example, one of a planar mode, a DC mode, a near horizontal mode, a near vertical mode or a different angle of an angular mode. In the embodiment of FIG. 4h, additionally angles being identified as farer horizontal and farer vertical may be selected, for example, having a larger value of angle F shown in FIG. 4f when compared to near horizontal or near vertical. As may be seen, larger block sizes may result in a higher number of taps so as to facilitate filtering of the larger amount of data, wherein, additionally, an increase of F may also result in an increase of taps. According to FIG. 4h, an embodiment may apply a small 3-tap filter for near horizontal and near vertical modes and increases the filter length with increasing distance from horizontal and vertical direction. Although being illustrated as being dependent on both, the prediction mode and the block size, the selection of the filter or at least the number of taps may alternatively depend only on one of both and/or on additional parameters.

In another embodiment for reference sample filtering, an intra-picture prediction that uses filtered reference samples can be combined with unfiltered reference samples using a position-dependent weighting as described in connection with Position Depending Prediction Combination. In this case, the reference samples for the prediction that uses filtered references samples can use a different reference sample filtering than for the non-combined prediction. For example, the filtering can select among a set of 3-, 5- and 7-tap filters.

A video encoder according to an embodiment such as video encoder 1000 may be configured to encode, by block based predictive encoding, pictures of a video into coding data, wherein the block based predictive encoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block; to map at least a part of the nearest reference samples arranged along the second direction to extended reference samples being arranged along the first direction, such that the mapped reference samples exceed an extension of the prediction block along the first picture direction; and; and to use the mapped extended reference samples for the prediction.

The video encoder may further be configured to map the portion of nearest reference samples according to a prediction mode used for predicting the prediction block. The video encoder may be configured to map the portion of nearest reference samples according to a direction used in the prediction mode for predicting the prediction block.

A corresponding video decoder may be configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block;

map at least a part of the nearest reference samples arranged along the second direction to extended reference samples being arranged along the first direction, such that the mapped reference samples exceed an extension of the prediction block along the first picture direction; and to use the mapped extended reference samples for the prediction.

The video decoder may be configured to map the portion of nearest reference samples according to a prediction mode used for predicting the prediction block. The video decoder may be configured to map the portion of nearest reference samples according to a direction used in the prediction mode for predicting the prediction block.

In principle, every intra-picture prediction that uses the directly neighboring reference samples can be adapted to use the extended reference samples. In literature, the following three predictions have been adapted Planar

DC

Angular

In the following each prediction will be detailed for extended reference samples to thereby describe embodiments of the present invention.

The planar prediction is a bilinear interpolation of the W×H prediction samples illustrated in FIG. 3 from the boundaries. Since the right and bottom boundaries are not yet reconstructed, the right boundary samples are set equal to the top-right corner sample r(W, −1) and the bottom boundary samples are set equal to the bottom-left corner sample r(−1, H):

$$p(x, y) = \frac{W \cdot p_{ver}(x, y) + H \cdot p_{hor}(x, y) + W \cdot H}{2W \cdot H} \text{ with } x = 0 \ldots W-1,$$
$$y = 0 \ldots H-1$$

$$p_{ver}(x, y) = (H - 1 - y) \cdot r(x, -1) + (y + 1) \cdot r(-1, H)$$

$$p_{hor}(x, y) = (W - 1 - x) \cdot r(-1, y) + (x + 1) \cdot r(W, -1)$$

For extended reference samples, the vertical and horizontal predictions $p_{ver}$ and $p_{hor}$ depend on the reference area index i:

$$p_{ver,i}(x,y) = (H-1-y) \cdot r(x,-1-i) + (y+1) \cdot r(-1-i, H)$$

$$p_{hor,i}(x,y) = (W-1-x) \cdot r(-1-i, y) + (x+1) \cdot r(W, -1-i)$$

One embodiment to improve extended reference samples is to use the nearest top-right corner sample r(W, −1) and the nearest bottom-left corner sample r(−1, H) in vertical and horizontal predictions $p_{ver,i}$ and $p_{hor,i}$ as follows:

$$p_{ver,i}(x,y) = (H-1-y) \cdot r(x,-1-i) + (y+1) \cdot r(-1, H)$$

$$p_{hor,i}(x,y) = (W-1-x) \cdot r(-1-i, y) + (x+1) \cdot r(W, -1)$$

Another embodiment defines to include the corner reference samples in the horizontal and vertical predictions as well with distance-dependent weighting. The farer away the extended reference area gets, i.e. the larger the parameter i gets, the more top-left corner samples are available for the prediction. For i=0 it is one sample r(−1, −1), i.e., adjacent to the prediction block or with distance 0, for i>0 there are i vertical corner samples r(−1−i,y) with y=−1 . . . −1−i, i horizontal corner samples r(x, −1−i) with x=−1 . . . −1−i and the corner sample r(−1−i, −1−i). One implementation according to an embodiment defines to average the horizontal and vertical corner samples (both including the corner sample) and include it with a distance-dependent weighting by a( ) and b( ) in the vertical and horizontal predictions be as follows:

$$p_{ver,i}(x, y) =$$
$$a(y) \frac{\sum_{x_0=-1}^{-1-i} r(x_0, -1-i)}{i+1} + b(y) \cdot r(x, -1-i) + (y+1) \cdot r(-1-i, H)$$
with $a(y) + b(y) = (H - 1 - y)$ $$p_{hor,i}(x, y) =$$
$$a(x) \frac{\sum_{y_0=-1}^{-1-i} r(-1-i, y_0)}{i+1} + b(x) \cdot r(-1-i, y) + (x+1) \cdot r(W, -1-i)$$
with $a(x) + b(x) = (W - 1 - x)$ Another embodiment is a combination of the two previous embodiments using the nearest top-right sample, the nearest bottom-left sample and the extended corner samples.

The DC prediction calculates the average of the reference sample values DC and sets every prediction sample p(x, y) inside a W×H block equal to the average:

$$p(x,y) = DC \text{ with } x = 0 \ldots W-1, y = 0 \ldots H-1$$

For the average value DC, only N samples left and M samples right to the prediction block can be used where N can be set to the height H and M can be set to the width W:

$$DC = \frac{1}{M+N}\left(\sum_{n=0}^{N-1} r(-1, n) + \sum_{m=0}^{M-1} r(m, -1)\right)$$

For extended reference samples, the average value DC depend on the reference area index i:

$$DC_i = \frac{1}{M+N}\left(\sum_{n=0}^{N-1} r(-1-i, n) + \sum_{m=0}^{M-1} r(m, -1-i)\right)$$

In one embodiment, the corner sample(s) to the top left of the prediction block can be used in the average as well:

$$DC_i = \frac{1}{M+N+1+2i}\left(\sum_{n=-i}^{N-1} r(-1-i, n) + \sum_{m=-i-1}^{M-1} r(m, -1-i)\right)$$

Angular prediction calculates the prediction samples by deriving them along a specified direction or angle. The simplest prediction directions are horizontal, vertical and three diagonal ones which are illustrated in FIG. 4a to FIG. 4e showing examples of five angular intra-picture prediction angles for a 4×2 block of prediction samples. It can be seen that the reference samples along each direction point to a full (integer) sample position. The modification for extended reference samples (in green) as described in literature is straightforward and just extends the direction. Although the size of the block of prediction samples is 4×2, angular intra prediction can be extended to arbitrary block sizes.

According to embodiments, a finer prediction angle granularity may be used, such that a direction can point to non-integer samples positions. These may be generated by interpolation using the nearest integer sample positions. Interpolation can be done using a simple bilinear filter or more advanced filters, for example cubic or Gaussian 4-tap filters.

For the prediction angles between horizontal and vertical, e.g. the diagonal top-left angle and all angles in between, reference samples from the left and top are used to generate the prediction. A reference sample projection may be used to facilitate such generation. For all vertical angles between diagonal top-left and vertical, the top reference samples can be seen as the main reference and the left samples can be seen as side reference. For all horizontal angles between horizontal and diagonal top-left, the left reference samples can be seen as the main reference and the top reference sample can be seen as the side reference. In order to simplify the computation, i.e. to not switch between main reference sample calculation and side reference sample calculation, the side reference samples are projected along the prediction angle to extend the line of main reference samples. Each reference sample r(x, −1) left to the top main reference or r(−1, y) above the left main reference is projected onto a corresponding side reference sample according to the inverse prediction angle. Depending on the prediction angle, the projection can point to a sub-sample position.

Figure 5C:
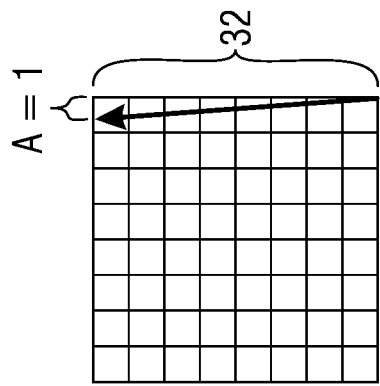
FIG. 5a-5c show an embodiment in connection with an angular prediction using a definition of an angle parameter.
Figure 5B:
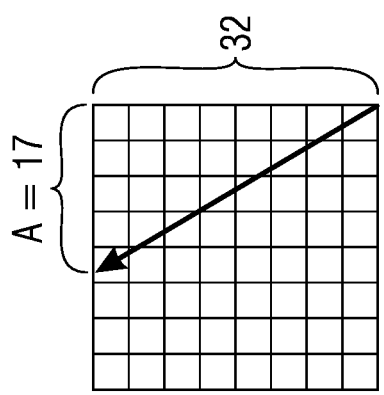
Figure 5A:
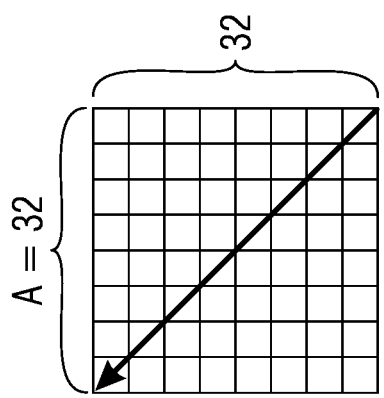

FIG. 5a to FIG. 5c show an embodiment in connection with an angular prediction using a definition of an angle parameter A given in 1/32 sample accuracy for the top-left diagonal prediction angle and two other vertical angles. The following embodiment assumes 1/32 sample accuracy and vertical prediction angles between vertical and top-left diagonal, wherein any other vales may be implemented. The 33 prediction angles range can be described by an angle parameter A ranging from 0 (vertical) to 32 (top-left diagonal) as illustrated in FIG. 5a to FIG. 5c. A may be referred to as a distance along a second picture direction with respect to a given first picture extension such as 32 samples. In FIG. 5a A is 32 samples, i.e., 32 resulting in an angle of 450 based on a picture extension of 32 samples along the picture direction perpendicular to A. In FIG. 5b, A=17 and in FIG. 5c, A=1.

Based on the angle parameter A, the vertical offset verOffset(x) into the left side reference column for each main reference sample r(x, −1) can be calculated as follows:

$$verOffset(x) = \left(x * \text{round}\left(\frac{256 * 32}{A}\right) + 128\right) \gg 8$$

$$r(-1-x, -1) = r(-1, -1 + verOffset(x)) \text{ with } x = 1 \ldots maxOffset - 1$$

$$maxOffset = \text{ceil}\left(\frac{A * H}{32}\right)$$

Figure 6C:
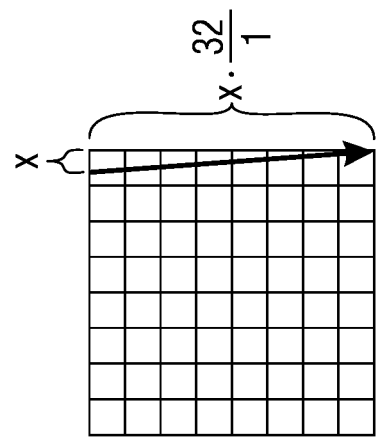
FIG. 6a-6c show a derivation of a vertical offset in connection with mapping reference samples according to embodiments.
Figure 6B:
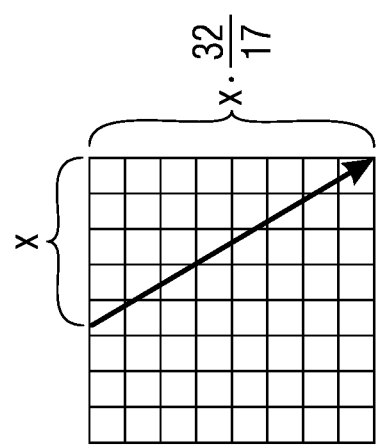
Figure 6A:
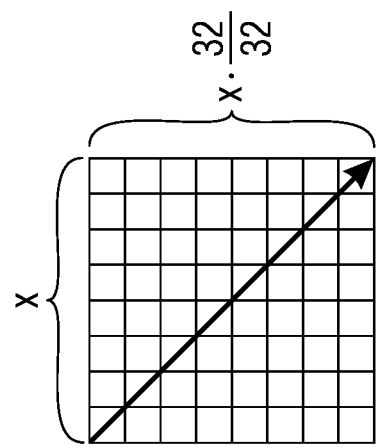

The derivation of the vertical offset verOffset(x) and the maximum horizontal offset maxOffset based on the parameter A is illustrated in FIG. 6a to FIG. 6c and FIG. 7a to FIG. 7c, wherein FIG. 6a to FIG. 6c show a calculation of the vertical offset given horizontal displacement x for top-left horizontal prediction angles with A=32, 17, 1 according to FIG. 5a to FIG. 5c.

Figure 7C:
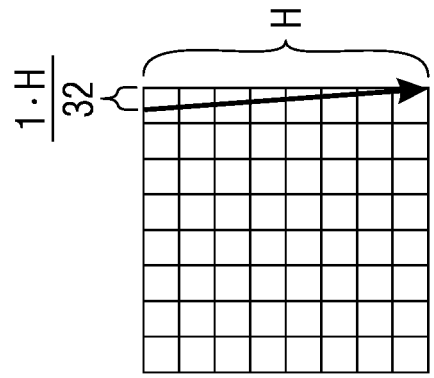
FIG. 7a-7c show a derivation of a horizontal offset according to an embodiment.
Figure 7B:
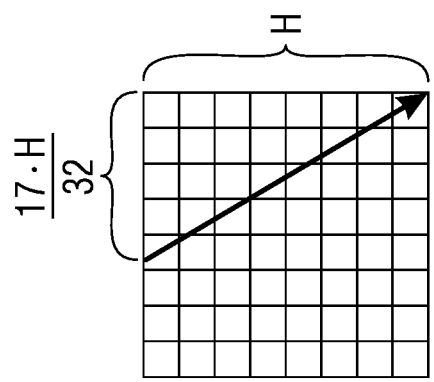
Figure 7A:
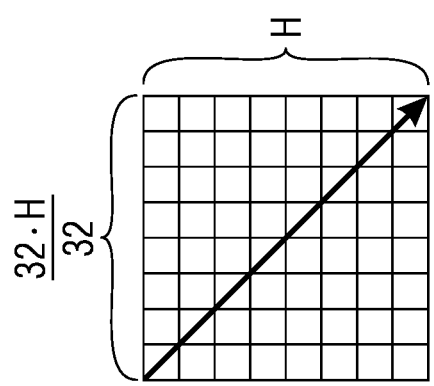

FIG. 7a to FIG. 7c show a calculation of maximum horizontal offset maxOffset given the height H of the prediction block for top-left horizontal prediction angles with A=32, 17, 1.

In the embodiment, the nearest integer reference sample is used instead of the sub-sample position by rounding the vertical offset. This facilitates the computation. However, it is also possible to project the interpolated sub-sample side reference sample.

Figure 8:
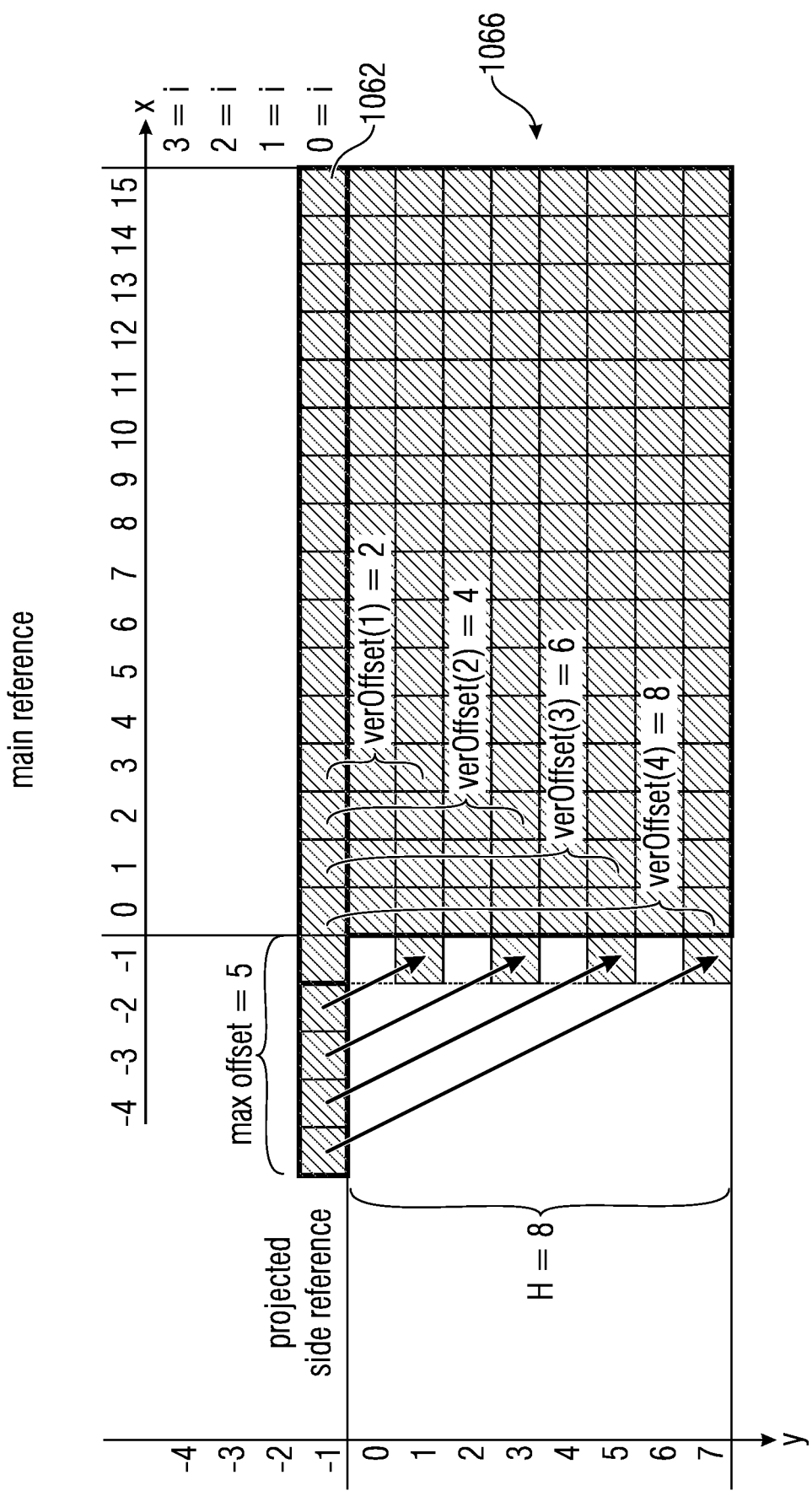
FIG. 8 shows an embodiment for a diagonal top-left angle and a use of nearest reference samples according to an embodiment.

FIG. 8 shows an embodiment for the diagonal top-left angle (A=17) and the nearest reference samples. With a height of eight samples (H=8), it can be seen that four (maxOffset−1) left reference samples can be projected along the diagonal direction to extend the main reference sample line, i.e. nearest top reference samples. According to embodiments the illustrated size of pictures, blocks, slices or the like are given as example only and may comprise any other values.

FIG. 8 shows an example projection of nearest left reference samples as side reference next to the nearest top reference samples as main reference in case of a top-left horizontal direction with angle parameter A=17 according to an embodiment.

For extended reference samples with reference area index i, the projection can be adapted as follows:

$$verOffset(x) = \left(x * \text{round}\left(\frac{256 * 32}{A}\right) + 128\right) \gg 8$$

$$r(-1-i-x, -1-i) =$$
$$\quad r(-1-i, -1 + verOffset(x)) \text{ with } x = 1 \ldots maxOffset - 1$$

$$maxOffset = \text{ceil}\left(\frac{A * (H+i)}{32}\right) - i$$

Figure 9:
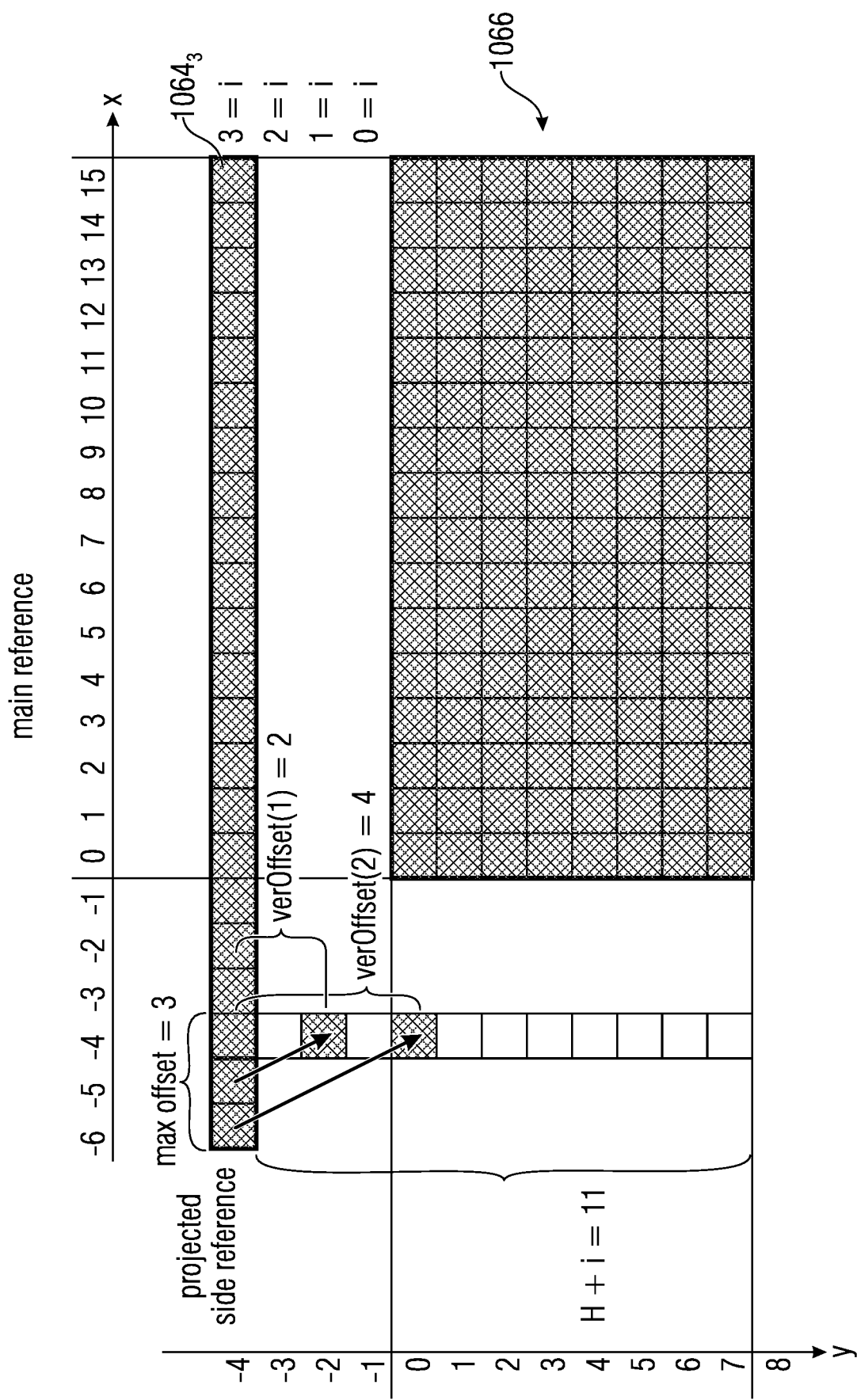
FIG. 9 shows an example projection of extended left reference samples as side reference next to the extended top reference samples as main reference in case of top-left diagonal prediction according to an embodiment.

FIG. 9 shows the embodiment for the diagonal top-left angle (A=17) and a height of eight samples (H=8) using the extended reference line with i=3. Here, two (maxOffset−1)

left reference samples can be projected along the diagonal direction to extend the main reference sample line, i.e. nearest top reference samples.

FIG. 9 shows an example projection of extended left reference samples as side reference next to the extended top reference samples as main reference in case of top-left diagonal prediction with angle parameter A=17 according to an embodiment.

When reference samples from the left and top are used, extended reference samples allow to combine nearest and extended references samples. This embodiment of the straight-forward approach from FIG. 9 allows to make use of the extended references samples along the main direction, i.e. main reference, where the larger distance of reference samples can be beneficial in case of occlusion or an edge on the nearest reference samples. However, for the side reference the correlation between the samples to be predicted and the nearest reference samples can be higher than between the extended reference samples and the samples to be predicted.

For example, one way to combine the extended main reference samples r(x, −1−i) with the nearest side reference samples r(−1, y) can be formulated as follows:

$$verOffset(x) = \left(x * \text{round}\left(\frac{256*32}{A}\right) + 128\right) \gg 8$$

$$r(-1-i-x, -1-i) = r(-1-i, -1+verOffset(x))$$

with $x = 1 \ldots maxOffset - 1$ and $verOffset(x) > i$ $$maxOffset = \text{ceil}\left(\frac{A*(H+i)}{32}\right)$$

Figure 10:
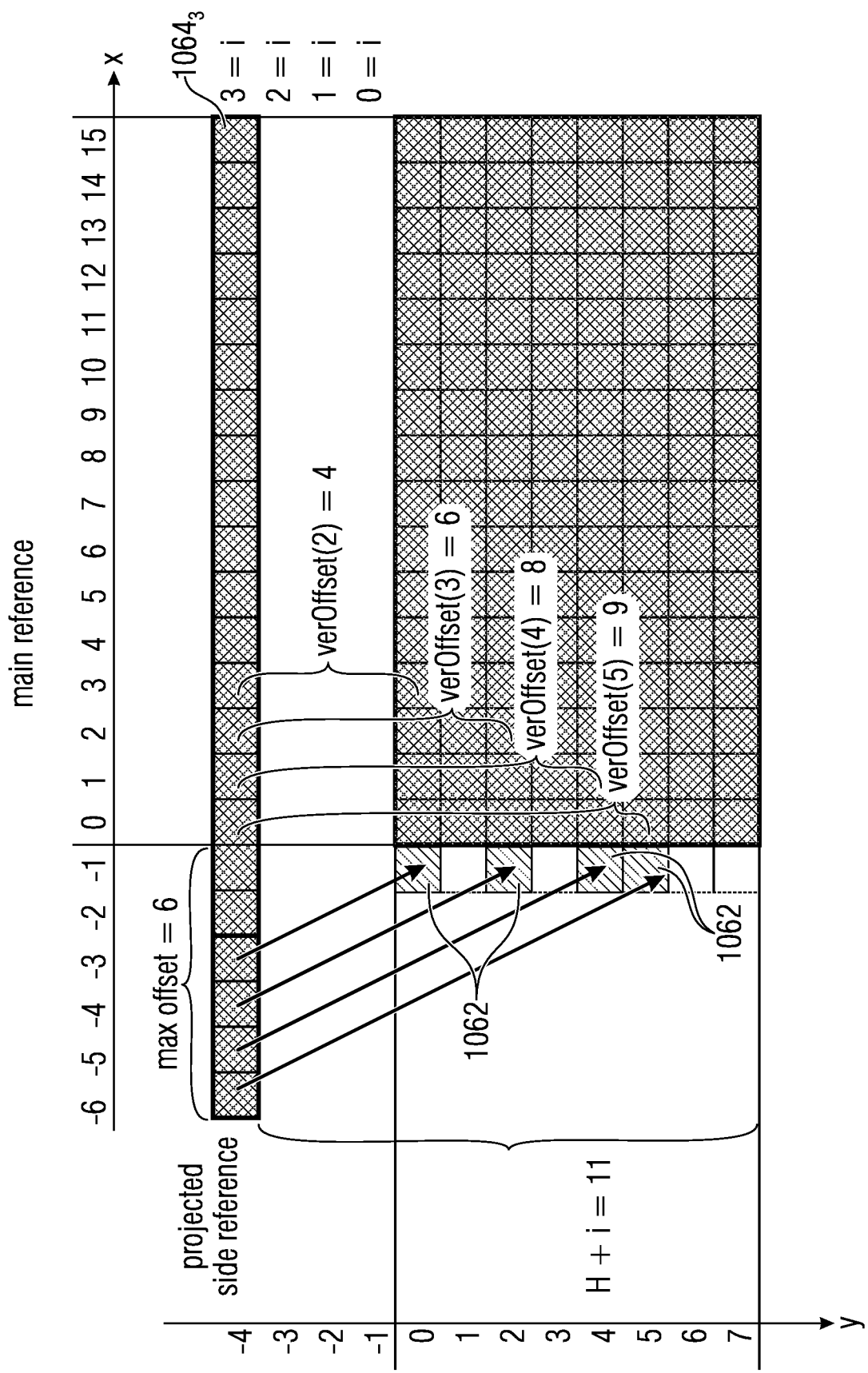
FIG. 10 shows an example projection of nearest left reference samples as side reference next to the extended top reference samples according to an embodiment.

This combination is illustrated in FIG. 10 based on the same embodiment as described in connection with the previous figures. Here, the extended reference samples $1064_3$ arranged in a line are used for the main reference samples (top) within the prediction direction (vertical) while the nearest reference samples 1062 arranged in a column can be used for the side reference samples that are projected to the extended reference sample line (top row) along the prediction direction to extend the main reference sample line.

FIG. 10 shows an example projection of nearest left reference samples as side reference next to the extended top reference samples as main reference in case of top-left diagonal prediction with angle parameter A=17. According to the embodiment of FIG. 10, nearest reference samples are used as source for generating extended reference samples, i.e., the nearest reference samples are mapped to extended reference samples. Alternatively, extended reference samples may be mapped to extended reference samples, see FIG. 9.

A video encoder according to an embodiment such as video encoder 1000 may be configured to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples. The video encoder is configured to boundary filtering in a mode where no extended samples are used; and not to use boundary filtering when extended samples are used; or to boundary filtering at least a subset of the plurality of nearest reference samples and not using boundary filtering for the extended samples.

A corresponding video decoder may be configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one reference sample of the plurality of reference samples. The video decoder is configured to boundary filtering in a mode where no extended samples are used; and not to use boundary filtering when extended samples are used; or to boundary filtering at least a subset of the plurality of nearest reference samples and not using boundary filtering for the extended samples.

Since the extended reference samples are not directly neighboring the prediction sample, discontinuities on specific block boundaries may not be as severe as when the nearest reference samples are used. Therefore, it is beneficial to perform a prediction filtering according to:
  Not perform boundary filtering operations in case extended reference samples are used, or
  Modify boundary smoothing by using the nearest reference samples instead of the extended reference samples.

With the extended predictions, it is possible to combine predictions from nearest and extended reference samples so as to obtain a combined prediction. In literature, a fixed combination of a prediction using the nearest reference samples with a prediction using extended reference samples with predetermined weights is described. In this case both prediction use the same prediction mode for all reference areas and signaling the mode also signals the combination of the predictions. On one hand this reduces the signaling overhead to indicate the reference sample area but it also removes the flexibility to combine two different prediction modes with two different reference samples areas. Possible combinations that allow for more flexibility are detailed in the following.

A video encoder according to an embodiment such as video encoder 1000 may be configured to encode, by block based predictive encoding, pictures of a video into coding data, wherein the block based predictive encoding comprises an intra-picture prediction; to determine, in the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples; to determine a prediction for the prediction block using the extended reference samples; to filter the extended reference samples so as to obtain a plurality of filtered extended reference samples. The video encoder is configured to combine the prediction and the filtered extended reference samples so as to obtain a combined prediction for the prediction block.

The video encoder may be configured to combine the prediction and extended reference samples being arranged in a major diagonal or minor diagonal of samples with respect to the prediction block.

The video encoder may be configured to combine the prediction and the extended reference samples based on the determination rule:

$$p_c(x, y) = \frac{\frac{c_1^{(v)}}{2^{\lfloor \frac{y}{d_y} \rfloor}} r(x, -1-i) - \frac{c_2^{(v)}}{2^{\lfloor \frac{y}{d_y} \rfloor}} r(-1-i, -1-i) + \frac{c_1^{(h)}}{2^{\lfloor \frac{x}{d_x} \rfloor}} r(-1-i, y) - \frac{c_2^{(h)}}{2^{\lfloor \frac{x}{d_x} \rfloor}} r(-1-i, -1-i) + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $r(-1-i, -1-i)$ for i>0 is an extended corner reference sample of the plurality of extended reference samples with respect to a boundary of the prediction block and $b(x,y)$ denotes a normalization factor.

The normalization factor may be determined based on the determination rule:

$$b(x, y) = 128 - \frac{c_1^{(v)}}{2^{\lfloor \frac{y}{d_y} \rfloor}} + \frac{c_2^{(v)}}{2^{\lfloor \frac{y}{d_y} \rfloor}} - \frac{c_1^{(h)}}{2^{\lfloor \frac{x}{d_x} \rfloor}} + \frac{c_2^{(h)}}{2^{\lfloor \frac{x}{d_x} \rfloor}}$$

The video encoder may be configured to filter the extended reference samples so as to obtain filtered extended reference samples ($r(x, -1-i)$, $r(-1-i,y)$, $r(-1-i, -1-i)$ for i>0) (combined) using one of a 3-tap filter, a 5-tap filter and a 7-tap filter and to use the filtered extended reference samples for the prediction.

The video encoder may be configured to use a combination of extended corner reference samples of the prediction block and of extended reference samples being arranged in a corner region of reference samples ($r(-1-i, -1-i)$).

The video encoder may be configured to obtain the combined prediction based on the determination rule:

$$p_c(x, y) = \frac{\frac{c_1^{(v)}}{2^{\lfloor \frac{y}{d_y} \rfloor}} r(x, -1-i) - \frac{c_2^{(v)}}{2^{\lfloor \frac{y}{d_y} \rfloor}} \frac{\sum_{x_0=1}^{-1-i} r(x_0, -1-i)}{i+1} + \frac{c_1^{(h)}}{2^{\lfloor \frac{x}{d_x} \rfloor}} r(-1-i, y) - \frac{c_2^{(h)}}{2^{\lfloor x/d_x \rfloor}} \frac{\sum_{y_0=1}^{-1-i} r(-1-i, y_0)}{i+1} + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $$\frac{\sum_{y_0=1}^{-1-i} r(-1-i, y_0)}{i+1} \text{ for } i > 0$$

are the combined extended corner reference samples with respect to a boundary of the prediction block and $b(x,y)$ denotes a normalization factor.

The video encoder may be configured to obtain the prediction $p(x,y)$ based on an intra-picture prediction.

The video encoder may be configured to use only planar prediction as intra-picture prediction.

The video encoder may be configured, for each encoded video block, to determine a parameter set identifying the combination of the prediction and the filtered extended reference samples. The video encoder may be configured to determine the parameter set identifying the combination of the prediction and the filtered extended reference samples using a look-up table containing sets for different block sizes of the prediction block.

A corresponding video decoder may be configured to decode, by block based predictive decoding, pictures coded in coding data into a video, wherein the block based predictive decoding comprises an intra-picture prediction; to determine, in the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples; to determine a prediction for the prediction block using the extended reference samples; to filter the extended reference samples so as to obtain a plurality of filtered extended reference samples; and to combine the prediction and the filtered extended reference samples so as to obtain a combined prediction for the prediction block.

The video decoder may be configured to combine the prediction and extended reference samples being arranged in a major diagonal or minor diagonal of samples with respect to the prediction block.

The video decoder may be configured to combine the prediction and the extended reference samples based on the determination rule:

$$p_c(x, y) = \frac{\frac{c_1^{(v)}}{2^{\lfloor \frac{x}{d_y} \rfloor}} r(x, -1-i) - \frac{c_2^{(v)}}{2^{\lfloor \frac{y}{d_y} \rfloor}} r(-1-i, -1-i) + \frac{c_1^{(h)}}{2^{\lfloor \frac{x}{d_x} \rfloor}} r(-1-i, y) - \frac{c_2^{(h)}}{2^{\lfloor \frac{x}{d_x} \rfloor}} r(-1-i, -1-i) + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $r(-1-i, -1-i)$ for i>0 is an extended corner reference sample of the plurality of extended reference samples with respect to a boundary of the prediction block and b(x,y) denotes a normalization factor.

The normalization factor may be determined based on the determination rule:

$$b(x, y) = 128 - \frac{c_1^{(v)}}{2^{\lfloor y/d_y \rfloor}} + \frac{c_2^{(v)}}{2^{\lfloor y/d_y \rfloor}} - \frac{c_1^{(h)}}{2^{\lfloor x/d_x \rfloor}} + \frac{c_2^{(h)}}{2^{\lfloor x/d_x \rfloor}}$$

The video decoder may be configured to filter the extended reference samples so as to obtain filtered extended reference samples (r(x, −1−i), r(−1−i,y), r(−1−i, −1−i) for i>0) (combined) using one of a 3-tap filter, a 5-tap filter and a 7-tap filter and to use the filtered extended reference samples for the prediction.

The video decoder may be configured to use a combination of extended corner reference samples of the prediction block and of extended reference samples being arranged in a corner region of reference samples (r(−1−i, −1−i)).

The video decoder may be configured to obtain the combined prediction based on the determination rule:

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} \frac{\sum_{x_0=-1}^{-1-i} r(x_0, -1-i)}{i+1} + \frac{c_1^{(h)}}{2^{\lfloor x/d_x \rfloor}} r(-1-i, y) - \frac{c_2^{(h)}}{2^{\lfloor x/d_x \rfloor}} \frac{\sum_{y_0=-1}^{-1-i} r(-1-i, y_0)}{i+1} + b(x, y) \cdot p(x, y) + 64}{128}$$

wherein $p_c(x,y)$ denotes the combined prediction for coordinates x and y in the prediction block, p(x,y) denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, r(x, −1−i) for i>0 is the extended top reference sample at horizontal position x, r(−1−i,y) for i>0 is the extended left reference sample at vertical position y and $$\frac{\sum_{y_0=-1}^{-1-i} r(-1-i, y_0)}{i+1}$$

for i>0 are the combined extended corner reference samples with respect to a boundary of the prediction block and b(x,y) denotes a normalization factor.

The video decoder may be configured to obtain the prediction p(x,y) based on an intra-picture prediction. The video decoder may use, for example, only planar prediction as intra-picture prediction.

The video decoder may be configured, for each decoded video block, to determine a parameter set identifying the combination of the prediction and the filtered extended reference samples.

The video decoder may be configured to determine the parameter set identifying the combination of the prediction and the filtered extended reference samples using a look-up table containing sets for different block sizes of the prediction block.

When the reference samples are filtered, it is possible to combine the prediction that uses the filtered samples with the unfiltered reference samples based on a position of the respective samples o as to obtain a position depending prediction combination. Let, according to an example embodiment, p(x, y) be the prediction using filtered reference samples and r(x,y) be the unfiltered reference samples. The combined prediction $p_c(x, y)$ can be calculated as follows:

$$p_c(x, y) = \frac{\frac{c_1^{(v)}}{2^{\lfloor y/d_y \rfloor}} r(x, -1) - \frac{c_2^{(v)}}{2^{\lfloor y/d_y \rfloor}} r(-1, -1) + \frac{c_1^{(h)}}{2^{\lfloor x/d_x \rfloor}} r(-1, y) - \frac{c_2^{(h)}}{2^{\lfloor x/d_x \rfloor}} r(-1, -1) + b(x, y) \cdot p(x, y) + 64}{128}$$

The coefficients $c_1^v$, $c_2^v$, $c_1^h$, $c_2^h$ are stored prediction weights that are scaled by position dependent terms where $d_x=1$ for blocks with width smaller than or equal to 16 and $d_x=2$ for blocks with width larger than 16, $d_y=1$ for blocks with height smaller than or equal to 16 and $d_y=2$ for blocks with height larger than 16. The normalization factor b(x, y) may be derived as follows:

$$b(x, y) = 128 - \frac{c_1^{(v)}}{2^{\lfloor y/d_y \rfloor}} + \frac{c_2^{(v)}}{2^{\lfloor y/d_y \rfloor}} - \frac{c_1^{(h)}}{2^{\lfloor x/d_x \rfloor}} + \frac{c_2^{(h)}}{2^{\lfloor x/d_x \rfloor}}$$

As already described in connection with the reference sample filtering, the reference sample filtering for this combination can be different from the filtering for regular predictions. For example, one of e.g., three or less or more pre-defined low pass filters can be used to smooth the boundary samples. The three pre-defined low-pass filters can include one 3-tap, one 5-tap and one 7-tap filter. In order to adapt the smoothing to the content, the selection of smoothing filter can be based on the block size and the intra prediction mode. Defining $h_k$ as the impulse response of a filter k, and an additional stored weighting parameter a, the filtered reference r' is computed from the non-filtered reference r as follows where "*" represents convolution:

$$r' = a \cdot r + (1-a)(h_k * r)$$

Accounting again for different characteristics of different block sizes, one fixed set of prediction parameters ($c_1^v$, $c_2^v$, $c_1^h$, $c_2^h$, a and filter index k) can be defined per block size.

This known combination for nearest reference samples can be improved by embodiments by using extended reference samples for the filtered and unfiltered reference samples. In the following, a prediction combination according to an embodiment and with extended reference samples is shown where the nearest corner sample r(−1, −1) is replaced by the extended corner sample r(−1−i, −1−i) as follows.

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} r(-1-i, -1-i) + \frac{c_1^{(h)}}{2^{\lfloor x/d_x \rfloor}} r(-1-i, y) - \frac{c_2^{(h)}}{2^{\lfloor x/d_x \rfloor}} r(-1-i, -1-i) + b(x, y) \cdot p(x, y) + 64}{128}$$

Another embodiment for extended reference samples refers to replace the nearest corner sample r(−1, −1) with the closed extended vertical corner sample r(−1−i, −1) and horizontal corner sample r(−1, −1−i) as follows:

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} r(-1, -1-i) + \frac{c_1^{(h)}}{2^{\lfloor x/d_x \rfloor}} r(-1-i, y) - \frac{c_2^{(h)}}{2^{\lfloor x/d_x \rfloor}} r(-1-i, -1) + b(x, y) \cdot p(x, y) + 64}{128}$$

Another embodiment for extended reference samples defines to replace the nearest corner sample r(−1, −1) with an average of the horizontal and vertical corner samples (both including the corner sample) as follows.

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} \frac{\sum_{x_0=-1}^{-1-i} r(x_0, -1-i)}{i+1} + \frac{c_1^{(h)}}{2^{\lfloor x/d_x \rfloor}} r(-1-i, y) - \frac{c_2^{(h)}}{2^{\lfloor x/d_x \rfloor}} \frac{\sum_{y_0=-1}^{-1-i} r(-1-i, y_0)}{i+1} + b(x, y) \cdot p(x, y) + 64}{128}$$

In one embodiment, the prediction p(x,y) to be combined is a planar prediction. In another embodiment, the combination can be applied to other intra-picture predictions such as DC or angular as well.

Alternatively or in addition, to combine a prediction with samples, different extended prediction modes may be combined.

A video encoder according to an embodiment such as video encoder 1000 may be configured to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set, the subset being associated with the plurality of extended reference samples. The video encoder may be configured to weightedly ($w_0$; $w_i$) combine the first prediction ($p_0(x,y)$) and the second prediction ($p_i(x,y)$) so as to obtain a combined prediction (p(x,y)) as prediction for the prediction block in the coding data.

The video encoder may be configured to use the first prediction and the second prediction according to a pre-defined combination being a portion of possible combinations of enabled first prediction modes and enabled second prediction modes.

The video encoder may be configured to signal either the first prediction mode or the second prediction mode whilst not signaling the other prediction mode. For example, the first mode may be derived from the parameter i based on additional implicit information such as specific prediction modes that only may be used in connection with a specific index i or index m.

The video encoder may be configured to exclusively use, as an example for such implicit information, a planar prediction mode as one of the first prediction mode and the second prediction mode.

The video encoder may be configured to adapt a first weight applied to the first prediction in the combined prediction and a second weight applied to the second prediction in the combined prediction based on a block size of the prediction block; and/or to adapt the first weight based on the first prediction mode or the second weight based on the second prediction mode.

The video encoder may be configured to adapt a first weight applied to the first prediction in the combined prediction and a second weight applied to the second prediction in the combined prediction based on a position and/or distance in the prediction block.

The video encoder may be configured to adapt the first weight and the second weight based on the determination rule $$p(x,y)=w_0(x,y)p_0(x,y)+w_i(x,y)p_i(x,y)$$

wherein $w_0(x,y)$ is the first weight based on the position x,y in the prediction block, $w_i$ is the second weight based on the position x,y in the prediction block, $p_0(x,y)$ is the first prediction for the position x,y and $p_i(x,y)$ is the second prediction for the position x,y, and i indicates the extended reference samples to be used for the second prediction.

A corresponding video decoder may be configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set, the subset being associated with the plurality of extended reference samples. The video decoder may be configured to weightedly ($w_0;w_i$) combine the first prediction ($p_0(x,y)$) and the second prediction ($p_i(x,y)$) so as to obtain a combined prediction ($p(x,y)$) as prediction for the prediction block in the coding data.

The video decoder may be configured to use the first prediction and the second prediction according to a predefined combination being a portion of possible combinations of enabled first prediction modes and enabled second prediction modes. This allows to obtain a low load of signaling.

The video decoder may be configured to receive a signal indicating the second prediction mode whilst not receiving a signal indicating the first prediction mode and to derive the first prediction mode from the second prediction mode or a parameter information (i).

The video decoder may be configured to exclusively use a planar prediction mode as one of the first prediction mode and the second prediction mode.

The video decoder may be configured to adapt a first weight applied to the first prediction in the combined prediction and a second weight applied to the second prediction in the combined prediction based on a block size of the prediction block; and/or to adapt the first weight based on the first prediction mode or the second weight based on the second prediction mode.

The video decoder may be configured to adapt a first weight applied to the first prediction in the combined prediction and a second weight applied to the second prediction in the combined prediction based on a position and/or distance in the prediction block.

The video decoder may be configured to adapt the first weight and the second weight based on the determination rule $$p(x,y)=w_0(x,y)p_0(x,y)+w_i(x,y)p_i(x,y)$$

wherein $w_0(x,y)$ is the first weight based on the position x,y in the prediction block, $w_i$ is the second weight based on the position x,y in the prediction block, $p_0(x,y)$ is the first prediction for the position x,y and $p_i(x,y)$ is the second prediction for the position x,y, and i indicates the extended reference samples to be used for the second prediction. For a varying position x,y in the prediction block, the extended reference samples i may comprise varying distances. Alternatively or in addition, different sets of predefined extended reference samples, indicated by the area index i and/or by mode m may comprise different distances to the prediction block.

When using different reference sample areas, it is possible to combine the prediction $p_0(x, y)$ using the nearest reference samples modes with a prediction $p_i(x,y)$ using the extended reference samples i as follows:

$$p(x,y)=w_0p_0(x,y)+w_ip_i(x,y)$$

One known way to combine the predictions is with fixed weights and using the same prediction mode for both predictions. This eliminates the need to signal a second prediction mode.

An embodiment to loosen this tight restriction defines to allow only specific combinations of modes. This still involves signaling of the second mode but it limits the number of mode to signal compared to the first mode. More details on prediction mode signaling are given in connection with mode and reference signaling. One promising combination according to an embodiment is to use only planar as second mode so that an additional signaling of intra modes is obsolete. For example, one could use $p_i(x, y)$ with an arbitrary intra mode as first part of the weighted sum and the second part is generated by using the nearest reference samples and planar mode. Another possibility is to switch the order, i.e. the planar mode is used for the extended reference samples. In order to adapt the weighting to the prediction size and mode, the weights w can be specified separately per block size as well as per intra prediction mode. Furthermore, the weights can be signaled on a sequence, picture or slice level to be able to adapt the combination to the video content. Another embodiment is to weight the different reference sample predictions differently for different areas inside the prediction block. This may result in position-dependent weights $w(x, y)$ as follows:

$$p(x,y)=w_0(x,y)p_0(x,y)+w_i(x,y)p_i(x,y)$$

In case of using one prediction and extended reference samples, it is state of the art to signal the prediction mode and the reference area index i that is used, i.e., to perform mode and reference area signaling. In the following, embodiments to prediction mode coding in case of using one and/or more predictions are presented followed by embodiments to extended reference area index coding.

A video encoder according to an embodiment such as video encoder 1000 may be configured 1000 to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples, for example to use only the nearest sample or at least in absence of extended reference samples; or being one of a second set of prediction modes for predicting the prediction block using the extended reference samples; wherein the second set of prediction modes is a subset of the first set of prediction modes, the second subset may be determined by the encoder; wherein a subset may also include a coincidence of both sets. The video encoder may be configured to signal a mode information (m) indicating the prediction mode used for predicting the prediction block; and to afterwards signal a parameter information (i) indicating a subset of the extended reference samples used for the prediction mode if the prediction mode is contained in the second set of prediction modes; and to skip signaling the parameter information when the used prediction mode is not contained in the second set of prediction modes, thereby allowing the conclusion that the parameter i has a predefined value such as 0.

The video encoder may be configured to skip signaling the parameter information, when the mode information indicates a DC mode or a planar mode.

A corresponding video decoder may be configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples, for example to use only the nearest sample or at least in absence of extended reference samples; or being one of a second set of prediction modes for predicting the prediction block using the extended reference samples. The second set of prediction modes is a subset of the first set of prediction modes and may be determined and/or signaled by the encoder. Being a subset may include a coincidence of both sets. The video encoder may be configured to receive a mode information (m) indicating the prediction mode used for predicting the prediction block; and afterwards receive a parameter information (i) indicating a subset of the extended reference samples used for the prediction mode thereby indicating that the prediction mode is contained in the second set of prediction modes; and to determine that the used prediction mode is not contained in the second set of prediction modes when not receiving the parameter information and to determine a use of the nearest reference samples for the prediction.

The video decoder may be configured to determine the mode information as indicating a use of a DC mode or a planar mode when not receiving the parameter information.

When the set of allowed intra prediction modes for extended reference samples is restricted, i.e. a subset of the allowed intra prediction modes for nearest reference samples, there are two different ways to signal the mode m and the index i, e.g., when the subset is referred to as restricted prediction modes for the extended reference samples:

1. Signal mode m before index i so that the index signaling can depend on the mode m as follows:
   a. If the mode m is not in the set of allowed modes for extended reference samples, the signaling of the index i is skipped and the prediction mode m is applied to the nearest reference samples (i=0)
   b. Otherwise, i is signaled and the prediction mode m is applied to the reference samples indicated by i.
2. Signal index i before the mode m so that the mode signaling can depend in the index i as follows:
   a. If i indicates to use extended reference samples (i>0), the set of allowed modes m to be signaled is equal to the restricted one.
   b. Otherwise (i=0), the set of allowed modes m to be signaled is equal to the unrestricted set of modes For example, if the mode m is signaled using most probable mode (MPM) coding with an index to the MPM list, the modes that are not in the allowed set of modes are not included in the MPM list.

I.e., according to a second option that may be implemented alternatively or in addition, a video encoder according to an embodiment such as video encoder 1000 may be configured to encode, by block based predictive encoding, pictures of a video into coding data, wherein the block based predictive encoding comprises an intra-picture prediction; to use, for the intra-picture prediction, for encoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes; to signal a parameter information (i) indicating a subset of the plurality of reference samples used for the prediction mode, the subset of the plurality of reference samples comprising nearest reference samples only or extended reference samples; and to afterwards signal a mode information (m) indicating the prediction mode used for predicting the prediction block, wherein the mode information indicates a prediction mode from a subset of modes, the subset being restricted to a set of allowed prediction modes according to the parameter information (i).

For both options, the video decoder be adapted such that the extended reference samples in modes contained in the second set of prediction modes are used in addition to the nearest reference samples.

Further, the video encoder may be adapted such that the first set of prediction modes describes prediction modes allowed for being used with the nearest reference samples, wherein the second set of prediction modes describes prediction modes of the first set of prediction modes being also allowed for being used with the extended reference samples.

A range of values of the parameter information i.e., a domain of values that may be represented by the area index i, may cover a use of the nearest reference values only and a use of different subsets of extended reference values. As described in connection with FIG. 11, i may represent a use of nearest reference values only (i=0) a specific set of extended reference values or a combination of sets (e.g., lines and/or columns or distances) of extended reference values.

According to an embodiment, different portions of extended reference samples comprise a different distance to the prediction block.

The video encoder may be configured to set the parameter information to one of a predefined number of values, the value indicating a number and a distance of reference samples used for the prediction mode.

The video encoder may be configured to determine the first set of prediction modes and/or the second set of prediction modes based on a most probable mode coding.

A corresponding decoder of the second option is configured to decode, by block based predictive decoding, pictures coded in coding data into a video, wherein the block based predictive decoding comprises an intra-picture prediction; to use, for the intra-picture prediction, for decoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples; to use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes; to receive a parameter information (i) indicating a subset of the plurality of reference samples used for the prediction mode, the subset of the plurality of reference samples comprising nearest reference samples only or an extended reference samples; and to afterwards receive a mode information (m) indicating the prediction mode used for predicting the prediction block, wherein the mode information indicates a prediction mode from a subset of modes, the subset being restricted to a set of allowed prediction modes according to the parameter information (i).

A decoder according to the first option and/or the second option may be adapted such that the extended reference samples in modes contained in the second set of prediction modes are used in addition to the nearest reference samples, for example by combining prediction and samples and/or combining predictions.

The first set of prediction modes may describe prediction modes allowed for being used with the nearest reference samples, wherein the second set of prediction modes may describe prediction modes of the first set of prediction modes being also allowed for being used with the extended reference samples.

As described for the encoder, a range of values of the parameter information covers a use of the nearest reference values only and a use of different subsets of extended reference values.

Different portions of extended reference samples may comprise a different distance to the prediction block.

The video decoder may be configured to set the parameter information to one of a predefined number of values, the value indicating a number and a distance of reference samples used for the prediction mode.

The video decoder may be configured to determine the first set of prediction modes and/or the second set of prediction modes based on a most probable mode (MPM) coding, i.e., it may generate a respective list, wherein the list may be adapted so as to contain such modes only that are allowed for the respective samples to be used.

Alternatively or in addition, embodiments relating to combining predictions from nearest and extended reference samples may be implemented.

A video encoder according to an embodiment such as video encoder 1000 may be configured to encode, by block based predictive encoding, pictures of a video into coding data, wherein the block based predictive encoding comprises an intra-picture prediction; to use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; to determine a second prediction for the prediction block using a second prediction mode of a second set of prediction modes, the second set of prediction modes comprising a subset of the prediction modes of the first set being associated with the plurality of extended reference samples, and to combine the first prediction and the second prediction so as to obtain a combined prediction as prediction for the prediction block in the coding data.

The prediction block may be a first prediction block, wherein the video encoder may be configured to predict a second prediction block of the video using a plurality of nearest reference samples associated with the second prediction block in absence of a plurality of extended reference samples associated with the second prediction block. The video encoder may be configured to signal a combining information such as a bipred flag indicating that the prediction in the coding data is based on a combination of predictions or is based on a prediction using the plurality of extended reference samples in absence of the plurality of nearest reference samples.

The video encoder may be configured to use the first prediction mode as a predefined prediction mode.

The video encoder may be configured to select the first prediction mode as being a same mode as the second prediction mode and using the nearest reference samples in absence of the extended reference samples; or to use the first prediction mode as preset prediction mode such as a planar prediction mode.

A corresponding video decoder may be configured to decode, by block based predictive decoding, pictures coded in coding data into a video, wherein the block based predictive decoding comprises an intra-picture prediction; to use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples; to determine a first prediction for the prediction block using a first prediction mode of a set of prediction modes, the first set of prediction modes comprising prediction modes using the plurality of nearest reference samples in absence of the extended reference samples; and to determine a second prediction for the prediction block using a second prediction mode of a second set of prediction modes, the second set of prediction modes comprising a subset of the prediction modes of the first set being associated with the plurality of extended reference samples. The video decoder may be configured to combine the first prediction and the second prediction so as to obtain a combined prediction as prediction for the prediction block in the coding data.

The prediction block may be a first prediction block, wherein the video decoder may be configured to predict a second prediction block of the video using a plurality of nearest reference samples associated with the second prediction block in absence of a plurality of extended reference samples associated with the second prediction block. The video decoder may further be configured to receive the combining information indicating that the prediction in the coding data is based on a combination of predictions or is based on a prediction using the plurality of extended reference samples in absence of the plurality of nearest reference samples and do decode the coding data accordingly.

The video decoder may be configured to use the first prediction mode as a predefined prediction mode.

The video decoder may be configured to select the first prediction mode as being a same mode as the second prediction mode and using the nearest reference samples in absence of the extended reference samples; or to use the first prediction mode as preset prediction mode such as the planar mode.

If the reference area index i indicates the use of extended reference samples (i>0), a respective information such as binary information or a flag, referred to hereinafter as Bi-Prediction flag (bipred flag) may be used to signal whether the prediction using extended reference samples is combined with a prediction using nearest reference samples.

If the bipred flag indicates a combination of predictions from nearest (i=0) and extended reference samples (i>0), the mode for the extended reference samples mi is signaled either before the reference area index i or after as described herein. The mode for the nearest reference sample prediction $m_0$ is fixed, e.g. set to a specific mode like planar or set to the same mode as for the extended reference samples.

As will be described in the following, a video encoder according to an embodiment may be configured to encode, by block based predictive encoding, pictures of a video into coding data, wherein the block based predictive encoding comprises an intra-picture prediction; to use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and to use the plurality of extended reference samples according to a predefined set of pluralities of extended reference samples, i.e., a list of area indices may be generated and/or used, the list indicating specific subsets of reference samples, such as nearest reference samples only, at least one distance of extended reference samples and/or a combination of different distances of extended reference samples.

The video encoder may be configured to determine the predefined set of pluralities of extended reference samples such that pluralities in the set differ with respect to each other by a number or combination of lines and/or rows of samples of the picture to be used as reference samples.

The video encoder may be configured to determine the predefined set of pluralities of extended reference samples based on a block size of the prediction block and/or a prediction mode used to predict the prediction block.

The video encoder may be configured to determine the set of pluralities of extended reference samples for a block size of the prediction block being at least a predefined threshold and to skip signaling the set of pluralities of extended reference samples when the block size is below the predefined threshold value.

The predefined threshold may be a predefined number of samples along a width or height of the prediction block and/or a predefined aspect ratio of the prediction block along the width and the height.

The predefined number of samples may be of any number but is advantageously 8. Alternatively or in addition, the aspect ratio may greater than 1/4 and less than 4, probably based on the number of 8 samples defining one quotient of the aspect ratio.

The video encoder may be configured to predict the prediction block as a first prediction block using the plurality of extended reference samples and to predict a second prediction block (that may be part of the same or a different picture) not using extended reference samples, wherein the video encoder is configured to signal a predefined set of pluralities of extended reference samples associated with the first prediction block and to not signal a predefined set of extended reference samples in associated with the second prediction block. The predefined set may be indicated by the reference area index i, for example.

The video encoder may be configured to signal, for each prediction block, information indicating one of a specific plurality of a set of pluralities of extended reference samples and a use of nearest reference samples only before information indicating the intra-picture prediction mode.

The video encoder may be configured to signal the information indicating the intra-picture prediction so as to thereby indicate prediction modes that are in accordance with the indicated specific plurality of the set of pluralities of extended reference samples or in accordance with the indicated use of nearest reference samples, only.

A corresponding video decoder may be configured to decode, by block based predictive decoding, pictures coded in coding data into a video, wherein the block based predictive decoding comprises an intra-picture prediction; to use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and to use the plurality of extended reference samples according to the predefined set of pluralities of extended reference samples.

The video decoder may be configured to determine the predefined set of pluralities of extended reference samples such that pluralities in the set differ with respect to each other by a number or combination of lines and/or rows of samples of the picture to be used as reference samples.

The video decoder may be configured to determine the predefined set of pluralities of extended reference samples based on a block size of the prediction block and/or a prediction mode used to predict the prediction block.

The video decoder may be configured to determine the set of pluralities of extended reference samples for a block size of the prediction block being at least a predefined threshold and to skip using the set of pluralities of extended reference samples when the block size is below the predefined threshold value.

For example, the signaling of the set (which may use a parameter information i or similar syntax) may be skipped if the top-left sample of the current block at location (x0,y0) is located in the first row inside a coding tree block (CTB). A CTB may be considered as the basic processing unit into which a picture is partitioned and which is the root of further block sub-partitioning.

This may be done by checking whether the vertical y-coordinate y0 is not a multiple of the CTB size. E.g., when the CTB size is 64 luma samples, in the first CTB row, the above blocks inside a CTB have y0=0, in the second CTB row, they have y0=64 and so on. So for all blocks inside a CTB, that are located at the upper boundary of this CTB (which can be checked e.g. by a modulo operation as follows: y0% CtbSizeY==0), the signaling of the parameter i or similar syntax may be skipped.

The predefined threshold may accordingly be the predefined number of samples along a width or height of the prediction block and/or a predefined aspect ratio of the prediction block along the width and the height.

Thus, the predefined number of samples may be 8 and/or the aspect ratio may be needed to be greater than 1/4 and at less than 4.

The video decoder may be configured to predict the prediction block as a first prediction block using the plurality of extended reference samples and to predict a second prediction block not using extended reference samples, wherein the video decoder is configured to receive information indicating a predefined set of pluralities of extended reference samples associated with the first prediction block, for example, using the area index i, and to determine a predefined set of extended reference samples in associated with the second prediction block in absence of a respective signal.

The video decoder may be configured to receive, for each prediction block, information indicating a one of a specific plurality of a set of pluralities of extended reference samples and a use of nearest reference samples only before information indicating the intra-picture prediction mode.

The video decoder may be configured to receive the information indicating the intra-picture prediction so as to thereby indicate prediction modes that are in accordance with the indicated specific plurality of the set of pluralities of extended reference samples or in accordance with the indicated use of nearest reference samples, only.

The reference area index can be changed per block and hence, the index can be transmitted in the bitstream for every prediction block it applies to. Embodiments relate to an extended reference sample area signaling so as to allow the decoder to use the correct samples. The area may correspond to the parameter i indicating the extended reference samples or nearest reference samples. In order to trade-off signaling and the use of further distanced extended reference samples, a predetermined set of extended reference sample lines can be used. For example, only two additional extended reference lines can be used which are the lines with index 1 and 3. The set according to the embodiment may be I=0{, 1,3} with |I|=3. This allows the reference sample area to be extended up to three additional lines but only need signaling for two. The set could also be extended to four lines, e.g. I={0,1,3,4} and only the first MaxNumRefAreaIdx elements are used while MaxNumRefAreaIdx can be fixed or signaled on a sequence, picture or slice level. The index n into a set I can be signaled in the bitstream using entropy coding and a truncated unary code as shown in the table illustrated in FIG. 11 showing an example truncated unary code for a specific set of reference areas for MaxNumRefAreaIdx equal to 3 and 4.

In order to account for different spatial characteristics of different block sizes, the set of reference sample lines can also depend on the prediction block size and/or intra prediction mode. In another embodiment, the set contains only one additional line with index 2 for small blocks and two lines with index 1 and 3 lines larger blocks. An embodiment for an intra-prediction mode dependent set selection is to have a different set of reference sample lines for prediction directions between the horizontal and the vertical directions.

By selecting an empty set for smaller block sizes which does not need signaling, the signaling of the reference area index could also be restricted to larger block sizes. This may basically disable the use of extended reference samples for smaller block sizes. In one embodiment the use of extended reference samples could be restricted to a block with both width W and height H being larger or equal to 8. In addition to that, blocks with one side being smaller than or equal to one fourth of the other side could also be excluded from using extended reference samples, e.g. 32×8 blocks or, based on the mentioned symmetry, 8×32 blocks. FIG. 12*a* and FIG. 12*b* illustrate this embodiment where some block sizes are already excluded for intra-picture prediction (FIG. 12*a*) in general as indicated by reference sign 1102 and blocks shaded accordingly. In this embodiment it is assumed that intra-picture prediction slices and inter-picture prediction slices allow different block size combinations. Samples 1104 and blocks shaded accordingly are not allowed for extended reference samples, i.e., for i>0. FIG. 12*a* and FIG. 12*b* show example restrictions for extended reference samples for intra-picture prediction slices and inter-picture prediction slices. As may be seen, allowance or restriction of a block dependent from a block size, in particular from an aspect ratio of the block may be symmetric for quotients W/H and H/W.

In case there exist other intra-prediction modes that do not use extended reference samples, the reference area index is only signaled if a prediction mode that uses extended reference samples is signaled. Another way may be to signal the reference area index before all other intra mode information is signaled. In case the reference area index i indicates extended references samples (i>0), the signaling of mode information that does not use extended reference samples (e.g. template matching or trained predictors) can be skipped. This can also skip signaling information of specific transforms that do not apply to prediction residuals for predictions that use extended reference samples.

In the following reference is made to embodiments referring to considerations for parallel coding.

A video encoder according to an embodiment may be configured to encode, by block based predictive encoding a plurality of prediction blocks, pictures of a video into coding data, wherein the block based predictive encoding comprises an intra-picture prediction; to use, for the intra-picture prediction, for encoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block; wherein the video encoder may be configured to determine the extended reference samples so as to be at least partially a part of an adjacent prediction block of the plurality of prediction blocks, and to determine that the adjacent prediction block has not yet been predicted; and to signal information indicating the extended prediction samples associated to the prediction block and arranged in the adjacent prediction block as unavailable samples.

The video encoder may be configured to encode the pictures by parallel encoding lines of blocks according to a wavefront approach, and to predict the prediction block based on an angular prediction, wherein the video encoder is configured to determine the extended reference samples to be used for predicting the prediction block so as to be arranged in already predicted blocks of the picture. According to the wavefront approach a coding or decoding of a second line may trail a decoding of a first line, e.g., separated by one block. For example, in a vertical angular mode of 45° at most one block above right may be coded decoded when starting from the second line.

The video encoder may be configured to signal the extended prediction samples associated to the prediction block and arranged in the adjacent prediction block variantly as unavailable samples or available samples on a sequence level, i.e., a sequence of pictures, a picture level or a slice level, the slice being a part of a picture.

The video encoder may be configured to signal the information indicating the extended prediction samples associated to the prediction block and arranged in the adjacent prediction block as unavailable samples together with information indicating a parallel coding of the picture.

A corresponding decoder may be configured to decode, by block based predictive decoding, pictures coded in coding data into a video, wherein for each picture a plurality of prediction blocks is decoded, wherein the block based predictive decoding comprises an intra-picture prediction; to use, for the intra-picture prediction, for decoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block; wherein the video decoder is configured to determine the extended reference samples so as to be at least partially a part of an adjacent prediction block of the plurality of prediction blocks, and to determine that the adjacent prediction block has not yet been predicted; and to receive information indicating the extended prediction samples associated to the prediction block and arranged in the adjacent prediction block as unavailable samples.

The video decoder may be configured to decode the pictures by parallel decoding lines of blocks according to a wavefront approach, and to predict the prediction block based on an angular prediction, wherein the video decoder is configured to determine the extended reference samples to be used for predicting the prediction block so as to be arranged in already predicted blocks of the picture.

The video decoder may be configured to receive information indicating the extended prediction samples associated to the prediction block and arranged in the adjacent prediction block variantly as unavailable samples or available samples on a sequence level, a picture level or a slice level.

The video decoder may be configured to receive the information indicating the extended prediction samples associated to the prediction block and arranged in the adjacent prediction block as unavailable samples together with information indicating a parallel decoding of the picture.

Figure 13:
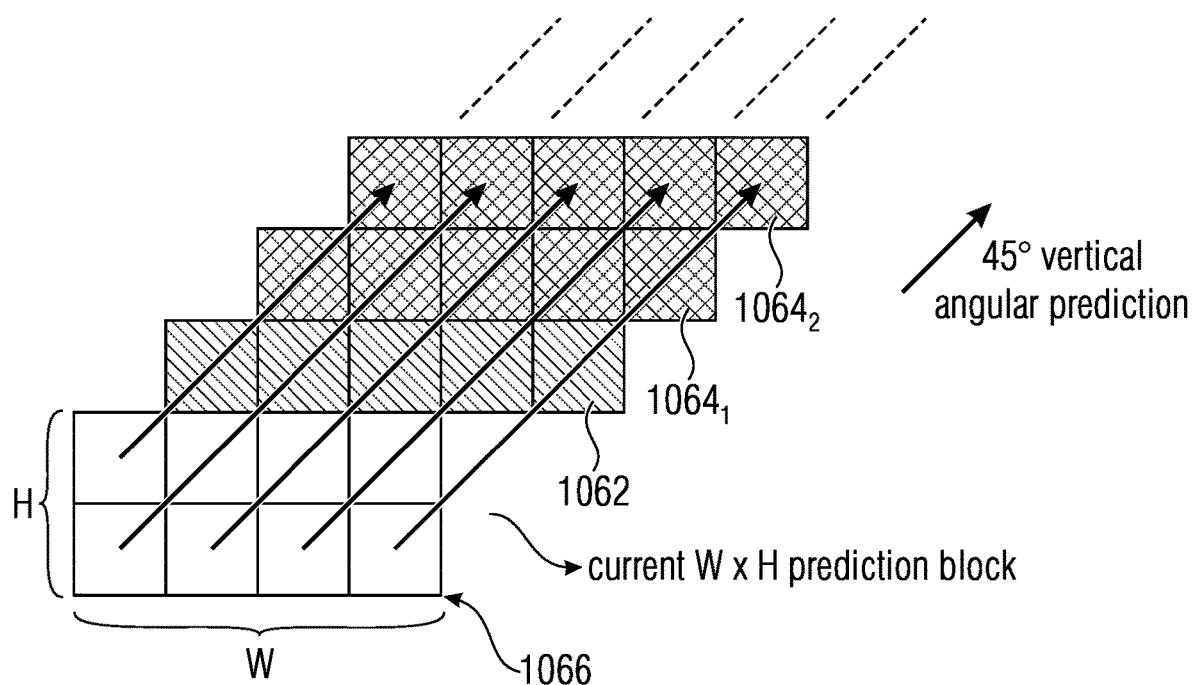
FIG. 13 shows a schematic diagram according to an embodiment of vertical angular prediction with an angle of 45 degree of a prediction block.

In angular intra-picture prediction, reference samples are copied into the current prediction area along a specified direction. In case that this direction points to the top right, the needed reference sample area also shifts to the right the larger the distance to the prediction area boundary gets. FIG. 13 shows an embodiment of vertical angular prediction with an angle of 45 degree of an W×H prediction block. It can be seen that nearest reference sample area (blue) extends H samples to the top right of the current W×H block. Extending the prediction to more distant reference sample areas, the extended reference samples (green) extend H+1, H+2, . . . samples to the top right of the current W×H block.

Figure 14A:
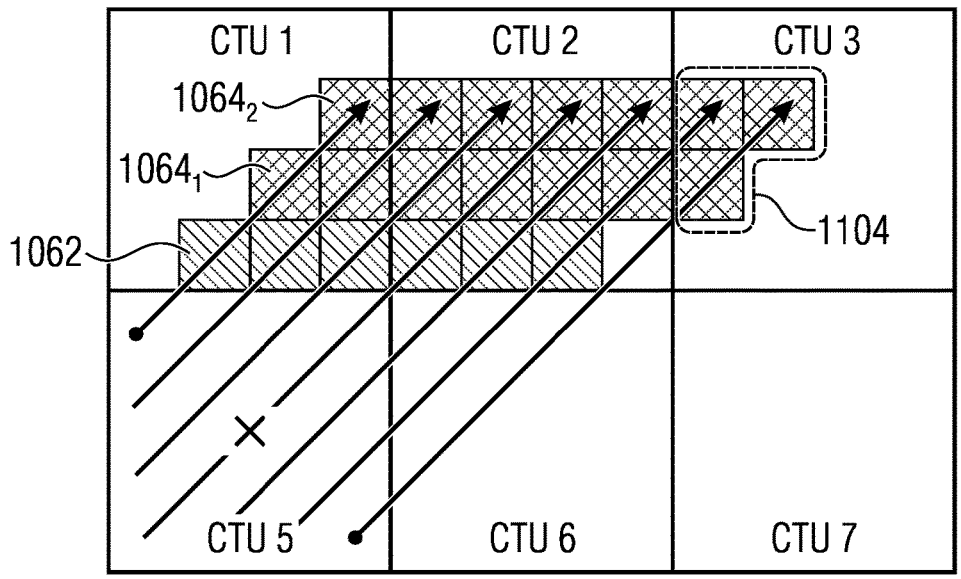
FIG. 14a-b show an example of needed nearest reference samples and extended reference samples in case of diagonal vertical intra-picture prediction and according to an embodiment.
Figure 14B:
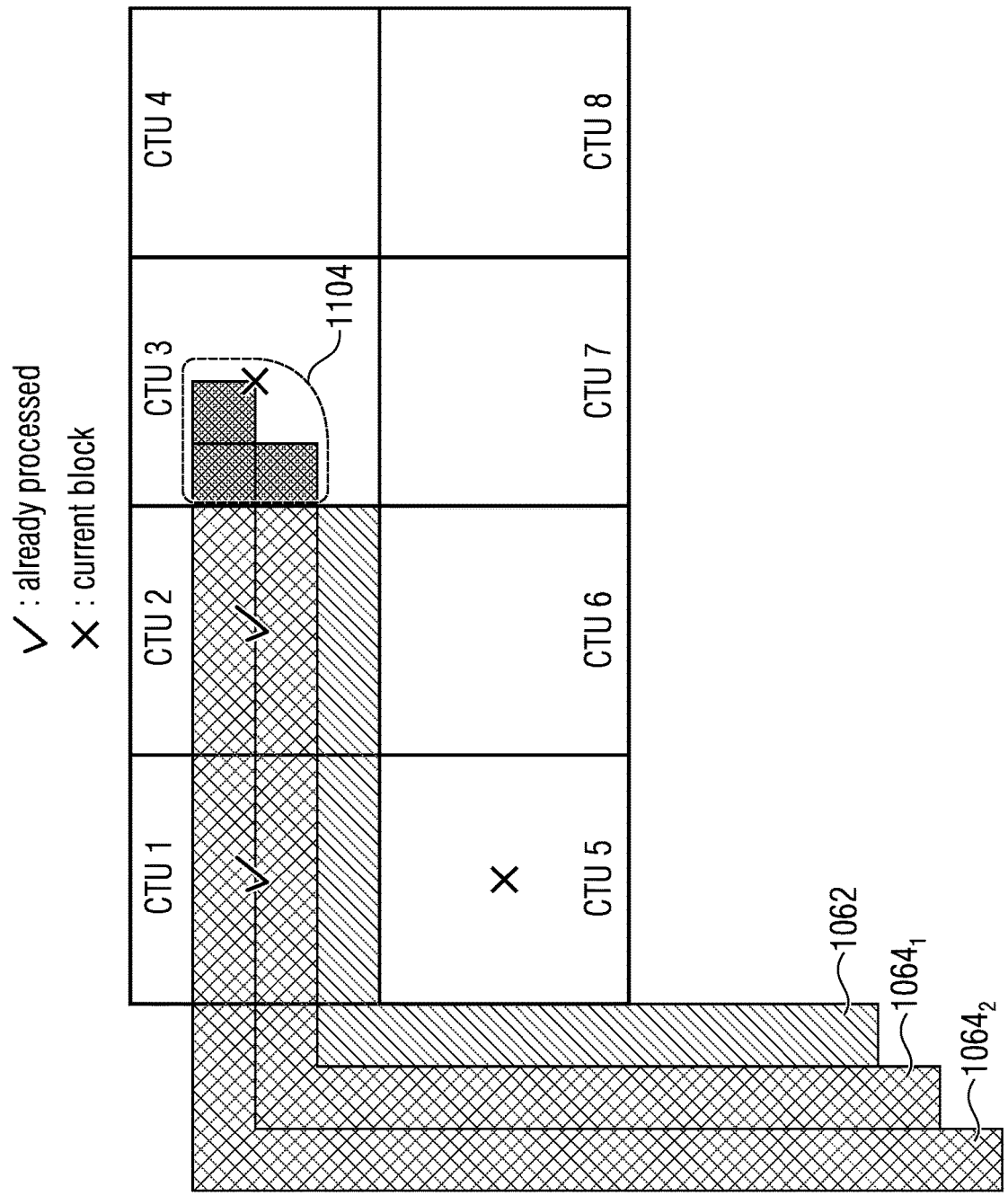

When for example square Coding Tree Units (CTU) are used as basic processing unit, the maximum intra prediction block size can be equal to the maximum block size, i.e. the CTU block size N×N. FIG. 14*a* and FIG. 14*b* illustrate the embodiment from FIG. 13 with the W×H prediction block being equal to the N×N CTU block size. Correspondingly, the extended reference samples $1064_1$ and/or $1064_2$ span over the top right CTU (CTU 2) and reach at least one sample into the next CTU (CTU 3). I.e., a portion of the extended reference samples $1064_1$ and/or $1064_2$ of the 45° vertical angular prediction may be arranged in unprocessed CTU 3. Those samples may be unavailable if CTU3 and CTU5 are processed in parallel.

FIG. 14*a* and FIG. 14*b* show an example of needed nearest reference samples 1062 and extended reference samples 1064 in case of diagonal vertical intra-picture prediction.

In FIG. 14*b*, two CTU lines can be seen. When encoding the two lines in parallel using a wavefront-like approach, the encoding of the second CTU line can start with CTU 5 once CTU 2 is encoded and the encoding of CTU 3 starts. In this case, 45-degree vertical angular prediction with extended reference samples cannot be used in CTU 5 since some reference samples 1104 are located inside CTU 3. The following approaches can solve this problem:

1. Mark extended reference inside a next basic processing area as unavailable as described in connection with present embodiments. That way they can be treated like other unavailable reference samples, e.g. at picture, slice or tile boundaries or when constrained intra prediction is used that disallows using samples from inter-picture predicted areas as reference for intra-picture prediction areas.
2. Allow using extended reference samples only for areas and intra-picture prediction modes so the reference samples do not extend to more than one basic processing unit to the top right of the current area.

Both approaches can be made switchable by a high-level flag on a sequence, picture or slice level. That way, the encoder can signal the decoder to apply the restrictions in case it is needed by the parallel processing scheme of the encoder. In case that it is not needed, the encoder can signal the decoder that no restrictions apply.

Another way is to combine the signaling for both restriction with the signaling of parallel encoding schemes. For example, when wavefront parallel processing is enabled and signaled in the bitstream, the restriction on extended reference samples also apply.

In the following, some advantageous embodiments are described.

1. In one embodiment, intra prediction is using two additional reference lines with reference sample area index i=1 and i=3 (see FIG. 3). For these extended reference samples lines, only angular prediction as described herein are allowed. The signaling of the reference sample area index i is performed as described in connection with FIG. 11 with MaxNumRefAreaIdx=3 and signaled before signaling the intra prediction mode. When the reference area index is not equal to 0, i.e. extended reference lines are used, DC and planar intra prediction modes are not used. In order to avoid unnecessary signaling, DC and planar modes are excluded from the intra prediction mode signalization. The intra prediction mode can be coded using an index to a list of most probable modes (MPM). The MPM list contains a fixed number of prediction mode candidates which are derived from neighboring blocks. When the neighboring blocks are coded using the nearest reference lines (i=0), they can use DC or planar mode and hence, the MPM list derivation process is modified to not include DC and planar mode. If removed, DC and planar modes can be replaced by horizontal, vertical and bottom left diagonal angular modes to fill up the list (see FIG. 4a to FIG. 4e). This is done in a way to avoid redundancies, e.g. when the first candidate mode derived from a neighboring block is vertical and the second candidate mode is DC, the DC mode is not replaced by a vertical mode but by horizontal since it is not in the list yet. Another way to prevent unnecessary signaling of DC and planar mode in case of i>0 is to signal the reference area index i after the prediction mode and condition the signaling of i on the prediction mode. If the intra prediction mode is equal to DC or planar, no index i is signaled. However, the previous described method is advantageous over this method since this one introduces a parsing dependency in case the intra prediction mode is signaled using an index to an MPM list. In order to be able to parse i, the intra prediction mode has to be reconstructed which needs MPM list derivation. MPM list derivation on the other hand refers to the prediction modes of the neighboring blocks which needs to be reconstructed before parsing i as well. This undesired parsing dependency is solved by signaling i before the prediction mode and modify the MPM list derivation accordingly as described above. A video encoder may be configured to determine a list of most probable prediction modes based on a use of the plurality of nearest reference samples or the use of the plurality of extended reference samples for the prediction mode, wherein the video encoder is configured to substitute prediction modes restricted for the used reference samples by modes allowed for the prediction mode. A corresponding video decoder may be configured to determine a list of most probable prediction modes based on a use of the plurality of nearest reference samples or the use of the plurality of extended reference samples for the prediction mode, wherein the video decoder is configured to substitute prediction modes restricted for the used reference samples by modes allowed for the prediction mode 2. In another embodiment, the intra prediction for extended reference samples is additionally restricted to be applied to luma samples only. I.e., the video encoder may be configured to apply prediction using extended reference samples to pictures comprising luma information only. Accordingly, the video decoder may be configured to apply prediction using extended reference samples to pictures comprising luma information only.

3. In another embodiment, the extended reference samples (i>0) that exceed the width and the height of the nearest reference samples (i=0), (see W+H in FIG. 3) are not generated by using already reconstructed samples (if available) but by padding from the last sample, e.g. r(23, −1−i) for the top-right samples or r(−1−i, 23) for the bottom-left samples in FIG. 3. This reduces the memory access for the extended reference sample lines. I.e., the video encoder may be configured to generate extended reference samples exceeding a width and/or a height of nearest reference samples along a first and a second image direction by padding from a closest extended reference sample. Accordingly, the video decoder may be configured to generate extended reference samples exceeding a width and/or a height of nearest reference samples along a first and a second image direction by padding from a closest extended reference sample.

4. In another embodiment, only every second angular mode can be used for extended reference samples. Consequently, the MPM list derivation is modified to exclude these modes as well in addition to DC and planar modes in case of i>0. I.e., the video encoder may be configured to predict the prediction using an angular prediction mode using only a subset of angles from possible angles of the angular prediction mode and to exclude unused angles from signaling encoding information to a decoder. Accordingly, the video decoder may be configured to predict the prediction using an angular prediction mode using only a subset of angles from possible angles of the angular prediction mode and to exclude unused angles from the prediction.

5. In another embodiment, the number of additional reference sample lines is increased to 3 (see FIG. 11 with MaxNumRefAreaIdx=4). I.e., the extended reference samples may be arranged in at least 2 lines and rows in addition to nearest reference samples, advantageously at least 3 lines and rows. Such configuration may be applied to the video encoder and decoder. The video encoder may be configured to use a specific plurality of a set of pluralities of extended reference samples for predicting the prediction block, wherein the video encoder is configured to select the specific plurality from the set of pluralities so as to comprise a lowest similarity of picture content when compared to a plurality of nearest reference samples extended by the set, i.e., to use associated reference samples, e.g., having the same reference area index. Accordingly, a video decoder may be configured to use a specific plurality of a set of pluralities of extended reference samples for predicting the prediction block, wherein the video decoder is configured to select the specific plurality from the set of pluralities so as to comprise a lowest similarity of picture content when compared to a plurality of nearest reference samples extended by the set.

6. In another embodiment, a flag that indicates whether extended reference samples are used is signaled instead of the index i. If the flag indicates that extended reference samples are used, the index i (i>0) is derived by calculating the similarity (e.g. using sum of absolute differences) between the reference line i>0 and the reference line i=0. The index i that results in the lowest similarity is chosen. The idea behind that is that the more correlated the extended reference samples (i>0) and the regular reference samples (i=0) are, the more correlated are the resulting predictions and hence there is no additional benefit from using the extended reference samples in prediction. I.e., the video encoder may be configured to signal a use of extended reference samples using a flag or other, probably binary, information. Accordingly, the video decoder may be configured to receive information indicating a use of extended reference samples by such a flag.

7. In another embodiment, a secondary transform like a non-separable secondary transform (NSST) can be applied after a first transform of the intra prediction residual. In case of extended reference sample lines, no secondary transform is performed and all signaling related to NSST is disabled in case of i>0. I.e., the video encoder may be configured to selectively use the extended reference samples or nearest reference samples only, wherein the video encoder is configured to transform a residual obtained by predicting the prediction block using a first transformation procedure so as to obtain a first transformation result and to transform the first transformation result using a second transformation procedure so as to obtain a second transformation result when the extended reference samples are unused for predicting the prediction block. This may also affect the signalling of whether a second transform is used, i.e. if the use of a second transform has to be signaled, the signaling may be skipped when extended reference samples are used. The video encoder may be configured to signal a use of the secondary transform; or to implicitly signal a non-use of the secondary transform when indicating a use of the extended reference samples and to not include information relating to a result of a secondary transform in the coding data.

Accordingly, the video decoder may be configured to selectively use the extended reference samples or nearest reference samples only, wherein the video decoder is configured to transform a residual obtained by predicting the prediction block using a first transformation procedure so as to obtain a first transformation result and to transform the first transformation result using a second transformation procedure so as to obtain a second transformation result when the extended reference samples are unused for predicting the prediction block. The video decoder may video decoder may be configured to receive information indicating a use of the secondary transform; or to derive a non-use of the secondary transform when indicating a use of the extended reference samples and to not receive information relating to a result of a secondary transform in the coding data.

8. In another embodiment, the prediction that uses extended reference samples (i>0) is combined with a planar prediction that uses the nearest reference samples (i=0). As outlined in connection with combining different extended prediction modes, i.e., using extended reference samples, the weighting can be fixed (e.g. 0.5 and 0.5), block-size dependent or signaled on a slice, picture or sequence level. In case extended reference samples are used (i>0), an additional flag indicates whether the combined prediction is applied or not. I.e., the video encoder may be configured to. Accordingly, the video decoder may be configured to 9. In another embodiment, the signaling of the combined prediction from above is omitted to reduce the signalization overhead. Instead, the decision of whether to apply the combined prediction is derived based on an analysis of the nearest reference samples (i=0). One possible analysis could be the flatness of the nearest reference samples. In case the nearest reference sample signal is flat (no edges), the combination is applied and if it contains high frequencies and edges, the combination is not applied. I.e., the video encoder may be configured to. Accordingly, the video decoder may be configured to In the following, additional embodiments and aspects of the invention will be described which can be used individually or in combination with any of the features and functionalities and details described herein 1. Video encoder configured to:
   encode, by block based predictive encoding, pictures of a video into coding data, wherein the block based predictive encoding comprises an intra-picture prediction;
   use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
   sequentially determine an availability or unavailability of each of the plurality of extended reference samples;
   substitute an extended reference sample being determined as unavailable by a substitution sample; and
   use the substitution sample for the intra-picture prediction.

2. The video encoder of aspect 1, wherein the video encoder is configured to:
   determine the availability or unavailability sequentially according to a sequence;
   determine the substitution sample as a copy a last extended reference sample being determined as available in the sequence; and/or
   determine the substitution sample as a copy a next extended reference sample being determined as available in the sequence.

3. The video encoder of aspect 2, wherein the video encoder is configured to:
   determine the availability or unavailability sequentially according to a sequence;
   determine the substitution sample based on a combination of an extended reference sample being determined as available and being arranged in the sequence prior to the reference sample being determined as unavailable and of an extended reference sample being determined as available and being arranged in the sequence after the reference sample being determined as unavailable.

4. The video encoder of one of previous aspects, wherein the video encoder is configured to:
   use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples
   determine an availability or unavailability of each of the plurality of extended reference samples;
   signal a use of the plurality of extended reference samples when a portion of available extended reference samples of the plurality of extended reference samples is larger than or equal a predetermined threshold; and
   skip signaling the use of the plurality of extended reference samples when the portion of available extended reference samples of the plurality of extended reference samples is below the predetermined threshold.

5. Video encoder configured to:
   encode, by block based predictive encoding, pictures of a video into coding data, wherein the block based predictive encoding comprises an intra-picture prediction;
   use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
   filtering at least a subset of the plurality of extended reference samples using a bilateral filter or a 3-tap FIR filter so as to obtain a plurality of filtered extended reference samples; and use the plurality of filtered extended reference samples for the intra-picture prediction.

6. The video encoder of aspect 5, wherein the video encoder is configured to filter the plurality of extended reference samples using one of a 3-tap filter, a 5-tap filter and a 7-tap filter.

7. The video encoder of aspect 6, wherein the video encoder is configured to predict the prediction block using an angular prediction mode; wherein the 3-tap filter, a 5-tap filter and a 7-tap filter are configured as bilateral filters, wherein the video encoder is configured to select to use one of the 3-tap filter, the 5-tap filter and the 7-tap filter based on an angle used for the angular prediction, the angle arranged between a horizontal or a vertical direction of the angular prediction mode; and/or wherein the video encoder is configured to select to use one of the 3-tap filter, the 5-tap filter and the 7-tap filter based on a block size of the prediction block.

8. The video encoder of aspect 7, wherein the video encoder is configured to select a filter with increasing taps for increasing angles with from to a horizontal direction or vertical direction towards a diagonal.

9. Video encoder configured to:
encode, by block based predictive encoding, pictures of a video into coding data, wherein the block based predictive encoding comprises an intra-picture prediction;
use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block;
map at least a part of the nearest reference samples arranged along the second direction to extended reference samples being arranged along the first direction, such that the mapped reference samples exceed an extension of the prediction block along the first picture direction; and
use the mapped extended reference samples for the prediction.

10. The video encoder of aspect 9, wherein the video encoder is configured to map the portion of nearest reference samples according to a prediction mode used for predicting the prediction block.

11. The video encoder of aspect 10, wherein the video encoder is configured to map the portion of nearest reference samples according to a direction used in the prediction mode for predicting the prediction block.

12. Video encoder configured to:
encode, by block based predictive encoding, pictures of a video into coding data, wherein the block based predictive encoding comprises an intra-picture prediction;
use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
wherein the video encoder is configured to boundary filtering in a mode where no extended samples are used; and not to use boundary filtering when extended samples are used; or
wherein the video encoder is configured to boundary filtering at least a subset of the plurality of nearest reference samples and not using boundary filtering for the extended samples.

13. Video encoder configured to:
encode, by block based predictive encoding, pictures of a video into coding data, wherein the block based predictive encoding comprises an intra-picture prediction;
determining, in the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
determining a prediction for the prediction block using the extended reference samples;
filtering the extended reference samples so as to obtain a plurality of filtered extended reference samples; and
combining the prediction and the filtered extended reference samples so as to obtain a combined prediction for the prediction block.

14. The video encoder of aspect 13, wherein the video encoder is configured to combine the prediction and extended reference samples being arranged in a major diagonal or minor diagonal of samples with respect to the prediction block.

15. The video encoder of aspect 13 or 14, wherein the video encoder is configured to combine the prediction and the extended reference samples based on the determination rule:

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} r(-1-i, -1-i) + \frac{c_1^{(h)}}{2^{\lfloor x/d_x \rfloor}} r(-1-i, y) - \frac{c_2^{(h)}}{2^{\lfloor x/d_x \rfloor}} r(-1-i, -1-i) + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $r(-1-i,$ −1−i) for i>0 is an extended corner reference sample of the plurality of extended reference samples with respect to a boundary of the prediction block and b(x,y) denotes a normalization factor.

16. The video encoder of aspect 15, wherein the normalization factor is determined based on the determination rule:

$$b(x, y) = 128 - \frac{c_1^{(v)}}{2^{\lfloor y/d_y \rfloor}} + \frac{c_2^{(v)}}{2^{\lfloor y/d_y \rfloor}} - \frac{c_1^{(h)}}{2^{\lfloor x/d_x \rfloor}} + \frac{c_2^{(h)}}{2^{\lfloor x/d_x \rfloor}}$$

17. The video encoder of one of aspects 13 to 16, wherein the video encoder is configured to filter the extended reference samples so as to obtain filtered extended reference samples (r(x, −1−i), r(−1−i,y), r(−1−i, −1−i) for i>0) (combined) using one of a 3-tap filter, a 5-tap filter and a 7-tap filter and to use the filtered extended reference samples for the prediction.

18. The video encoder of one of aspects 13 to 17, wherein the video encoder is configured to use a combination of extended corner reference samples of the prediction block and of extended reference samples being arranged in a corner region of reference samples (r(−1−i, −1−i)).

19. The video encoder of aspect 18, wherein the video encoder is configured to obtain the combined prediction based on the determination rule:

$$p_c(x, y) = \frac{\frac{c_1^{(v)}}{2^{\lfloor y/d_y \rfloor}}r(x, -1-i) - \frac{c_2^{(v)}}{2^{\lfloor y/d_y \rfloor}}\frac{\sum_{x_0=-1}^{-1-i} r(x_0, -1-i)}{i+1} + \frac{c_1^{(h)}}{2^{\lfloor x/d_x \rfloor}}r(-1-i, y) - \frac{c_2^{(h)}}{2^{\lfloor x/d_x \rfloor}}\frac{\sum_{y_0=-1}^{-1-i} r(-1-i, y_0)}{i+1} + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, r(x, −1−i) for i>0 is the extended top reference sample at horizontal position x, r(−1−i,y) for i>0 is the extended left reference sample at vertical position y and $$\frac{\sum_{y_0=-1}^{-1-i} r(-1-i, y_0)}{i+1}$$

for i>0 are the combined extended corner reference samples with respect to a boundary of the prediction block and b(x,y) denotes a normalization factor.

20. The video encoder of one of aspects 13 to 19, wherein the video encoder is configured to obtain the prediction p(x,y) based on an intra-picture prediction.

21. The video encoder of aspect 20, wherein the video encoder is configured to use only planar prediction as intra-picture prediction.

22. The video encoder of one of aspects 13 to 21, wherein the video encoder is configured, for each encoded video block, to determine a parameter set identifying the combination of the prediction and the filtered extended reference samples.

23. The video encoder of aspect 22, wherein the video encoder is configured to determine the parameter set identifying the combination of the prediction and the filtered extended reference samples using a look-up table containing sets for different block sizes of the prediction block.

24. Video encoder configured to:
   encode, by block based predictive encoding, pictures of a video into coding data, wherein the block based predictive encoding comprises an intra-picture prediction;
   use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
   determine a first prediction for the prediction block using a first prediction mode of a set of prediction modes, the first set of prediction modes comprising prediction modes using the plurality of nearest reference samples in absence of the extended reference samples;
   determining a second prediction for the prediction block using a second prediction mode of a second set of prediction modes, the second set of prediction modes comprising a subset of the prediction modes of the first set, the subset being associated with the plurality of extended reference samples,
   wherein the video encoder is configured to weightedly ($w_0$;$w_i$) combine the first prediction ($p_0(x,y)$) and the second prediction ($p_i(x,y)$) so as to obtain a combined prediction (p(x,y)) as prediction for the prediction block in the coding data.

25. The video encoder of aspect 24, wherein the video encoder is configured to use the first prediction and the second prediction according to a predefined combination being a portion of possible combinations of enabled first prediction modes and enabled second prediction modes.

26. The video encoder of aspect 24 or 25, wherein the video encoder is configured to signal either the first prediction mode or the second prediction mode whilst not signaling the other prediction mode.

27. The video encoder of one of aspects 24 to 26, wherein the video encoder is configured to exclusively use a planar prediction mode as one of the first prediction mode and the second prediction mode.

28. The video encoder of one of aspects 24 to 27, wherein the video encoder is configured to adapt a first weight applied to the first prediction in the combined prediction and a second weight applied to the second prediction in the combined prediction based on a block size of the prediction block; and/or adapt the first weight based on the first prediction mode or the second weight based on the second prediction mode.

29. The video encoder of one of aspects 24 to 28, wherein the video encoder is configured to adapt a first weight applied to the first prediction in the combined prediction and a second weight applied to the second prediction in the combined prediction based on a position.

30. The video encoder of aspect 29, wherein the video encoder is configured to adapt the first weight and the second weight based on the determination rule $$p(x,y) = w_0(x,y)p_0(x,y) + w_i(x,y)p_i(x,y)$$

wherein $w_0(x,y)$ is the first weight based on the position x,y in the prediction block, $w_i$ is the second weight based on the position x,y in the prediction block, $p_0(x,y)$ is the first prediction for the position x,y and $p_i(x,y)$ is the second prediction for the position x,y, and i indicates the extended reference samples to be used for the second prediction.

31. Video encoder configured to:
    encode, by block based predictive encoding, pictures of a video into coding data, wherein the block based predictive encoding comprises an intra-picture prediction;
    use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
    use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
    signal a mode information (m) indicating the prediction mode used for predicting the prediction block; and
    afterwards signal a parameter information (i) indicating a subset of the extended reference samples used for the prediction mode if the prediction mode is contained in the second set of prediction modes; and to skip signaling the parameter information when the used prediction mode is not contained in the second set of prediction modes.

32. The video encoder of aspect 31, wherein the video encoder is configured to skip signaling the parameter information, when the mode information indicates a DC mode or a planar mode.

33. Video encoder configured to:
    encode, by block based predictive encoding, pictures of a video into coding data, wherein the block based predictive encoding comprises an intra-picture prediction;
    use, for the intra-picture prediction, for encoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples;
    use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
    signal a parameter information (i) indicating a subset of the plurality of reference samples used for the prediction mode, the subset of the plurality of reference samples comprising nearest reference samples only or extended reference samples;
    afterwards signal a mode information (m) indicating the prediction mode used for predicting the prediction block, wherein the mode information indicates a prediction mode from a subset of modes, the subset being restricted to a set of allowed prediction modes according to the parameter information (i).

34. The video encoder of one of aspects 31 to 33, wherein the extended reference samples in modes contained in the second set of prediction modes are used in addition to the nearest reference samples.

35. The video encoder of one of aspects 31 to 34, wherein the first set of prediction modes describes prediction modes allowed for being used with the nearest reference samples, wherein the second set of prediction modes describes prediction modes of the first set of prediction modes being also allowed for being used with the extended reference samples.

36. The video encoder of one of aspects 31 to 35, wherein a range of values of the parameter information covers a use of the nearest reference values only and a use of different subsets of extended reference values.

37. The video encoder of aspect 36, wherein different portions of extended reference samples comprise a different distance to the prediction block.

38. The video encoder of aspect 36 or 37, wherein the video encoder is configured to set the parameter information to one of a predefined number of values, the value indicating a number and a distance of reference samples used for the prediction mode.

39. The video encoder of one of aspects 31 to 38, wherein the video encoder is configured to determine the first set of prediction modes and/or the second set of prediction modes based on a most probable mode coding.

40. Video encoder configured to:
    encode, by block based predictive encoding, pictures of a video into coding data, wherein the block based predictive encoding comprises an intra-picture prediction;
    use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
    determine a first prediction for the prediction block using a first prediction mode of a set of prediction modes, the first set of prediction modes comprising prediction modes using the plurality of nearest reference samples in absence of the extended reference samples;

determining a second prediction for the prediction block using a second prediction mode of a second set of prediction modes, the second set of prediction modes comprising a subset of the prediction modes of the first set being associated with the plurality of extended reference samples, wherein the video encoder is configured to combine the first prediction and the second prediction so as to obtain a combined prediction as prediction for the prediction block in the coding data.

41. The video encoder of aspect 40, wherein the prediction block is a first prediction block, wherein the video encoder is configured to predict a second prediction block of the video using a plurality of nearest reference samples associated with the second prediction block in absence of a plurality of extended reference samples associated with the second prediction block;

wherein the video encoder is configured to signal a combining information indicating that the prediction in the coding data is based on a combination of predictions or is based on a prediction using the plurality of extended reference samples in absence of the plurality of nearest reference samples.

42. The video encoder of aspect 40 or 41, wherein the video encoder is configured to use the first prediction mode as a predefined prediction mode.

43. The video encoder of aspect 42, wherein the video encoder is configured to select the first prediction mode as being a same mode as the second prediction mode and using the nearest reference samples in absence of the extended reference samples; or to use the first prediction mode as preset prediction mode.

44. Video encoder configured to:

encode, by block based predictive encoding, pictures of a video into coding data, wherein the block based predictive encoding comprises an intra-picture prediction;

use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and use the plurality of extended reference samples according to a predefined set of pluralities of extended reference samples.

45. The video encoder of aspect 44, wherein the video encoder is configured to determine the predefined set of pluralities of extended reference samples such that pluralities in the set differ with respect to each other by a number or combination of lines and/or rows of samples of the picture to be used as reference samples.

46. The video encoder of aspect 45, wherein the video encoder is configured to determine the predefined set of pluralities of extended reference samples based on a block size of the prediction block and/or a prediction mode used to predict the prediction block.

47. The video encoder of aspect 45 or 46, wherein the video encoder is configured to determine the set of pluralities of extended reference samples for a block size of the prediction block being at least a predefined threshold and to skip signaling the set of pluralities of extended reference samples when the block size is below the predefined threshold value or to skip signaling the set of pluralities of extended reference samples based on a position of the set of pluralities of extended reference samples within a coding tree block.

48. The video encoder of aspect 47, wherein the predefined threshold is a predefined number of samples along a width or height of the prediction block and/or a predefined aspect ratio of the prediction block along the width and the height.

49. The video encoder of aspect 48, wherein the predefined number of samples is 8 and/or wherein the aspect ratio is greater than 1/4 and less than 4.

50. The video encoder of one of aspects 44 to 49, wherein the video encoder is configured to predict the prediction block as a first prediction block using the plurality of extended reference samples and to predict a second prediction block not using extended reference samples, wherein the video encoder is configured to signal a predefined set of pluralities of extended reference samples associated with the first prediction block and to not signal a predefined set of extended reference samples in associated with the second prediction block.

51. The video encoder of one of aspects 44 to 50, wherein the video encoder is configured to signal, for each prediction block, information indicating one of a specific plurality of a set of pluralities of extended reference samples and a use of nearest reference samples only before information indicating the intra-picture prediction mode.

52. The video encoder of aspect 51, wherein the video encoder is configured to signal the information indicating the intra-picture prediction so as to thereby indicate prediction modes that are in accordance with the indicated specific plurality of the set of pluralities of extended reference samples or in accordance with the indicated use of nearest reference samples, only.

53. Video encoder configured to:

encode, by block based predictive encoding a plurality of prediction blocks, pictures of a video into coding data, wherein the block based predictive encoding comprises an intra-picture prediction;

use, for the intra-picture prediction, for encoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block;

wherein the video encoder is configured to determine the extended reference samples so as to be at least partially a part of an adjacent prediction block of the plurality of prediction blocks, and to determine that the adjacent prediction block has not yet been predicted; and to signal information indicating the extended prediction samples associated to the prediction block and arranged in the adjacent prediction block as unavailable samples.

54. The video encoder of aspect 53, wherein the video encoder is configured to encode the pictures by parallel encoding lines of blocks according to a wavefront approach, and to predict the prediction block based on an angular prediction, wherein the video encoder is configured to determine the extended reference samples to be used for predicting the prediction block so as to be arranged in already predicted blocks of the picture.

55. The video encoder of aspect 53 or 54, wherein the video encoder is configured to signal the extended prediction samples associated to the prediction block and arranged in the adjacent prediction block variantly as unavailable samples or available samples on a sequence level, a picture level or a slice level.

56. The video encoder of one of aspects 53 to 55, wherein the video encoder is configured to signal the information indicating the extended prediction samples associated to the prediction block and arranged in the adjacent prediction block as unavailable samples together with information indicating a parallel coding of the picture.

57. The video encoder of one of previous aspects, wherein the video encoder is configured to determine a list of most probable prediction modes based on a use of the plurality of nearest reference samples or the use of the plurality of extended reference samples for the prediction mode, wherein the video encoder is configured to substitute prediction modes restricted for the used reference samples by modes allowed for the prediction mode.

58. The video encoder of one of previous aspects, wherein the video encoder is configured to apply prediction using extended reference samples to pictures comprising luma information only.

59. The video encoder of one of previous aspects, wherein the video encoder is configured to generate extended reference samples exceeding a width and/or a height of nearest reference samples along a first and a second image direction by padding from a closest extended reference sample.

60. The video encoder of one of previous aspects, wherein the video encoder is configured to predict the prediction using an angular prediction mode using only a subset of angles from possible angles of the angular prediction mode and to exclude unused angles from signaling encoding information to a decoder.

61. The video encoder of one of previous aspects, wherein the extended reference samples are arranged in at least 2 lines and rows in addition to nearest reference samples, advantageously at least 3 lines and rows.

62. The video encoder of one of previous aspects, wherein the video encoder is configured to use a specific plurality of a set of pluralities of extended reference samples for predicting the prediction block, wherein the video encoder is configured to select the specific plurality from the set of pluralities so as to comprise a lowest similarity of picture content when compared to a plurality of nearest reference samples extended by the set.

63. The video encoder of aspect 62, wherein the video encoder is configured to signal a use of extended reference samples using a flag.

64. The video encoder of one of previous aspects, wherein the video encoder is configured to selectively use the extended reference samples or nearest reference samples only, wherein the video encoder is configured to transform a residual obtained by predicting the prediction block using a first transformation procedure so as to obtain a first transformation result and to transform the first transformation result using a second transformation procedure so as to obtain a second transformation result when the extended reference samples are unused for predicting the prediction block.

65. The video encoder of aspect 64, wherein the video encoder is configured to signal a use of the secondary transform; or to
implicitly signal a non-use of the secondary transform when indicating a use of the extended reference samples and to not include information relating to a result of a secondary transform in the coding data.

66. The video encoder of one of previous aspects, wherein the prediction is a prediction for a residual signal to be used in combination with a quantized signal so as to decode the picture.

67. Video decoder configured to:
decode, by block based predictive decoding, pictures coded in coding data into a video, wherein the block based predictive decoding comprises an intra-picture prediction;
use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
sequentially determine an availability or unavailability of each of the plurality of extended reference samples;
substitute an extended reference sample being determined as unavailable by a substitution sample; and
use the substitution sample for the intra-picture prediction.

68. The video decoder of aspect 67, wherein the video decoder is configured to:
determine the availability or unavailability sequentially according to a sequence;
determine the substitution sample as a copy a last extended reference sample being determined as available in the sequence; and/or
determine the substitution sample as a copy a next extended reference sample being determined as available in the sequence.

69. The video decoder of aspect 68, wherein the video decoder is configured to:
determine the availability or unavailability sequentially according to a sequence;
determine the substitution sample based on a combination of an extended reference sample being determined as available and being arranged in the sequence prior to the reference sample being determined as unavailable and of an extended reference sample being determined as available and being arranged in the sequence after the reference sample being determined as unavailable.

70. The video decoder of one of aspects 67 to 69, wherein the video decoder is configured to:
use, for the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;

determine an availability or unavailability of each of the plurality of extended reference samples;
receive information indicating that a portion of available extended reference samples of the plurality of extended reference samples is larger than or equal a predetermined threshold and use of the plurality of extended reference samples; and
skip using the plurality of extended reference samples in absence of the information.

71. Video decoder configured to:
decode, by block based predictive decoding, pictures coded in coding data into a video, wherein the block based predictive decoding comprises an intra-picture prediction; use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
filtering at least a subset of the plurality of extended reference samples using a bilateral filter so as to obtain a plurality of filtered extended reference samples; and
use the plurality of filtered extended reference samples for the intra-picture prediction.

72. The video encoder of aspect 71, wherein the video decoder is configured to filter the plurality of extended reference samples using one of a 3-tap filter, a 5-tap filter and a 7-tap filter.

73. The video decoder of aspect 72, wherein the 3-tap filter, a 5-tap filter and a 7-tap filter are configured as bilateral filters, wherein the video decoder is configured to predict the prediction block using an angular prediction mode, and to select to use one of the 3-tap filter, the 5-tap filter and the 7-tap filter based on an angle used for the angular prediction, the angle arranged between a horizontal or a vertical direction of the angular prediction mode; and/or wherein the video decoder is configured to select to use one of the 3-tap filter, the 5-tap filter and the 7-tap filter based on a block size of the prediction block.

74. The video encoder of aspect 73, wherein the video decoder is configured to select a filter with increasing taps for increasing angles from to a horizontal direction or vertical direction towards a diagonal.

75. Video decoder configured to:
decode, by block based predictive decoding, pictures coded in coding data into a video, wherein the block based predictive decoding comprises an intra-picture prediction;
use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block;
map at least a part of the nearest reference samples arranged along the second direction to extended reference samples being arranged along the first direction, such that the mapped reference samples exceed an extension of the prediction block along the first picture direction; and
use the mapped extended reference samples for the prediction.

76. The video decoder of aspect 75, wherein the video decoder is configured to map the portion of nearest reference samples according to a prediction mode used for predicting the prediction block.

77. The video decoder of aspect 76, wherein the video decoder is configured to map the portion of nearest reference samples according to a direction used in the prediction mode for predicting the prediction block.

78. Video decoder configured to:
decode, by block based predictive decoding, pictures coded in coding data into a video, wherein the block based predictive decoding comprises an intra-picture prediction;
use, for the intra-picture prediction, for decoding a prediction block of a picture, a plurality of nearest reference samples of the picture directly neighboring the prediction block and a plurality of extended reference samples, each extended reference sample of the plurality of
extended reference samples separated from the prediction block at least by one nearest reference sample of the plurality of reference samples;
wherein the video decoder is configured to boundary filtering in a mode where no extended samples are used; and not to use boundary filtering when extended samples are used; or
wherein the video decoder is configured to boundary filtering at least a subset of the plurality of nearest reference samples and not using boundary filtering for the extended samples.

79. Video decoder configured to:
decode, by block based predictive decoding, pictures coded in coding data into a video, wherein the block based predictive decoding comprises an intra-picture prediction;
determining, in the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
determining a prediction for the prediction block using the extended reference samples;
filtering the extended reference samples so as to obtain a plurality of filtered extended reference samples; and
combining the prediction and the filtered extended reference samples so as to obtain a combined prediction for the prediction block.

80. The video decoder of aspect 79, wherein the video decoder is configured to combine the prediction and extended reference samples being arranged in a major diagonal or minor diagonal of samples with respect to the prediction block.

81. The video decoder of aspect 79 or 80, wherein the video decoder is configured to combine the prediction and the extended reference samples based on the determination rule:

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} r(-1-i, -1-i) + \frac{c_1^{(h)}}{2^{\lfloor x/d_x \rfloor}} r(-1-i, y) - \frac{c_2^{(h)}}{2^{\lfloor x/d_x \rfloor}} r(-1-i, -1-i) + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $r(-1-i, -1-i)$ for i>0 is an extended corner reference sample of the plurality of extended reference samples with respect to a boundary of the prediction block and $b(x,y)$ denotes a normalization factor.

82. The video decoder of aspect 83, wherein the normalization factor is determined based on the determination rule:

$$b(x, y) = 128 - \frac{c_1^{(v)}}{2^{\lfloor y/d_y \rfloor}} + \frac{c_2^{(v)}}{2^{\lfloor y/d_y \rfloor}} - \frac{c_1^{(h)}}{2^{\lfloor x/d_x \rfloor}} + \frac{c_2^{(h)}}{2^{\lfloor x/d_x \rfloor}}$$

83. The video decoder of one of aspects 79 to 82, wherein the video decoder is configured to filter the extended reference samples so as to obtain filtered extended reference samples $(r(x, -1-i), r(-1-i,y), r(-1-i, -1-i)$ for i>0) (combined) using one of a 3-tap filter, a 5-tap filter and a 7-tap filter and to use the filtered extended reference samples for the prediction.

84. The video decoder of one of aspects 79 to 83, wherein the video decoder is configured to use a combination of extended corner reference samples of the prediction block and of extended reference samples being arranged in a corner region of reference samples $(r(-1-i, -1-i))$.

85. The video decoder of aspect 84, wherein the video decoder is configured to obtain the combined prediction based on the determination rule:

$$p_c(x, y) = \frac{\frac{c_1^{(v)}}{2^{\lfloor y/d_y \rfloor}} r(x, -1-i) - \frac{c_2^{(v)}}{2^{\lfloor y/d_y \rfloor}} \frac{\sum_{x_0=-1}^{-1-i} r(x_0, -1-i)}{i+1} + \frac{c_1^{(h)}}{2^{\lfloor x/d_x \rfloor}} r(-1-i, y) - \frac{c_2^{(h)}}{2^{\lfloor x/d_x \rfloor}} \frac{\sum_{y_0=-1}^{-1-i} r(-1-i, y_0)}{i+1} + b(x, y) \cdot p(x, y) + 64}{128}$$

wherein $p_c(x,y)$ denotes the combined prediction for coordinates x and y in the prediction block, $p(x,y)$ denotes the prediction for coordinates x and y in the prediction block, $c_1^v$, $c_2^v$, $c_1^h$, $c_2^h$ are prediction weights, $d_x$ is a parameter set to 1 or 2 dependent on a size of the prediction block in dimension x, $d_y$ is a parameter set to 1 or 2 dependent on a size of the prediction block in dimension y, $r(x, -1-i)$ for i>0 is the extended top reference sample at horizontal position x, $r(-1-i,y)$ for i>0 is the extended left reference sample at vertical position y and $$\frac{\sum_{y_0=-1}^{-1-i} r(-1-i, y_0)}{i+1}$$

for i>0 are the combined extended corner reference samples t+1 with respect to a boundary of the prediction block and $b(x,y)$ denotes a normalization factor.

86. The video decoder of one of aspects 79 to 85, wherein the video decoder is configured to obtain the prediction $p(x,y)$ based on an intra-picture prediction.

87. The video decoder of aspect 86, wherein the video decoder is configured to use only planar prediction as intra-picture prediction.

88. The video decoder of one of aspects 79 to 87, wherein the video decoder is configured, for each decoded video block, to determine a parameter set identifying the combination of the prediction and the filtered extended reference samples.

89. The video decoder of aspect 88, wherein the video decoder is configured to determine the parameter set identifying the combination of the prediction and the filtered extended reference samples using a look-up table containing sets for different block sizes of the prediction block.

90. Video decoder configured to:
   decode, by block based predictive decoding, pictures coded in coding data into a video, wherein the block based predictive decoding comprises an intra-picture prediction;
   use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
   determine a first prediction for the prediction block using a first prediction mode of a set of prediction modes, the first set of prediction modes comprising prediction modes using the plurality of nearest reference samples in absence of the extended reference samples;
   determining a second prediction for the prediction block using a second prediction mode of a second set of prediction modes, the second set of prediction modes comprising a subset of the prediction modes of the first set, the subset being associated with the plurality of extended reference samples, wherein the video decoder is configured to weightedly ($w_0;w_i$) combine the first prediction ($p_0(x,y)$) and the second prediction ($p_i(x,y)$) so as to obtain a combined prediction ($p(x,y)$) as prediction for the prediction block in the coding data.

91. The video decoder of aspect 90, wherein the video decoder is configured to use the first prediction and the second prediction according to a predefined combination being a portion of possible combinations of enabled first prediction modes and enabled second prediction modes.

92. The video decoder of aspect 90 or 91, wherein the video decoder is configured to receive a signal indicating the second prediction mode whilst not receiving a signal indicating the first prediction mode and to derive the first prediction mode from the second prediction mode or a parameter information (i).

93. The video decoder of one of aspects 90 to 92, wherein the video decoder is configured to exclusively use a planar prediction mode as one of the first prediction mode and the second prediction mode.

94. The video decoder of one of aspects 90 to 93, wherein the video decoder is configured to adapt a first weight applied to the first prediction in the combined prediction and a second weight applied to the second prediction in the combined prediction based on a block size of the prediction block; and/or
adapt the first weight based on the first prediction mode or the second weight based on the second prediction mode.

95 The video decoder of one of aspects 90 to 94, wherein the video decoder is configured to adapt a first weight applied to the first prediction in the combined prediction and a second weight applied to the second prediction in the combined prediction based on a position in the prediction block.

96. The video decoder of aspect 95, wherein the video decoder is configured to adapt the first weight and the second weight based on the determination rule $$p(x,y)=w_0(x,y)p_0(x,y)+w_i(x,y)p_i(x,y)$$

wherein $w_0(x,y)$ is the first weight based on the position x,y in the prediction block, $w_i$ is the second weight based on the position x,y in the prediction block, $p_0(x,y)$ is the first prediction for the position x,y and $p_i(x,y)$ is the second prediction for the position x,y, and i indicates the extended reference samples to be used for the second prediction.

97. Video decoder configured to:
decode, by block based predictive decoding, pictures coded in coding data into a video, wherein the block based predictive decoding comprises an intra-picture prediction;
use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
receive a mode information (m) indicating the prediction mode used for predicting the prediction block; and
afterwards receive a parameter information (i) indicating a subset of the extended reference samples used for the prediction mode thereby indicating that the prediction mode is contained in the second set of prediction modes; and to determine that the used prediction mode is not contained in the second set of prediction modes when not receiving the parameter information and to determine a use of the nearest reference samples for the prediction.

98. The video decoder of aspect 97, wherein the video decoder is configured to determine the mode information as indicating a use of a DC mode or a planar mode when not receiving the parameter information.

99. Video decoder configured to:
decode, by block based predictive decoding, pictures coded in coding data into a video, wherein the block based predictive decoding comprises an intra-picture prediction;
use, for the intra-picture prediction, for decoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples;
use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
receive a parameter information (i) indicating a subset of the plurality of reference samples used for the prediction mode, the subset of the plurality of reference samples comprising nearest reference samples only or at least one extended reference sample;
afterwards receive a mode information (m) indicating the prediction mode used for predicting the prediction block, wherein the mode information indicates a prediction mode from a subset of modes, the subset being restricted to a set of allowed prediction modes according to the parameter information (i).

100. The video decoder of aspect 97 to 99, wherein the extended reference samples in modes contained in the second set of prediction modes are used in addition to the nearest reference samples.

101. The video decoder of one of aspects 97 to 100, wherein the first set of prediction modes describes prediction modes allowed for being used with the nearest reference samples, wherein the second set of prediction modes describes prediction modes of the first set of prediction modes being also allowed for being used with the extended reference samples.

102. The video decoder of one of aspects 97 to 101, wherein a range of values of the parameter information covers a use of the nearest reference values only and a use of different subsets of extended reference values.

103. The video decoder of aspect 102, wherein different portions of extended reference samples comprise a different distance to the prediction block.

104. The video decoder of aspect 102 or 103, wherein the video decoder is configured to set the parameter information to one of a predefined number of values, the value indicating a number and a distance of reference samples used for the prediction mode.

105. The video decoder of one of aspects 97 to 104, wherein the video decoder is configured to determine the first set of prediction modes and/or the second set of prediction modes based on a most probable mode coding.

106. Video decoder configured to:
  decode, by block based predictive decoding, pictures coded in coding data into a video, wherein the block based predictive decoding comprises an intra-picture prediction;
  use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
  determine a first prediction for the prediction block using a first prediction mode of a set of prediction modes, the first set of prediction modes comprising prediction modes using the plurality of nearest reference samples in absence of the extended reference samples;
  determining a second prediction for the prediction block using a second prediction mode of a second set of prediction modes, the second set of prediction modes comprising a subset of the prediction modes of the first set being associated with the plurality of extended reference samples,
  wherein the video decoder is configured to combine the first prediction and the second prediction so as to obtain a combined prediction as prediction for the prediction block in the coding data.

107. The video decoder of aspect 106, wherein the prediction block is a first prediction block, wherein the video decoder is configured to predict a second prediction block of the video using a plurality of nearest reference samples associated with the second prediction block in absence of a plurality of extended reference samples associated with the second prediction block;
  wherein the video decoder is configured to receive a combining information indicating that the prediction in the coding data is based on a combination of predictions or is based on a prediction using the plurality of extended reference samples in absence of the plurality of nearest reference samples and do decode the coding data accordingly.

108. The video decoder of aspect 106 or 107, wherein the video decoder is configured to use the first prediction mode as a predefined prediction mode.

109. The video decoder of aspect 108, wherein the video decoder is configured to select the first prediction mode as being a same mode as the second prediction mode and using the nearest reference samples in absence of the extended reference samples; or to use the first prediction mode as preset prediction mode.

110. Video decoder configured to:
  decode, by block based predictive decoding, pictures coded in coding data into a video, wherein the block based predictive decoding comprises an intra-picture prediction;
  use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and
  use the plurality of extended reference samples according to a predefined set of pluralities of extended reference samples.

111. The video decoder of aspect 110, wherein the video decoder is configured to determine the predefined set of pluralities of extended reference samples such that pluralities in the set differ with respect to each other by a number or combination of lines and/or rows of samples of the picture to be used as reference samples.

112. The video decoder of aspect 111, wherein the video decoder is configured to determine the predefined set of pluralities of extended reference samples based on a block size of the prediction block and/or a prediction mode used to predict the prediction block.

113. The video decoder of aspect 111 or 112, wherein the video decoder is configured to determine the set of pluralities of extended reference samples for a block size of the prediction block being at least a predefined threshold and to skip using the set of pluralities of extended reference samples when the block size is below the predefined threshold value.

114. The video decoder of aspect 113, wherein the predefined threshold is a predefined number of samples along a width or height of the prediction block and/or a predefined aspect ratio of the prediction block along the width and the height.

115. The video decoder of aspect 114, wherein the predefined number of samples is 8 and/or wherein the aspect ratio is greater than 1/4 and at less than 4.

116. The video decoder of one of aspects 110 to 115, wherein the video decoder is configured to predict the prediction block as a first prediction block using the plurality of extended reference samples and to predict a second prediction block not using extended reference samples, wherein the video decoder is configured to receive information indicating a predefined set of pluralities of extended reference samples associated with the first prediction block and to determine a predefined set of extended reference samples in associated with the second prediction block in absence of a respective signal.

117. The video decoder of one of aspects 110 to 116, wherein the video decoder is configured to receive, for each prediction block, information indicating a one of a specific plurality of a set of pluralities of extended reference samples and a use of nearest reference samples only before information indicating the intra-picture prediction mode.

118. The video decoder of aspect 117, wherein the video decoder is configured to receive the information indicating the intra-picture prediction so as to thereby indicate prediction modes that are in accordance with the indicated specific plurality of the set of pluralities of extended reference samples or in accordance with the indicated use of nearest reference samples, only.

119. Video decoder configured to:
- decode, by block based predictive decoding, pictures coded in coding data into a video, wherein for each picture a plurality of prediction blocks is decoded, wherein the block based predictive decoding comprises an intra-picture prediction;
- use, for the intra-picture prediction, for decoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block;
- wherein the video decoder is configured to determine the extended reference samples so as to be at least partially a part of an adjacent prediction block of the plurality of prediction blocks, and to determine that the adjacent prediction block has not yet been predicted; and to receive information indicating the extended prediction samples associated to the prediction block and arranged in the adjacent prediction block as unavailable samples.

120. The video decoder of aspect 119, wherein the video decoder is configured to decode the pictures by parallel decoding lines of blocks according to a wavefront approach, and to predict the prediction block based on an angular prediction, wherein the video decoder is configured to determine the extended reference samples to be used for predicting the prediction block so as to be arranged in already predicted blocks of the picture.

121. The video decoder of aspect 119 or 120, wherein the video decoder is configured to receive information indicating the extended prediction samples associated to the prediction block and arranged in the adjacent prediction block variantly as unavailable samples or available samples on a sequence level, a picture level or a slice level.

122. The video decoder of one of aspects 119 to 121, wherein the video decoder is configured to receive the information indicating the extended prediction samples associated to the prediction block and arranged in the adjacent prediction block as unavailable samples together with information indicating a parallel decoding of the picture.

123. The video decoder of one of aspects 68 to 122, wherein the video decoder is configured to determine a list of most probable prediction modes based on a use of the plurality of nearest reference samples or the use of the plurality of extended reference samples for the prediction mode, wherein the video decoder is configured to substitute prediction modes restricted for the used reference samples by modes allowed for the prediction mode.

124. The video decoder of one of aspects 68 to 123, wherein the video decoder is configured to apply prediction using extended reference samples to pictures comprising luma information only.

125. The video decoder of one of aspects 68 to 124, wherein the video decoder is configured to generate extended reference samples exceeding a width and/or a height of nearest reference samples along a first and a second image direction by padding from a closest extended reference sample.

126. The video decoder of one of aspects 68 to 125, wherein the video decoder is configured to predict the prediction using an angular prediction mode using only a subset of angles from possible angles of the angular prediction mode and to exclude unused angles from the prediction.

127. The video decoder of one of aspects 68 to 126, wherein the extended reference samples are arranged in at least 2 lines and rows in addition to nearest reference samples, advantageously at least 3 lines and rows.

128. The video decoder of one of aspects 68 to 127, wherein the video decoder is configured to use a specific plurality of a set of pluralities of extended reference samples for predicting the prediction block, wherein the video decoder is configured to select the specific plurality from the set of pluralities so as to comprise a lowest similarity of picture content when compared to a plurality of nearest reference samples extended by the set.

129. The video decoder of aspect 128, wherein the video decoder is configured to receive information indicating a use of extended reference samples by a flag.

130. The video decoder of one of aspects 68 to 129, wherein the video decoder is configured to selectively use the extended reference samples or nearest reference samples only, wherein the video decoder is configured to transform a residual obtained by predicting the prediction block using a first transformation procedure so as to obtain a first transformation result and to transform the first transformation result using a second transformation procedure so as to obtain a second transformation result when the extended reference samples are unused for predicting the prediction block.

131. The video decoder of aspect 130, wherein the video decoder is configured to receive information indicating a use of the secondary transform; or to
- derive a non-use of the secondary transform when indicating a use of the extended reference samples and to not receive information relating to a result of a secondary transform in the coding data.

132. The video decoder of one of aspects 68 to 131, wherein the prediction is a prediction for a residual signal to be used in combination with a quantized signal so as to decode the picture.

133. Method for encoding a video, the method comprising:
- encode, by block based predictive encoding, pictures of a video into coding data, wherein the block based predictive encoding comprises an intra-picture prediction;
- use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
- sequentially determine an availability or unavailability of each of the plurality of extended reference samples;
- substitute an extended reference sample being determined as unavailable by a substitution sample; and
- use the substitution sample for the intra-picture prediction.

134. Method for encoding a video, the method comprising:
- encode, by block based predictive encoding, pictures of a video into coding data, wherein the block based predictive encoding comprises an intra-picture prediction;
- use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
- filtering at least a subset of the plurality of extended reference samples using a bilateral filter so as to obtain a plurality of filtered extended reference samples; and
- use the plurality of filtered extended reference samples for the intra-picture prediction.

135. Method for encoding a video, the method comprising:
- encode, by block based predictive encoding, pictures of a video into coding data, wherein the block based predictive encoding comprises an intra-picture prediction;
- use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block;
- map at least a part of the nearest reference samples arranged along the second direction to extended reference samples being arranged along the first direction, such that the mapped reference samples exceed an extension of the prediction block along the first picture direction; and
- use the mapped extended reference samples for the prediction.

136. Method for encoding a video, the method comprising:
- encode, by block based predictive encoding, pictures of a video into coding data, wherein the block based predictive encoding comprises an intra-picture prediction;
- use, for the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
- boundary filtering in a mode where no extended samples are used; and not to use boundary filtering when extended samples are used; or
- boundary filtering at least a subset of the plurality of nearest reference samples and not using boundary filtering for the extended samples.

137. Method for encoding a video, the method comprising:
- encode, by block based predictive encoding, pictures of a video into coding data, wherein the block based predictive encoding comprises an intra-picture prediction;
- determining, in the intra-picture prediction, for encoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
- determining a prediction for the prediction block using the extended reference samples; filtering the extended reference samples so as to obtain a plurality of filtered extended reference samples; and
- combining the prediction and the filtered extended reference samples so as to obtain a combined prediction for the prediction block.

138. Method for encoding a video, the method comprising:
- encode, by block based predictive encoding, pictures of a video into coding data, wherein the block based predictive encoding comprises an intra-picture prediction;
- use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
- determine a first prediction for the prediction block using a first prediction mode of a set of prediction modes, the first set of prediction modes comprising prediction modes using the plurality of nearest reference samples in absence of the extended reference samples;
- determining a second prediction for the prediction block using a second prediction mode of a second set of prediction modes, the second set of prediction modes comprising a subset of the prediction modes of the first set, the subset being associated with the plurality of extended reference samples,
- to weightedly ($w_0$;$w_i$) combine the first prediction ($p_0(x,y)$) and the second prediction ($p_i(x,y)$) so as to obtain a combined prediction ($p(x,y)$) as prediction for the prediction block in the coding data.

139. Method for encoding a video, the method comprising:
- encode, by block based predictive encoding, pictures of a video into coding data, wherein the block based predictive encoding comprises an intra-picture prediction;
- use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes; signal a mode information (m) indicating the prediction mode used for predicting the prediction block; and
afterwards signal a parameter information (i) indicating a subset of the extended reference samples used for the prediction mode if the prediction mode is contained in the second set of prediction modes; and to skip signaling the parameter information when the used prediction mode is not contained in the second set of prediction modes.

140. Method for encoding a video, the method comprising:
encode, by block based predictive encoding, pictures of a video into coding data, wherein the block based predictive encoding comprises an intra-picture prediction;
use, for the intra-picture prediction, for encoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples;
use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
signal a parameter information (i) indicating a subset of the plurality of reference samples used for the prediction mode, the subset of the plurality of reference samples comprising nearest reference samples only or extended reference samples;
afterwards signal a mode information (m) indicating the prediction mode used for predicting the prediction block, wherein the mode information indicates a prediction mode from a subset of modes, the subset being restricted to a set of allowed prediction modes according to the parameter information (i).

141. Method for encoding a video, the method comprising:
encode, by block based predictive encoding, pictures of a video into coding data, wherein the block based predictive encoding comprises an intra-picture prediction;
use, for the intra-picture prediction, for encoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
determine a first prediction for the prediction block using a first prediction mode of a set of prediction modes, the first set of prediction modes comprising prediction modes using the plurality of nearest reference samples in absence of the extended reference samples;
determining a second prediction for the prediction block using a second prediction mode of a second set of prediction modes, the second set of prediction modes comprising a subset of the prediction modes of the first set being associated with the plurality of extended reference samples,
combine the first prediction and the second prediction so as to obtain a combined prediction as prediction for the prediction block in the coding data.

142. Method for encoding a video, the method comprising:
encode, by block based predictive encoding, pictures of a video into coding data, wherein the block based predictive encoding comprises an intra-picture prediction;
use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and
use the plurality of extended reference samples according to a predefined set of pluralities of extended reference samples.

143. Method for encoding a video, the method comprising:
encode, by block based predictive encoding a plurality of prediction blocks, pictures of a video into coding data, wherein the block based predictive encoding comprises an intra-picture prediction;
use, for the intra-picture prediction, for encoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block;
determine the extended reference samples so as to be at least partially a part of an adjacent prediction block of the plurality of prediction blocks, and to determine that the adjacent prediction block has not yet been predicted; and
to signal information indicating the extended prediction samples associated to the prediction block and arranged in the adjacent prediction block as unavailable samples.

144. Method for decoding a video, the method comprising:
decode, by block based predictive decoding, pictures coded in coding data into a video, wherein the block based predictive decoding comprises an intra-picture prediction;
use, in the intra-picture prediction, for encoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
sequentially determine an availability or unavailability of each of the plurality of extended reference samples;
substitute an extended reference sample being determined as unavailable by a substitution sample; and
use the substitution sample for the intra-picture prediction.

145. Method for decoding a video, the method comprising:
decode, by block based predictive decoding, pictures coded in coding data into a video, wherein the block based predictive decoding comprises an intra-picture prediction;
use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block;
filtering at least a subset of the plurality of extended reference samples using a bilateral filter so as to obtain a plurality of filtered extended reference samples; and
use the plurality of filtered extended reference samples for the intra-picture prediction.

146. Method for decoding a video, the method comprising:
decode, by block based predictive decoding, pictures coded in coding data into a video, wherein the block based predictive decoding comprises an intra-picture prediction;
use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block, wherein a plurality of nearest reference samples is arranged along a first picture direction of the prediction block and along a second picture direction of the prediction block;
map at least a part of the nearest reference samples arranged along the second direction to extended reference samples being arranged along the first direction, such that the mapped reference samples exceed an extension of the prediction block along the first picture direction; and
use the mapped extended reference samples for the prediction.

147. Method for decoding a video, the method comprising:
decode, by block based predictive decoding, pictures coded in coding data into a video, wherein the block based predictive decoding comprises an intra-picture prediction;
use, for the intra-picture prediction, for decoding a prediction block of a picture, a plurality of nearest reference samples of the picture directly neighboring the prediction block and a plurality of extended reference samples, each extended reference sample of the plurality of extended reference samples sepa-
rated from the prediction block at least by one nearest reference sample of the plurality of reference samples;
boundary filtering in a mode where no extended samples are used; and not to use boundary filtering when extended samples are used; or
boundary filtering at least a subset of the plurality of nearest reference samples and not using boundary filtering for the extended samples.

148. Method for decoding a video, the method comprising:
decode, by block based predictive decoding, pictures coded in coding data into a video, wherein the block based predictive decoding comprises an intra-picture prediction;
determining, in the intra-picture prediction, for decoding a prediction block of a picture, a plurality of nearest reference samples of the picture directly neighboring the prediction block and a plurality of extended reference samples, each extended reference sample of the plurality of extended reference samples separated from the prediction block at least by one nearest reference sample of the plurality of reference samples;
determining a prediction for the prediction block using the extended reference samples; and
filtering the extended reference samples so as to obtain a plurality of filtered extended reference samples; and
combining the prediction and the filtered extended reference samples so as to obtain a combined prediction for the prediction block.

149. Method for decoding a video, the method comprising:
decode, by block based predictive decoding, pictures coded in coding data into a video, wherein the block based predictive decoding comprises an intra-picture prediction;
use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
determine a first prediction for the prediction block using a first prediction mode of a set of prediction modes, the first set of prediction modes comprising prediction modes using the plurality of nearest reference samples in absence of the extended reference samples;
determining a second prediction for the prediction block using a second prediction mode of a second set of prediction modes, the second set of prediction modes comprising a subset of the prediction modes of the first set, the subset being associated with the plurality of extended reference samples,
weightedly ($w_0; w_i$) combine the first prediction ($p_0(x, y)$) and the second prediction ($p_i(x,y)$) so as to obtain a combined prediction ($p(x,y)$) as prediction for the prediction block in the coding data.

150. Method for decoding a video, the method comprising:
- decode, by block based predictive decoding, pictures coded in coding data into a video, wherein the block based predictive decoding comprises an intra-picture prediction;
- use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
- use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
- receive a mode information (m) indicating the prediction mode used for predicting the prediction block; and
- afterwards receive a parameter information (i) indicating a subset of the extended reference samples used for the prediction mode thereby indicating that the prediction mode is contained in the second set of prediction modes; and determine that the used prediction mode is not contained in the second set of prediction modes when not receiving the parameter information and to determine a use of the nearest reference samples for the prediction.

151. Method for decoding a video, the method comprising:
- decode, by block based predictive decoding, pictures coded in coding data into a video, wherein the block based predictive decoding comprises an intra-picture prediction;
- use, for the intra-picture prediction, for decoding a prediction block of a picture, a plurality of reference samples comprising nearest reference samples of the picture directly neighboring the prediction block and a plurality of extended reference samples, each extended reference sample of the plurality of extended reference samples separated from the prediction block at least by one nearest reference sample of the plurality of reference samples;
- use a prediction mode being one of a first set of prediction modes for predicting the prediction block using the nearest reference samples; or being one of a second set of prediction modes for predicting the prediction block using the extended reference samples; wherein the second set of prediction modes is a subset of the first set of prediction modes;
- receive a parameter information (i) indicating a subset of the plurality of reference samples used for the prediction mode, the subset of the plurality of reference samples comprising nearest reference samples only or at least one extended reference samples;
- afterwards receive a mode information (m) indicating the prediction mode used for predicting the prediction block, wherein the mode information indicates a prediction mode from a subset of modes, the subset being restricted to a set of allowed prediction modes according to the parameter information (i).

152. Method for decoding a video, the method comprising:
- decode, by block based predictive decoding, pictures coded in coding data into a video, wherein the block based predictive decoding comprises an intra-picture prediction;
- use, for the intra-picture prediction, for decoding a prediction block of a picture, a plurality of nearest reference samples of the picture directly neighboring the prediction block and/or a plurality of extended reference samples, each extended reference sample of the plurality of extended reference samples separated from the prediction block at least by one nearest reference sample of the plurality of reference samples;
- determine a first prediction for the prediction block using a first prediction mode of a set of prediction modes, the first set of prediction modes comprising prediction modes using the plurality of nearest reference samples in absence of the extended reference samples;
- determining a second prediction for the prediction block using a second prediction mode of a second set of prediction modes, the second set of prediction modes comprising a subset of the prediction modes of the first set being associated with the plurality of extended reference samples,
- combine the first prediction and the second prediction so as to obtain a combined prediction as prediction for the prediction block in the coding data.

153. Method for decoding a video, the method comprising:
- decode, by block based predictive decoding, pictures coded in coding data into a video, wherein the block based predictive decoding comprises an intra-picture prediction;
- use, in the intra-picture prediction, for decoding a prediction block of a picture, a plurality of extended reference samples of the picture, each extended reference sample of the plurality of extended reference samples separated from the prediction block at least by one nearest reference sample of the plurality of reference samples, directly neighboring the prediction block; and
- use the plurality of extended reference samples according to a predefined set of pluralities of extended reference samples.

154. Method for decoding a video, the method comprising:
- decode, by block based predictive decoding, pictures coded in coding data into a video, wherein for each picture a plurality of prediction blocks is decoded, wherein the block based predictive decoding comprises an intra-picture prediction;
- use, for the intra-picture prediction, for decoding a prediction block of the plurality of prediction blocks, a plurality of extended reference samples of the picture, each extended reference sample of the plurality of extended reference samples separated from the prediction block at least by one nearest reference sample of the plurality of reference samples, directly neighboring the prediction block;
- determine the extended reference samples so as to be at least partially a part of an adjacent prediction block of the plurality of prediction blocks, and to determine that the adjacent prediction block has not yet been predicted; and receive information indicating the extended prediction samples associated to the prediction block and arranged in the adjacent prediction block as unavailable samples.

155. Non-transitory storage medium having stored thereon a computer program having a program code for performing, when running on a computer, a method according to one of aspects 133-154.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An electronic device for video decoding, the electronic device comprising:
 a processor configured to:
  determine, from a bitstream of encoded video data:
   parameter information indicating a subset of a plurality of reference samples used for predicting a prediction block, the plurality of reference samples including (i) nearest reference samples directly neighboring the prediction block and (ii) a plurality of extended reference samples, each extended reference sample of the plurality of extended reference samples separated from the prediction block by at least one of the nearest reference samples of the plurality of reference samples, and the subset of the plurality of reference samples indicating either the nearest reference samples or at least one of the plurality of extended reference samples, and
   mode information indicating a prediction mode, among multiple prediction modes, used for predicting the prediction block, the multiple prediction modes including prediction modes for predicting the prediction block using the nearest reference samples and prediction modes for predicting the prediction block using any of the plurality of extended reference samples;
  determine whether the parameter information is signaled in the bitstream;
  in response to the determination that the parameter information is not signaled in the bitstream, determine the parameter information by inferring that the parameter information indicates the nearest reference samples are used for predicting the prediction block;
  using the mode information, determine whether the prediction mode is from (i) a first set of prediction modes for predicting the prediction block using the nearest reference samples or (ii) a second set of prediction modes for predicting the prediction block using at least one of the plurality of extended reference samples, wherein the second set of prediction modes is a subset of the first set of prediction modes;
  in response to the determination that the mode information is from the first set of prediction modes, select the prediction mode from the first set of prediction modes; and
  decode, by block based predictive decoding, the prediction block using the nearest reference samples and the selected prediction mode.

2. The electronic device of claim 1, wherein:
 the second set of prediction modes is a restricted set of prediction modes from the first set of prediction modes.

3. The electronic device of claim 1, wherein, when the parameter information indicates that the subset of the plurality of reference samples used for predicting the prediction block corresponds to at least one of the plurality of extended reference samples, the processor is configured to:
  determine that the mode information indicates the prediction mode from the second set of prediction modes; and
  select the prediction mode from the second set of prediction modes.

4. The electronic device of claim 1, wherein, when the parameter information indicates that the subset of the plurality of reference samples used for predicting the prediction block corresponds to the nearest reference samples, the processor is configured to:
  determine that the mode information indicates the prediction mode from the first set of prediction modes; and
  select the prediction mode from the first set of prediction modes.

5. The electronic device of claim 1, wherein the processor is further configured to:
  determine a list of most probable prediction modes for predicting the prediction block when using the nearest reference samples or the plurality of extended reference samples as indicated by the parameter information.

6. The electronic device of claim 1, wherein, when at least one of the plurality of extended reference samples is used for predicting the prediction block, the processor is configured to:
  determine that certain prediction modes, including DC and planar modes, are not used for predicting the prediction block.

7. The electronic device of claim 1, wherein, when the mode information indicates that the prediction mode uses at least one of the plurality of extended reference samples, the processor is configured to:
  in response to a determination that the parameter information is signaled in the bitstream;
  identify, from the parameter information, at least one of the plurality of extended reference samples;
  select the prediction mode from the second set of prediction modes based in part on the mode information; and
  perform a prediction using the selected prediction mode and the identified at least one extended reference sample.

8. The electronic device of claim 1, wherein the processor is further configured to:
  determine the mode information before the parameter information, or
  determine the parameter information before the mode information.

9. The electronic device of claim 8, wherein, when the mode information is determined before the parameter information, the processor is configured to:
  determine whether the parameter information is included in the bitstream based in part on the mode information;
  in response to a determination that the parameter information is included in the bitstream, identify a value of the parameter information that indicates the at least one of the plurality of extended reference samples and use the at least one of the plurality of extended reference samples and the second set of prediction modes for predicting the prediction block; and
  in response to a determination that the parameter information is not included in the bitstream, identify the parameter information by inferring that the parameter information indicates the nearest reference samples and use the first set of prediction modes for predicting the prediction block.

10. The electronic device of claim 8, wherein when the parameter information is identified before the mode information, the processor is configured to:
  determine to use the first set of prediction modes or the second set of prediction modes based on the subset of the plurality of reference samples indicated by the parameter information.

11. The electronic device of claim 1, wherein to determine the parameter information the processor is configured to:
  decode the parameter information from the bitstream, or
  infer a value of the parameter information from the bitstream.

12. A method for video decoding, the method comprising:
  determining, from a bitstream of encoded video data:
    parameter information indicating a subset of a plurality of reference samples used for predicting a prediction block, the plurality of reference samples including (i) nearest reference samples directly neighboring the prediction block and (ii) a plurality of extended reference samples, each extended reference sample of the plurality of extended reference samples separated from the prediction block by at least one of the nearest reference samples of the plurality of reference samples, and the subset of the plurality of reference samples indicating either the nearest reference samples or at least one of the plurality of extended reference samples, and
    mode information indicating a prediction mode, among multiple prediction modes, used for predicting the prediction block, the multiple prediction modes including prediction modes for predicting the prediction block using the nearest reference samples and prediction modes for predicting the prediction block using any of the plurality of extended reference samples;
  determining whether the parameter information is signaled in the bitstream;
  in response to the determination that the parameter information is not signaled in the bitstream, determining the parameter information by inferring that the parameter information indicates the nearest reference samples are used for predicting the prediction block;
  using the mode information, determine whether the prediction mode is from (i) a first set of prediction modes for predicting the prediction block using the nearest reference samples, or (ii) a second set of prediction modes for predicting the prediction block using at least one of the plurality of extended reference samples, wherein the second set of prediction modes is a subset of the first set of prediction modes;
  in response to the determination that the mode information is from the first set of prediction modes, selecting the prediction mode from the first set of prediction modes; and
  decoding, by block based predictive decoding, the prediction block using the nearest reference samples and the selected prediction mode.

13. The method of claim 12, wherein:
  the second set of prediction modes is a restricted set of prediction modes from the first set of prediction modes.

14. The method of claim 12, wherein when the parameter information indicates that the subset of the plurality of reference samples used for predicting the prediction block corresponds to at least one of the plurality of extended reference samples, the method comprises:
- determining that the mode information indicates the prediction mode from the second set of prediction modes; and
- selecting, the prediction mode from the second set of prediction modes.

15. The method of claim 12, wherein, when the parameter information indicates that the subset of the plurality of reference samples used for predicting the prediction block corresponds to the nearest reference samples, the method comprises:
- determining that the mode information indicates the prediction mode from the first set of prediction modes; and
- selecting, the prediction mode from the first set of prediction modes.

16. The method of claim 12, further comprising:
- determining a list of most probable prediction modes for predicting the prediction block when using the nearest reference samples or the plurality of extended reference samples as indicated by the parameter information.

17. The method of claim 12, wherein, when at least one of the plurality of extended reference samples is used for predicting the prediction block, the method comprises:
- determining that certain prediction modes, including DC and planar modes, are not used for predicting the prediction block.

18. The method of claim 12, wherein, when the mode information indicates that the prediction mode uses at least one of the plurality of extended reference samples, the method comprises:
- determining that the parameter information is signaled in the bitstream;
- in response to the determination that the parameter information is signaled in the bitstream, identifying, from the parameter information, at least one of the plurality of extended reference samples;
- selecting the prediction mode from the second set of prediction modes based in part on the mode information; and
- performing a prediction using the selected prediction mode and the identified at least one extended reference sample.

19. The method of claim 12, further comprising:
- determining the mode information before the parameter information, or
- determining the parameter information before the mode information.

20. The method of claim 19, wherein, when the mode information is determined before the parameter information, the method comprises:
- determining whether the parameter information is included in the bitstream based in part on the mode information;
- in response to a determination that the parameter information is included in the bitstream, identifying a value of the parameter information that indicates the at least one of the plurality of extended reference samples and using the at least one of the plurality of extended reference samples and the second set of prediction modes for predicting the prediction block; and
- in response to a determination that the parameter information is not included in the bitstream, identifying the parameter information by inferring that the parameter information indicates the nearest reference samples and using the first set of prediction modes for predicting the prediction block.

21. The method of claim 19, wherein when the parameter information is identified before the mode information, the method comprises:
- determining to use the first set of prediction modes or the second set of prediction modes based on the subset of the plurality of reference samples indicated by the parameter information.

22. The method of claim 12, wherein determining the parameter information, the method comprises:
- decoding the parameter information from the bitstream, or inferring a value of the parameter information from the bitstream.

23. A non-transitory computer readable medium containing instructions that, when executed, cause at least one processor to:
- determine, from a bitstream of encoded video data:
  - parameter information indicating a subset of a plurality of reference samples used for predicting a prediction block, the plurality of reference samples including (i) nearest reference samples directly neighboring the prediction block, and (ii) a plurality of extended reference samples, each extended reference sample of the plurality of extended reference samples separated from the prediction block by at least one of the nearest reference samples of the plurality of reference samples, and the subset of the plurality of reference samples indicating either the nearest reference samples or at least one of the plurality of extended reference samples, and
  - mode information indicating a prediction mode, among multiple prediction modes, used for predicting the prediction block, the multiple prediction modes including prediction modes for predicting the prediction block using the nearest reference samples and prediction modes for predicting the prediction block using any of the plurality of extended reference samples;
- determine whether the parameter information is signaled in the bitstream;
- in response to the determination that the parameter information is not signaled in the bitstream, determine the parameter information by inferring that the parameter information indicates the nearest reference samples are used for predicting the prediction block;
- using the mode information, determine whether the prediction mode is from (i) a first set of prediction modes for predicting the prediction block using the nearest reference samples, or (ii) a second set of prediction modes for predicting the prediction block using at least one of the plurality of extended reference samples, wherein the second set of prediction modes is a subset of the first set of prediction modes;
- in response to the determination that the mode information is from the first set of prediction modes, select the prediction mode from the first set of prediction modes; and
- decode, by block based predictive decoding, the prediction block using the nearest reference samples and the selected prediction mode.

24. The non-transitory computer readable medium of claim 23, wherein:
- the second set of prediction modes is a restricted set of prediction modes from the first set of prediction modes.

25. The non-transitory computer readable medium of claim 23, wherein, when the parameter information indicates that the subset of the plurality of reference samples used for predicting the prediction block corresponds to at least one of the plurality of extended reference samples, the processor is configured to:
   determine that the mode information indicates the prediction mode from the second set of prediction modes, and
   select the prediction mode from the second set of prediction modes.

26. The non-transitory computer readable medium of claim 23, wherein the instructions that when executed cause the at least one processor to determine that the parameter information indicates that the subset of the plurality of reference samples used for predicting the prediction block corresponds to the nearest reference samples comprise instructions that, when executed, cause the at least one processor to:
   determine that the mode information indicates the prediction mode from the first set of prediction modes, and
   select the prediction mode from the first set of prediction modes.

27. The non-transitory computer readable medium of claim 23, further containing instructions that when executed cause the at least one processor to:
   determine a list of most probable prediction modes for predicting the prediction block when using the nearest reference samples or the plurality of extended reference samples as indicated by the parameter information.

28. The non-transitory computer readable medium of claim 23, wherein the instructions that, when executed, cause the at least one processor to determine that at least one of the plurality of extended reference samples is used for predicting the prediction block comprise instructions that, when executed, cause the at least one processor to:
   determine that certain prediction modes, including DC and planar modes, are not used for predicting the prediction block.

29. The non-transitory computer readable medium of claim 23, wherein the instructions that, when executed, cause the at least one processor to determine that the mode information indicates that the prediction mode uses at least one of the plurality of extended reference samples comprise instructions that, when executed, cause the at least one processor to:
   in response to a determination that the parameter information is signaled in the bitstream,
   identify, from the parameter information, at least one of the plurality of extended reference samples;
   select the prediction mode from the second set of prediction modes based in part on the mode information; and
   perform a prediction using the selected prediction mode and the identified at least one extended reference sample.

30. The non-transitory computer readable medium of claim 23, further containing instructions that when executed cause the at least one processor to:
   determine the mode information before the parameter information; or
   determine the parameter information before the mode information.

31. The non-transitory computer readable medium of claim 30, wherein the instructions that, when executed, cause the at least one processor to determine that the mode information is determined before the parameter information comprise instructions that, when executed, cause the at least one processor to:
   determine whether the parameter information is included in the bitstream based in part on the mode information;
   in response to a determination that the parameter information is included in the bitstream, identify a value of the parameter information that indicates the at least one of the plurality of extended reference samples and use the at least one of the plurality of extended reference samples and the second set of prediction modes for predicting the prediction block; and
   in response to a determination that the parameter information is not included in the bitstream, identify the parameter information by inferring that the parameter information indicates the nearest reference samples and use the first set of prediction modes for predicting the prediction block.

32. The non-transitory computer readable medium of claim 30, wherein when the parameter information is identified before the mode information, the processor is configured to:
   determine to use the first set of prediction modes or the second set of prediction modes based on the subset of the plurality of reference samples indicated by the parameter information.

33. The non-transitory computer readable medium of claim 23, wherein to determine the parameter information the processor is configured to:
   decode the parameter information from the bitstream, or infer a value of the parameter information from the bitstream.

* * * * *